(12) United States Patent
Ueda et al.

(10) Patent No.: US 9,944,464 B2
(45) Date of Patent: Apr. 17, 2018

(54) ARTICLE TRANSPORT FACILITY

(71) Applicant: Daifuku Co., Ltd., Osaka-shi (JP)

(72) Inventors: Yuichi Ueda, Shiga (JP); Masashige Iwata, Shiga (JP); Kazunori Makimura, Shiga (JP)

(73) Assignee: Daifuku Co., Ltd., Osaka-shi (JP)

( * ) Notice: Subject to any disclaimer, the term of this patent is extended or adjusted under 35 U.S.C. 154(b) by 100 days.

(21) Appl. No.: 15/054,612

(22) Filed: Feb. 26, 2016

(65) Prior Publication Data

US 2017/0057745 A1 Mar. 2, 2017

(30) Foreign Application Priority Data

Aug. 27, 2015 (JP) ................................. 2015-168160

(51) Int. Cl.
*B65G 1/04* (2006.01)
*B65G 1/137* (2006.01)

(52) U.S. Cl.
CPC ......... *B65G 1/1373* (2013.01); *B65G 1/0407* (2013.01); *B65G 1/0421* (2013.01); *B65G 1/1375* (2013.01)

(58) Field of Classification Search
CPC ............................ B65G 1/0421; B65G 1/1375
See application file for complete search history.

(56) References Cited

U.S. PATENT DOCUMENTS

| | | | |
|---|---|---|---|
| 6,817,824 B2 * | 11/2004 | Winkler | B65G 1/1375 414/273 |
| 7,686,559 B2 * | 3/2010 | Tsujimoto | B65G 1/0421 414/273 |
| 2013/0209202 A1 | 8/2013 | Schmit et al. | |

FOREIGN PATENT DOCUMENTS

| | | | | |
|---|---|---|---|---|
| DE | 102010009873 A1 | 8/2011 | | |
| EP | 2345605 A1 | 7/2011 | | |
| FR | 2132554 A2 * | 11/1972 | ........... | B65G 1/0421 |
| FR | 2158399 A1 | 6/1973 | | |
| JP | 53131673 A | 11/1978 | | |
| JP | 9315518 A | 12/1997 | | |
| JP | 2005104675 A | 4/2005 | | |

* cited by examiner

*Primary Examiner* — James Keenan
(74) *Attorney, Agent, or Firm* — The Webb Law Firm

(57) ABSTRACT

A stacker crane is provided with: a travelling carriage that is configured to be able to travel along the rack width direction; a first mast that is provided so as to stand on the travelling carriage; a second mast that is provided so as to stand on the same travelling carriage on which the first mast is provided; a first elevator body that is configured to be guided along the first mast; a second elevator body that is configured to be guided along the second mast so as to be able to move up/down independently of the first elevator body, and that is aligned with the first elevator body in the rack width direction in plan view; a first transferring device that is supported by the first elevator body; and a second transferring device that is supported by the second elevator body.

14 Claims, 23 Drawing Sheets

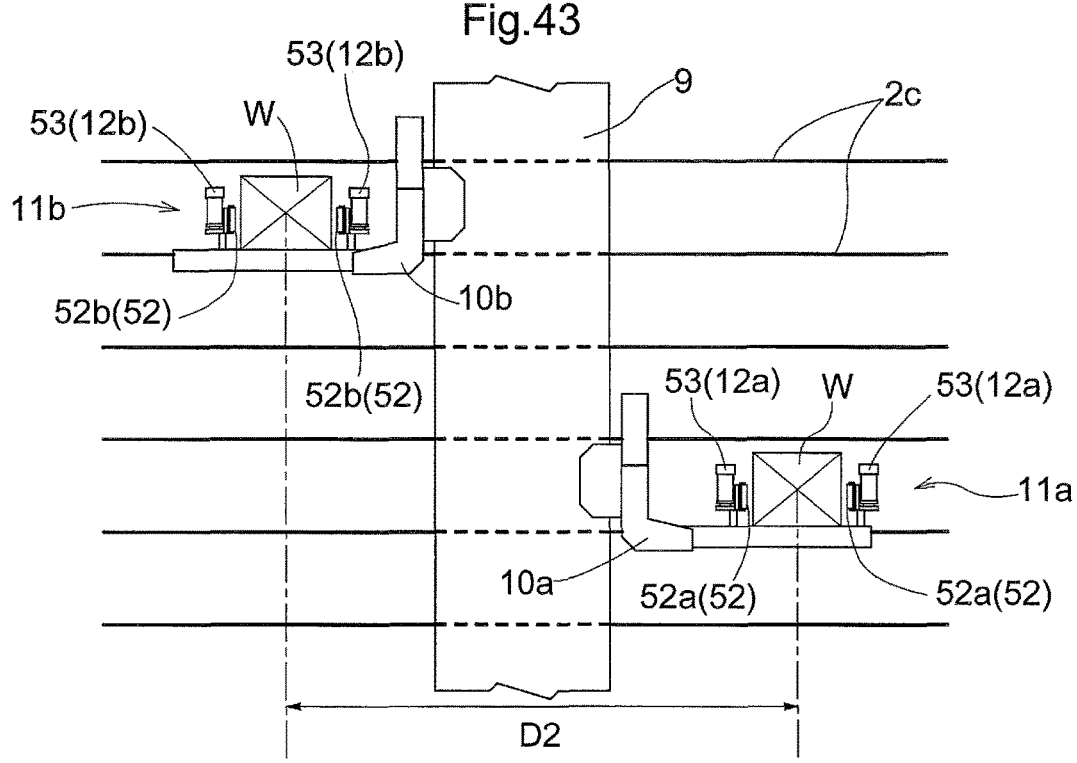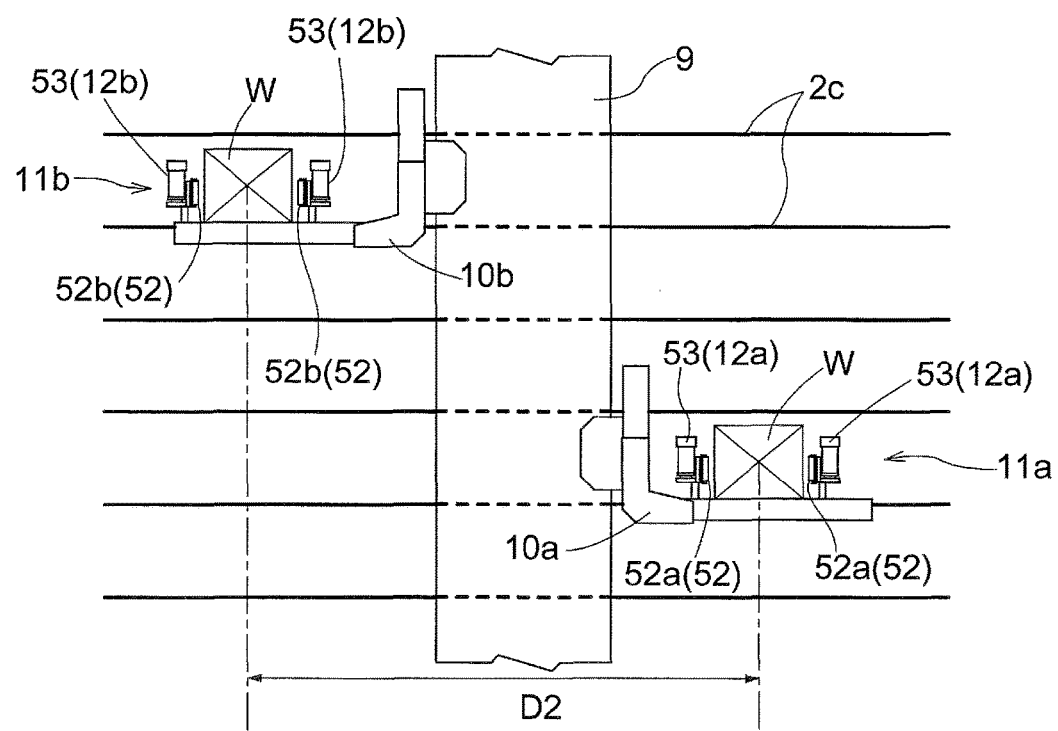

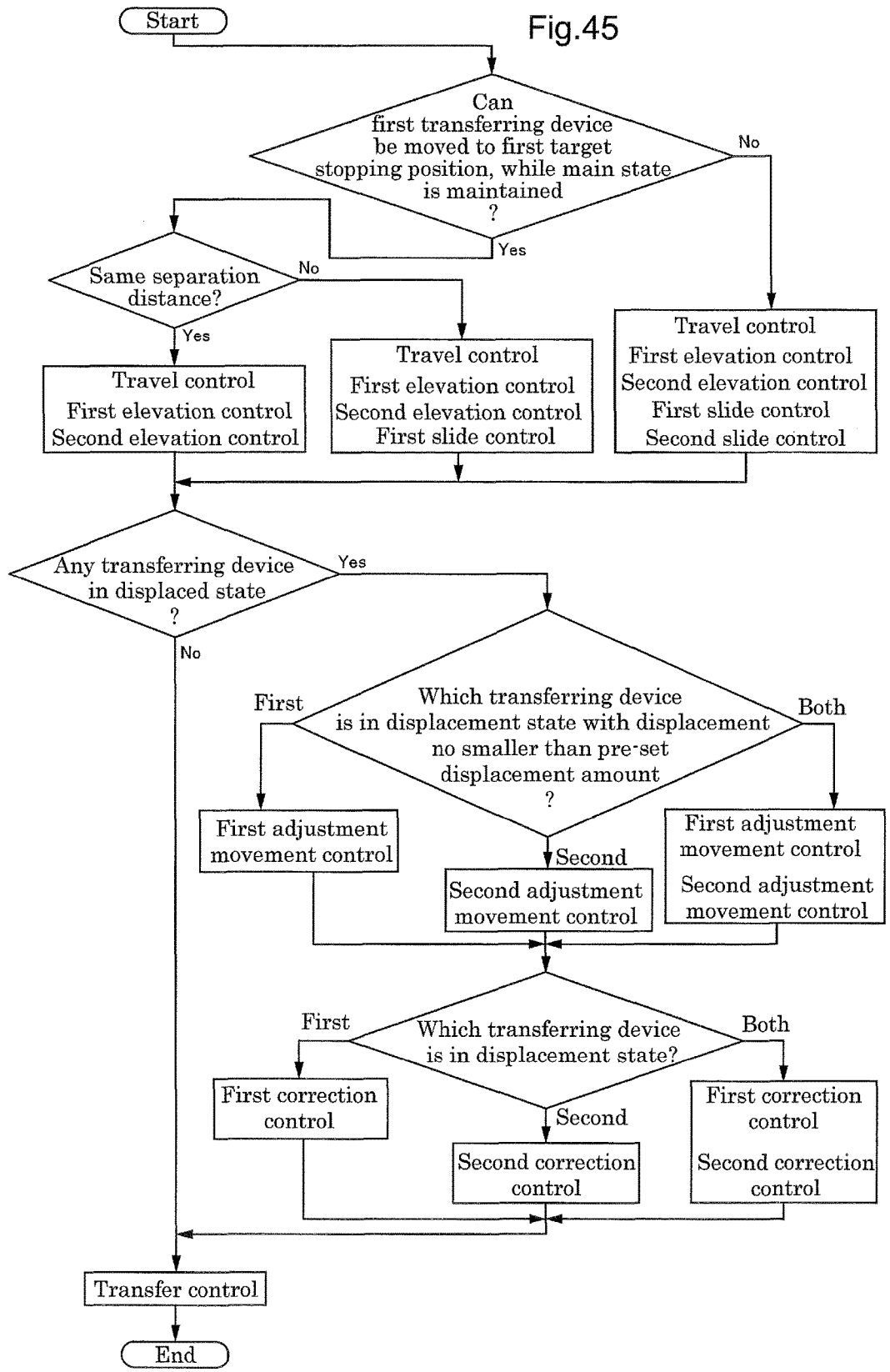

ARTICLE TRANSPORT FACILITY

CROSS-REFERENCE TO RELATED APPLICATION

This application claims priority to Japanese Patent Application No. 2015-168160 filed Aug. 27, 2015, the disclosure of which is hereby incorporated in its entirety by reference.

FIELD OF THE INVENTION

The present invention relates to an article transport facility that includes: an article storage rack in which a plurality of storage sections are arranged in a plurality of rows in the vertical direction and a plurality of columns in the rack width direction; and a stacker crane that travels in front of the article storage rack along the rack width direction.

BACKGROUND

An example of the article transport facility above is disclosed in JP H9-315518A (Patent Document 1). In the article transport facility according to Patent Document 1, the stacker crane includes: a travelling carriage that is able to travel in the rack width direction; an elevator body that is guided along a mast that is provided so as to stand on the travelling carriage; and a first transferring device and a second transferring device that are supported by the elevator body.

In this way, the two transferring devices, namely the first transferring device and the second transferring device, are supported by the elevator body so that articles can be transferred to/from a storage section by the first transferring device, and articles can be transferred to/from a storage section by the second transferring device. The article transport facility is thus configured to be able to simultaneously transfer articles to/from two storage sections with a single stacker crane.

SUMMARY OF THE INVENTION

However, with the stacker crane disclosed in Patent Document 1, although it is possible to simultaneously transfer articles to/from two storage sections with a single stacker crane, the two storage sections to/from which articles can be transferred are limited to two storage sections that are in the same row and adjacent to each other in the rack width direction. Therefore, in the case of storing articles to storage sections for example, unless empty storage sections in which no articles are stored are in the same row and adjacent to each other in the rack width direction, it is not possible to simultaneously store articles to two storage sections with a single stacker crane. In this way, with the stacker crane disclosed in Patent Document 1, there are only limited circumstances in which articles can be simultaneously transferred to/from two storage sections, and it is difficult to perform simultaneous transfer of articles to/from two storage sections.

For this reason, there is a demand for an article transport facility that makes it easier to perform simultaneous transfer of articles to/from two storage sections with a single stacker crane, and that is able to efficiently transport articles.

In an article transport facility that includes: an article storage rack in which a plurality of storage sections are arranged in a plurality of rows in a vertical direction and a plurality of columns in a rack width direction; and a stacker crane that is configured to travel in front of the article storage rack along the rack width direction, the characteristic configuration of the article transport facility considering the above lies in that the stacker crane is provided with: a travelling carriage that is configured to be able to travel along the rack width direction; a first mast that is provided so as to stand on the travelling carriage; a second mast that is provided so as to stand on the same travelling carriage on which the first mast is provided; a first elevator body that is configured to be guided along the first mast; a second elevator body that is configured to be guided along the second mast so as to be able to move up/down independently of the first elevator body, and that is aligned with the first elevator body in the rack width direction in plan view; a first transferring device that is supported by the first elevator body and that is configured to transfer an article between the plurality of storage sections and the first transferring device; and a second transferring device that is supported by the second elevator body and that is configured to transfer an article between the plurality of storage sections and the second transferring device.

With this characteristic configuration, the first transferring device is supported by the first elevator body and the second transferring device is supported by the second elevator body, and the first elevator body and the second elevator body are configured to be able to individually move up/down. Therefore, it is possible to simultaneously transfer articles to two storage sections belonging to the same row by positioning the first elevator body and the second elevator body at the same level, and it is possible to simultaneously transfer articles to two storage sections belonging to different rows by positioning the first elevator body and the second elevator body at different levels.

In this way, since the first elevator body and the second elevator body are able to individually move up/down, the two storage sections to/from which articles are transferred by the first transferring device and the second transferring device are not limited to those in the same row, and it is possible to perform simultaneous transfer of articles to/from two storage sections in different rows. Therefore, it is easier to perform simultaneous transfer of articles to/from two storage sections with a single stacker crane, and it is possible to efficiently transport articles.

BRIEF DESCRIPTION OF THE DRAWINGS

FIG. 43 is a diagram showing a situation in which the second transferring device is located at an HP-side end of a range of a slide movement;

FIG. 44 is a diagram showing a situation in which the second transferring device is located at an OP-side end of the range of the slide movement; and FIG. 45 is a flowchart showing movement control, adjustment movement control, correction control, and transfer control according to an alternative embodiment (8).

DETAILED DESCRIPTION

First Embodiment

The following describes a first embodiment of an article transport facility with reference to the drawings.

Figure 1:
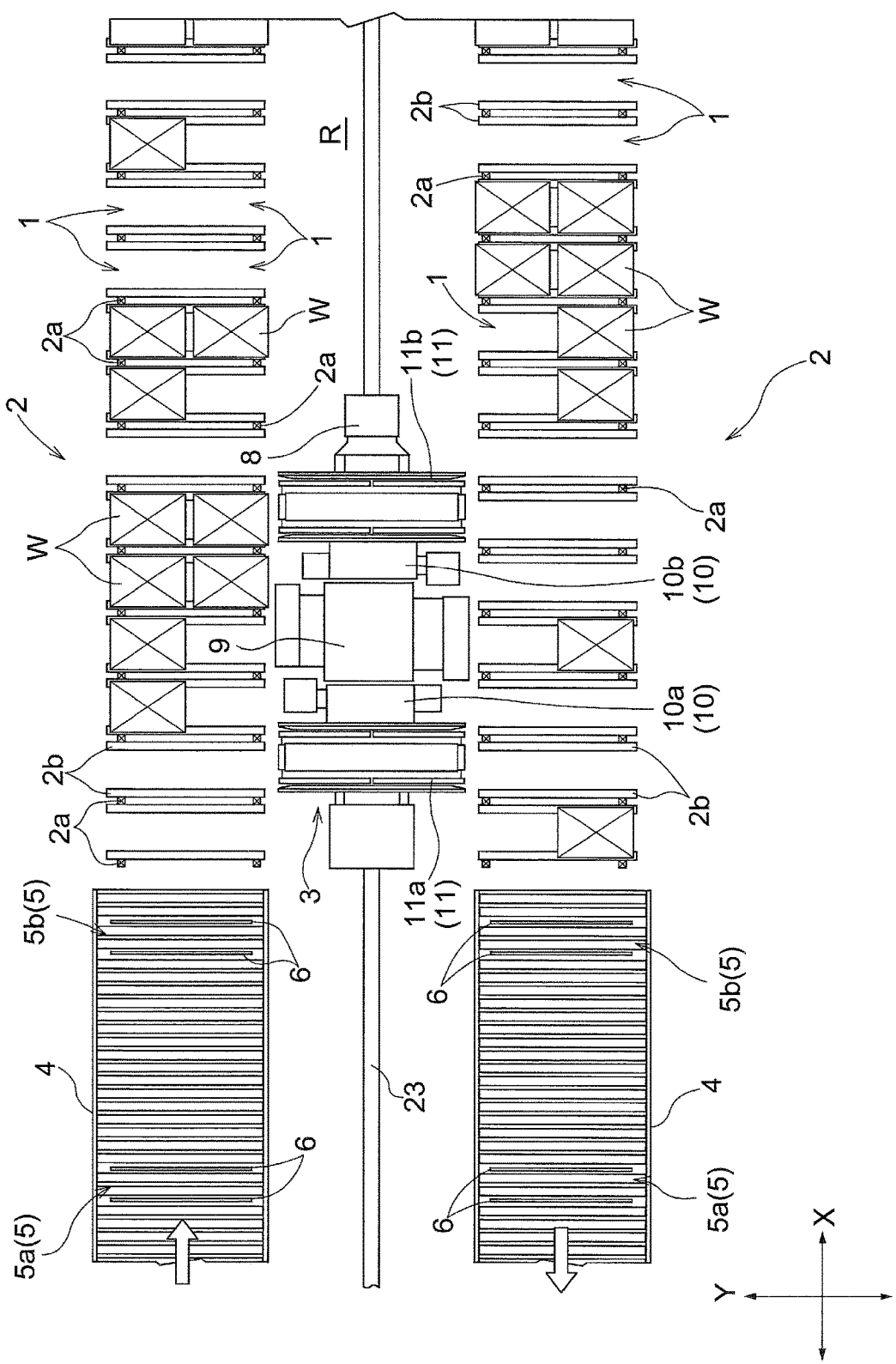
FIG. 1 is a plan view of an article transport facility.

As shown in FIG. 1, the article transport facility is configured with: article storage racks 2 that are each provided with a plurality of storage sections 1 for storing articles W; and a stacker crane 3 that travels in front of the article storage racks 2 along a travel path R in the rack width direction, and transports articles W between transferring sections 5 of transport conveyors 4 and the plurality of storage sections 1, and between the plurality of storage sections 1.

Note that, in FIG. 1, the direction in which the plurality of storage sections 1 are aligned in each article storage rack 2 is defined as "rack width direction", and the direction that is orthogonal to the rack width direction in plan view is defined as "rack front-rear direction". The direction indicated by an arrow X is the rack width direction (the longitudinal direction of the path), and the direction indicated by an arrow Y is the rack front-rear direction. In some cases, one side in the rack width direction (the transport conveyors 4 side relative to the article storage racks 2 in the longitudinal direction of the path) is referred to as "HP side", and the other side in the rack width direction (the article storage racks 2 side relative to the transport conveyors 4 in the longitudinal direction of the path) is referred to as "OP side".

Article Storage Racks

Figure 2:
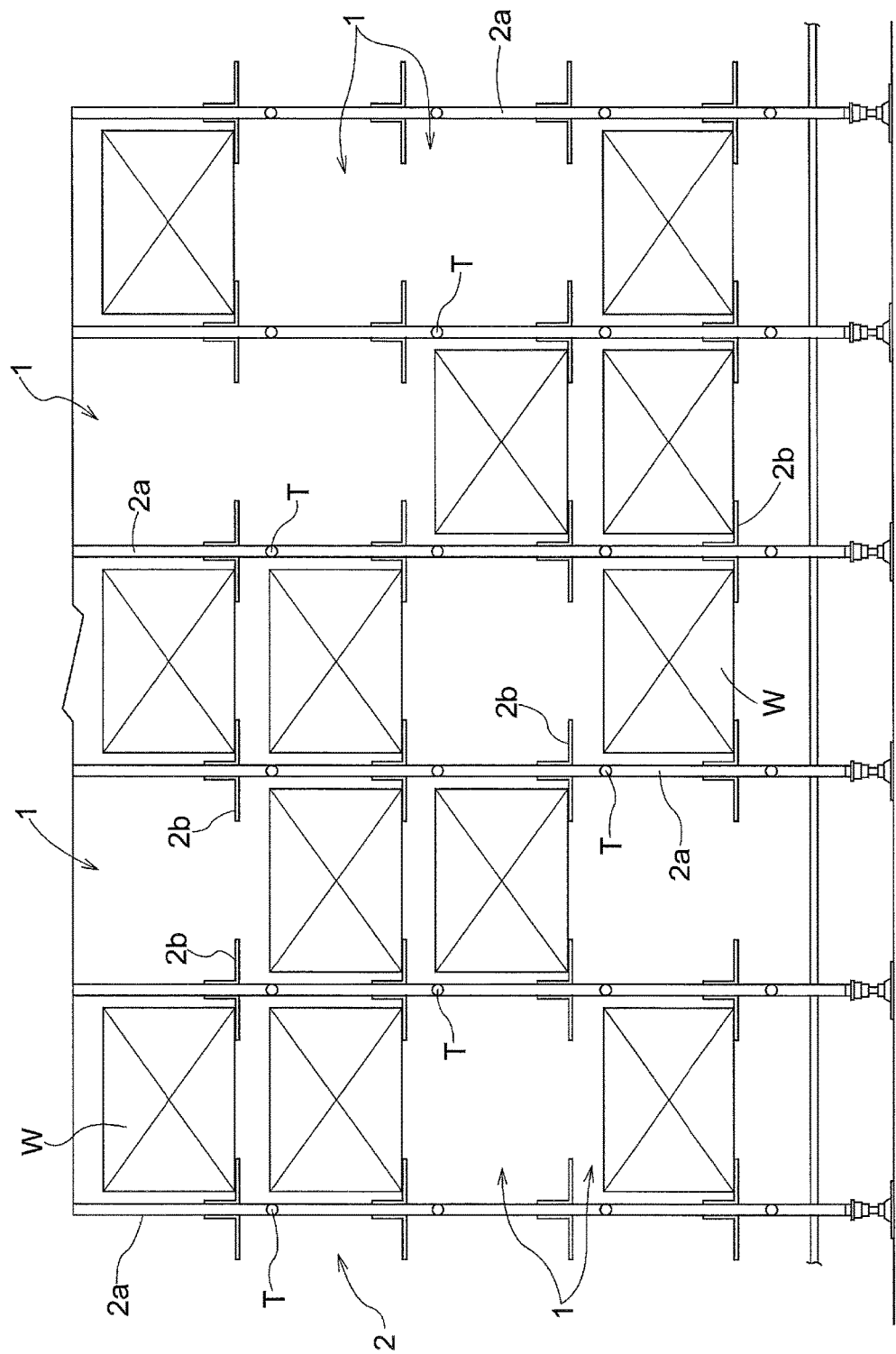
FIG. 2 is a front view of an article storage rack.

As shown in FIG. 1, a pair of article storage racks 2 are installed with a distance therebetween in the rack front-rear direction such that the travel path of the stacker crane 3 is interposed therebetween and their front faces oppose each other. As shown in FIG. 2, each article storage rack 2 is configured with: a plurality of support posts 2a that are aligned in the rack width direction and that are provided so as to stand on a floor surface; and placement support bodies 2b that are attached to the support posts 2a so as to protrude in the rack width direction from the support posts 2a.

Also, in each article storage rack 2, a plurality of storage sections 1 are provided one after another along the rack width direction such that storage sections 1 are formed between support posts 2a that are adjacent to each other in the rack width direction. A plurality of placement support bodies 2b are attached to each support post 2a with a distance therebetween in the vertical direction, and each article storage rack 2 is provided with a plurality of storage sections 1 arranged one after another in the vertical direction such that storage sections 1 are formed above these placement support bodies 2b. The storage sections 1 store articles W such that an article W is placed to span, and is thus supported by, a pair of placement support bodies 2b that are located between adjacent support posts 2a.

In this way, each article storage rack 2 is provided with a plurality of storage sections 1 arranged in a plurality of rows in the vertical direction and a plurality of columns in the rack width direction.

Each article storage rack 2 is provided with detection target sections T at positions respectively corresponding to the plurality of storage sections 1. Each detection target section T is configured with a hole that passes through a support post 2a in the rack front-rear direction. Each detection target section T is formed to be located at the lower left of the articles W stored in the corresponding storage section 1 when viewed from the travel path R.

The plurality of storage sections 1 are each configured to be able to store two articles W aligned in the rack front-rear direction. Note that, in some cases, out of two articles W aligned in the rack front-rear direction and stored in a storage section 1, the article W at the front side in the rack front-rear direction, which is the side on which the travel path R is present, is referred to as "front-side article W", and the other article W is referred to as "rear-side article W".

Transport Conveyors

As shown in FIG. 1, the transport conveyors 4 are each configured with a roller conveyor. A pair of transport conveyors 4, namely a load transport conveyor 4 that transports articles W placed thereon to the corresponding transferring sections 5, and an unload transport conveyor 4 that transports articles W placed thereon from the corresponding transferring sections 5, are provided as the transport conveyors 4. The pair of transport conveyors 4 are each provided with a pair of transferring sections 5, namely: a first transferring section 5a that transfers articles W to/from a first transferring device 11a of the stacker crane 3; and a second transferring section 5b that transfers articles W to/from a second transferring device 11b of the stacker crane 3. The second transferring section 5b is located on the OP-side in the rack width direction relative to the first transferring section 5a.

The first transferring section 5a and the second transferring section 5b are each provided with elevation support platforms 6 that move up/down between a placement level at which articles W are placed and supported, and a retreat level that is located lower than the transport surfaces of the transport conveyors 4.

Although a detailed description is omitted, the transport conveyors 4 are each configured to transport articles W with the elevation support platforms 6 lowered to the retreat level, and to transport articles W to/from the transferring devices 11 with the elevation support platforms 6 raised to the placement level.

The length of the elevation support platforms 6 in the rack front-rear direction is greater than the length of two articles W aligned in the rack front-rear direction, and the transport conveyors 4 are configured such that two articles W can be simultaneously transferred to/from the transferring devices 11 by the transferring sections 5.

Although not shown in the drawings, the transport conveyors 4 are each provided with detection target sections T corresponding to the transferring sections 5. The detection target sections T provided for the transport conveyors 4 are located at the lower left of the articles W placed on and supported by the corresponding elevation support platforms 6 at the placement level when the corresponding transferring section 5 is viewed from the travel path R.

Stacker Crane

Figure 3:
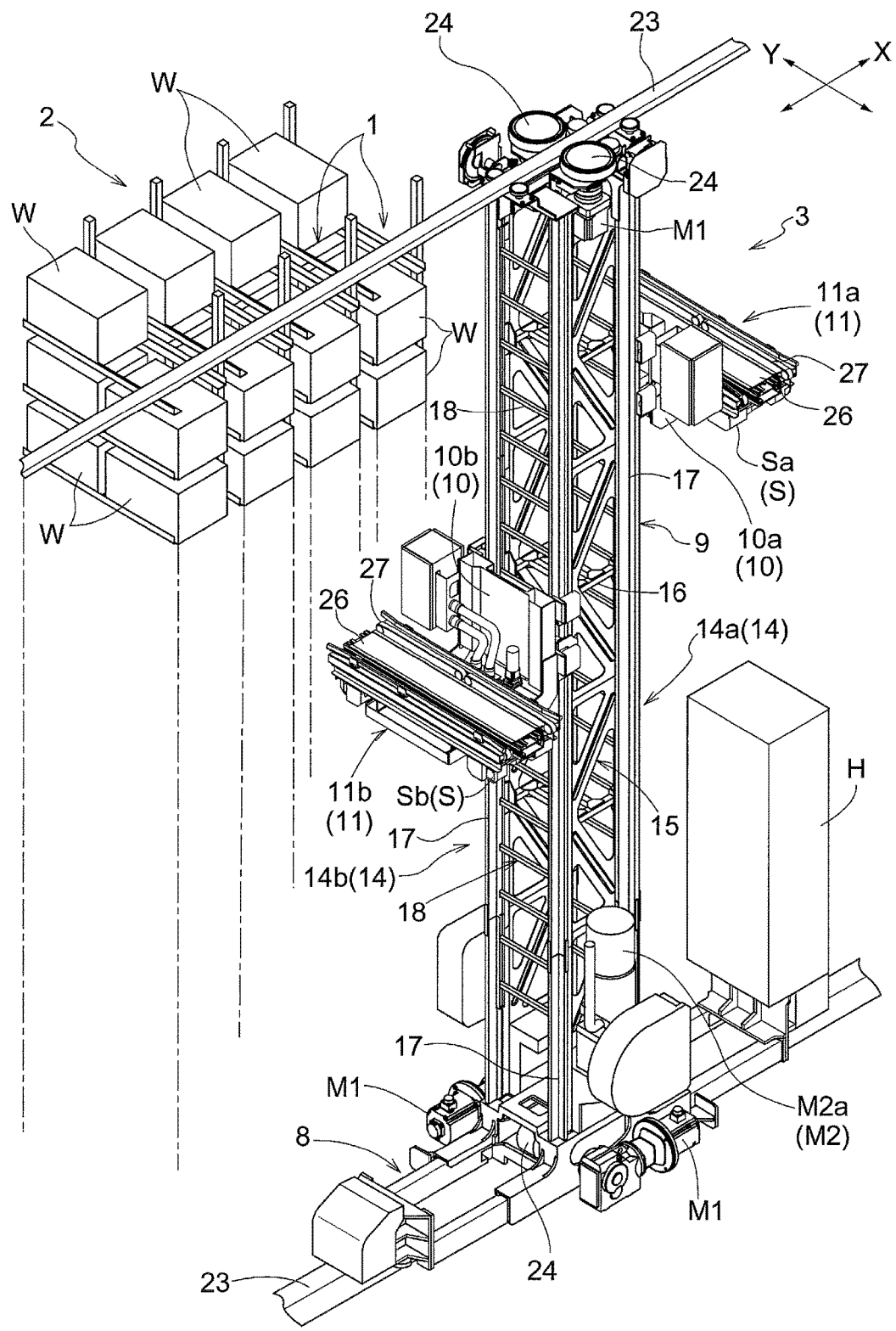
FIG. 3 is a perspective view of a stacker crane.
Figure 4:
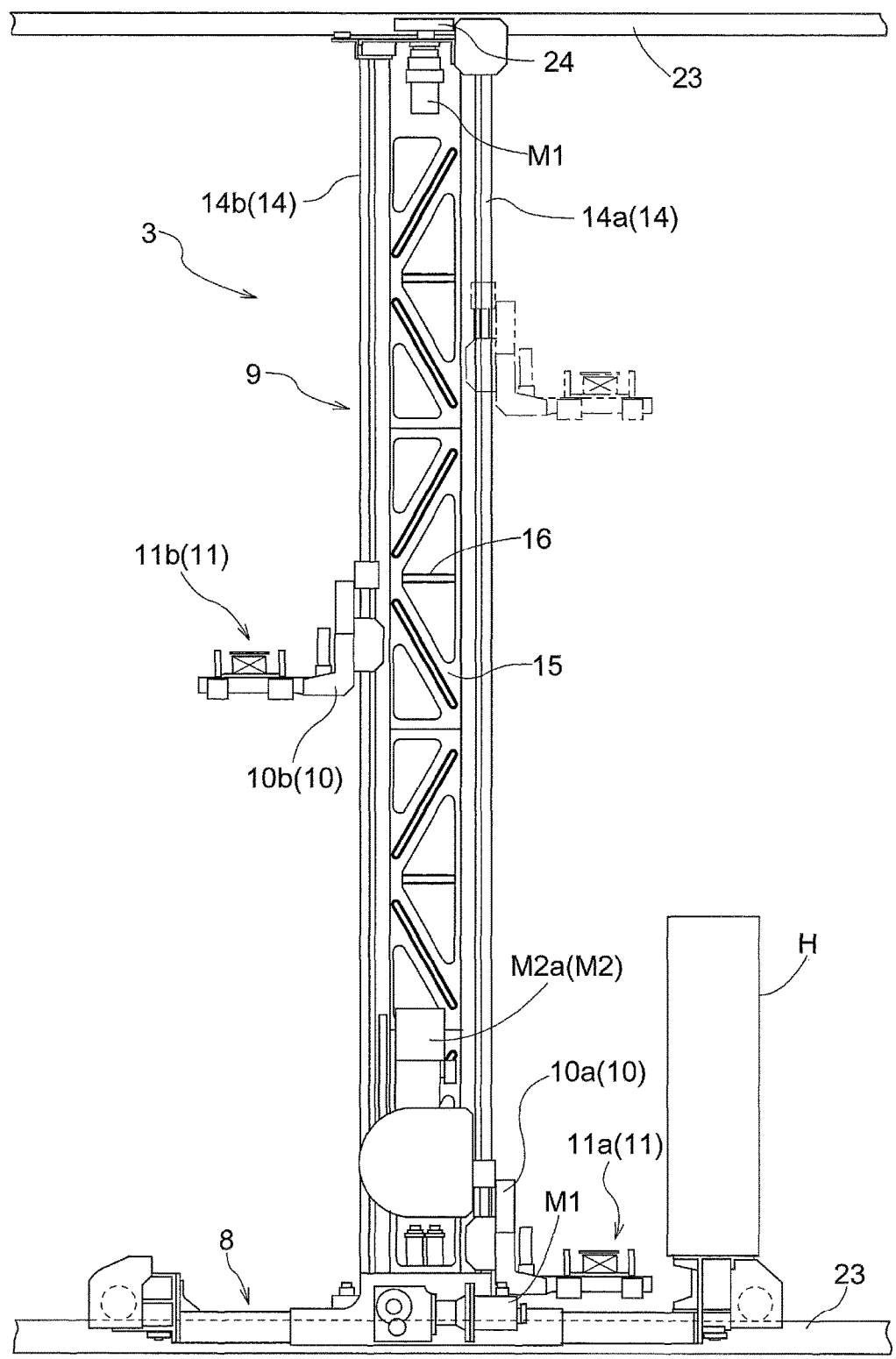
FIG. 4 is a side view of the stacker crane.

As shown in FIG. 3 and FIG. 4, the stacker crane 3 is configured with: a travelling carriage 8 that is able to travel in the rack width direction along the travel path R formed between the pair of article storage racks 2; elevator bodies 10 that are able to move up/down along an elevation guide mast 9, which is a mast provided so as to stand on the travelling carriage 8; the transferring devices 11 that are respectively supported by the elevator bodies 10 and that transfer articles W to/from the storage sections 1 and so on; and sliding devices 12 that are respectively supported by the elevator bodies 10 and that respectively move the transferring devices 11 along the rack width direction.

Only one elevation guide mast 9 is provided so as to stand on the travelling carriage 8. The elevation guide mast 9 is configured by arranging a pair of mast frames 14 in the rack width direction, and coupling the pair of mast frames 14, using truss plates 15 and coupling materials 16. Each mast frame 14 is configured by coupling a pair of mast members 17 aligned in the rack front-rear direction, using a plurality of frame members 18 for forming a ladder. Each truss plate 15 is located between a pair of mast members 17 aligned in the rack width direction, and couples the pair of mast members 17 to each other. Each coupling material 16 couples two mast members 17 arranged on the same side in the rack front-rear direction, out of the four mast members 17 provided for the elevation guide mast 9, to each other. The respective upper end portions, vertically intermediate portions, and lower end portions of the pair of mast frames 14 are coupled to each other by using coupling bodies such as the truss plates 15 and the coupling material 16, and thus a single elevation guide mast 9 is configured.

Out of the pair of mast frames 14, the mast frame 14 located on the HP side in the rack width direction is defined as a first mast 14a that is provided so as to stand on the travelling carriage 8, and the mast frame 14 located on the OP side in the rack width direction is defined as a second mast 14b that is provided so as to stand on the same travelling carriage 8 on which the first mast 14a is provided.

In this way, the same elevation guide mast 9 is configured by the first mast 14a and the second mast 14b, and only one elevation guide mast 9 is provided for the stacker crane 3.

Figure 11:
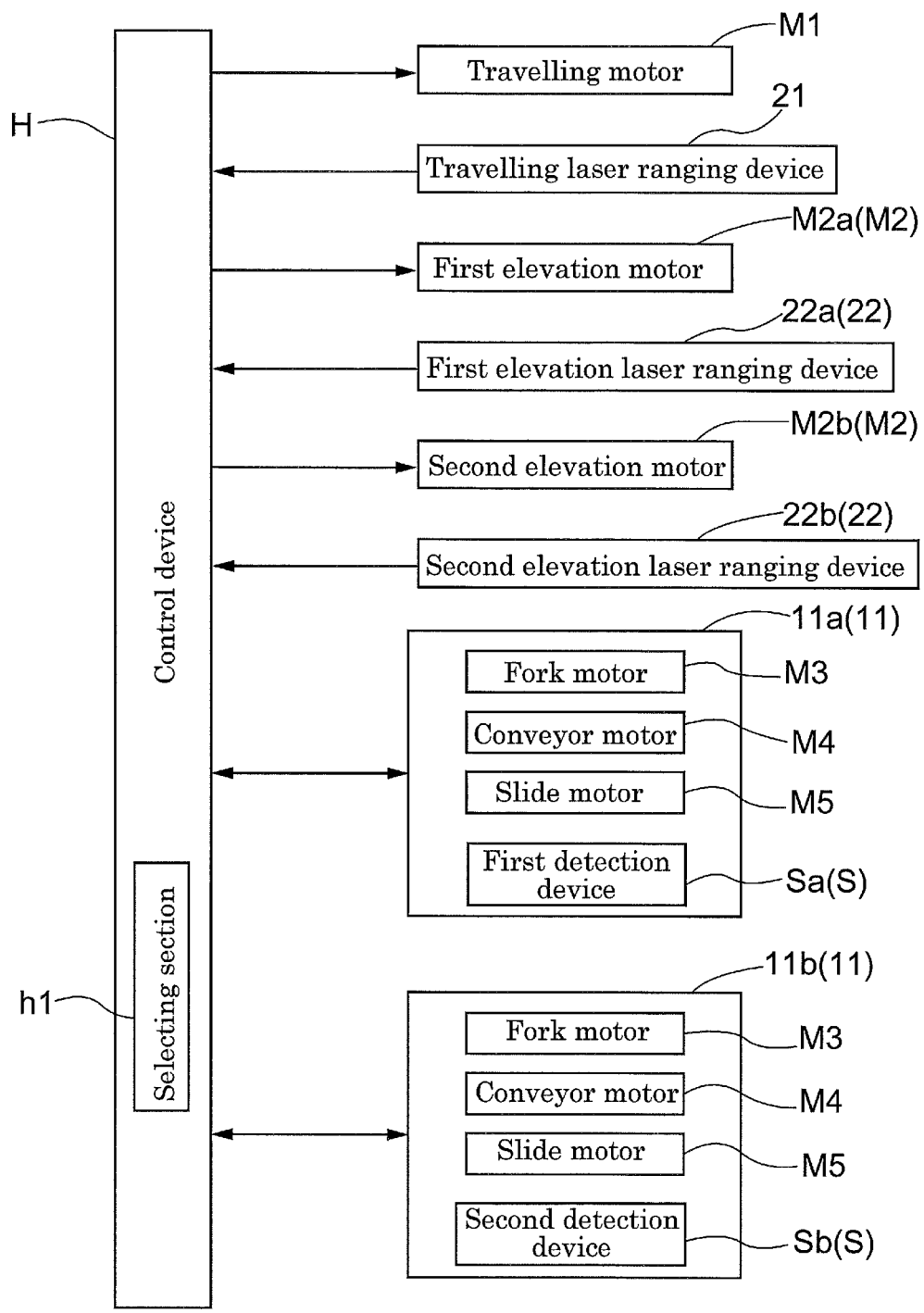
FIG. 11 is a control block diagram.

As shown in FIG. 11, the stacker crane 3 is provided with: a travelling laser ranging device 21 for detecting the travelling position of the travelling carriage 8; travelling motors M1 serving as a travelling drive section that causes the travelling carriage 8 to travel along a travelling direction; elevation laser ranging devices 22 for detecting the elevation positions of the elevator bodies 10; and elevation motors M2 serving as elevation drive sections that cause the elevator bodies 10 to move up/down along the vertical direction relative to the travelling carriage 8.

As shown in FIG. 3 and FIG. 4, the stacker crane 3 is provided with, as the elevator bodies 10: a first elevator body 10a that is guided and supported by the first mast 14a so as to be able to move up/down; and a second elevator body 10b that is able to move up/down independently of the first elevator body 10a and that is aligned with the first elevator body 10a in the rack width direction in plan view. The first elevator body 10a and the second elevator body 10b are arranged on both sides of the elevation guide mast 9 in the rack width direction, with the elevation guide mast 9 interposed therebetween.

The stacker crane 3 is provided with: the first transferring device 11a that is supported by the first elevator body 10a; and the second transferring device 11b that is supported by the second elevator body 10b, as the transferring devices 11. The first transferring device 11a and the second transferring device 11b are each configured to be able to support two articles W aligned in the rack front-rear direction.

The single stacker crane 3 is provided with: a first elevation laser ranging device 22a for detecting the elevation position of the first elevator body 10a; and a second elevation laser ranging device 22b for detecting the elevation position of the second elevator body 10b, as the elevation laser ranging devices 22.

The single stacker crane 3 is also provided with: a first elevation motor M2a that causes the first elevator body 10a to move up/down relative to the travelling carriage 8; and a second elevation motor M2b that causes the second elevator body 10b to move up/down relative to the travelling carriage 8, as the elevation motors M2.

The stacker crane 3 is configured to be able to cause the travelling carriage 8 to travel along the rack width direction by driving and rotating travelling wheels 24 that are each in contact with a guide rail 23 provided along the longitudinal direction of the travel path R, using the travelling motors M1.

Also, the stacker crane 3 is configured to cause the first elevator body 10a to move up/down by driving and rotating a winding drum (not shown in the drawings) that winds a wire (not shown in the drawings) coupled to the first elevator body 10a, using the first elevation motor M2a, and to cause the second elevator body 10b to move up/down by driving and rotating a winding drum (not shown in the drawings) that winds a wire (not shown in the drawings) coupled to the second elevator body 10b, using the second elevation motor M2b.

In this way, the stacker crane 3 is configured to cause the first elevator body 10a to move up/down by driving the first elevation motor M2a, and to cause the second elevator body 10b to move up/down by driving the second elevation motor M2b, thereby causing the first elevator body 10a and the second elevator body 10b to independently move up/down.

Thus, the stacker crane 3 is configured to be able to simultaneously transfer articles W to/from a pair of storage sections 1 belonging to the same row, by moving the first elevator body 10a and the second elevator body 10b up/down to the same level, and transferring the articles W using the first transferring device 11a and the second transferring device 11b.

Also, the stacker crane 3 is configured to be able to simultaneously transfer articles W to/from a pair of storage sections 1 belonging to different rows, by transferring the articles W using the first transferring device 11a and the second transferring device 11b, with the first elevator body 10a and the second elevator body 10b located at different levels.

The stacker crane 3 is provided with: a first sliding device 12a that is supported by the first elevator body 10a; and a second sliding device 12b that is supported by the second elevator body 10b, as the sliding devices 12.

The first sliding device 12a is configured to move the first transferring device 11a along the rack width direction relative to the first elevator body 10a, and the second sliding device 12b is configured to move the second transferring device 11b along the rack width direction relative to the second elevator body 10b.

A configuration is adopted in which the distance between the first transferring device 11a and the second transferring device 11b in the rack width direction can be changed and adjusted, by moving the first transferring device 11a in the rack width direction relative to the first elevator body 10a, using the first sliding device 12a, and moving the second transferring device 11b in the rack width direction relative to the second elevator body 10b, using the second sliding device 12b.

Transferring Devices and Sliding Devices

Figure 5:
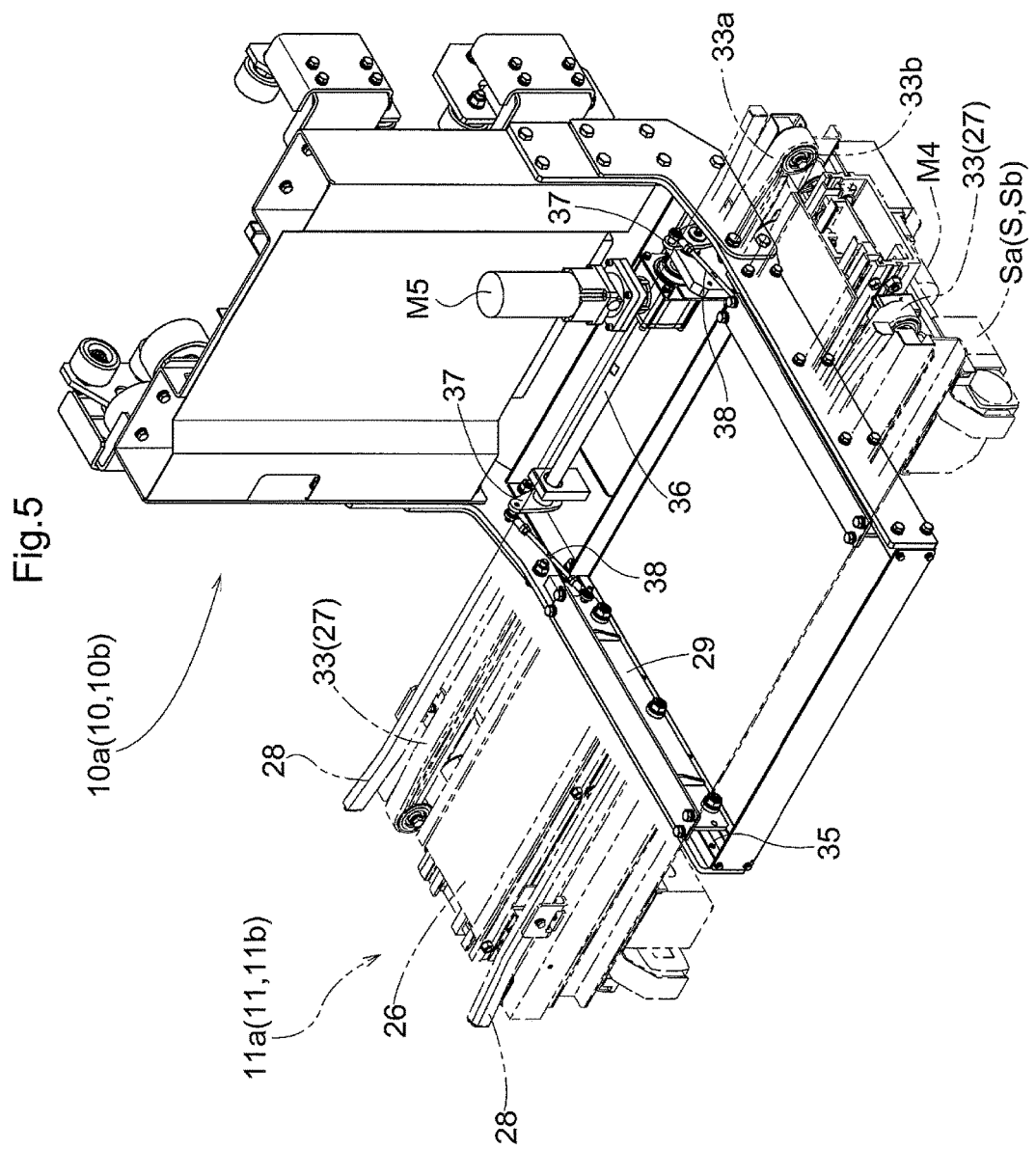
FIG. 5 is a perspective view showing an elevator body and a transferring device.
Figure 6:
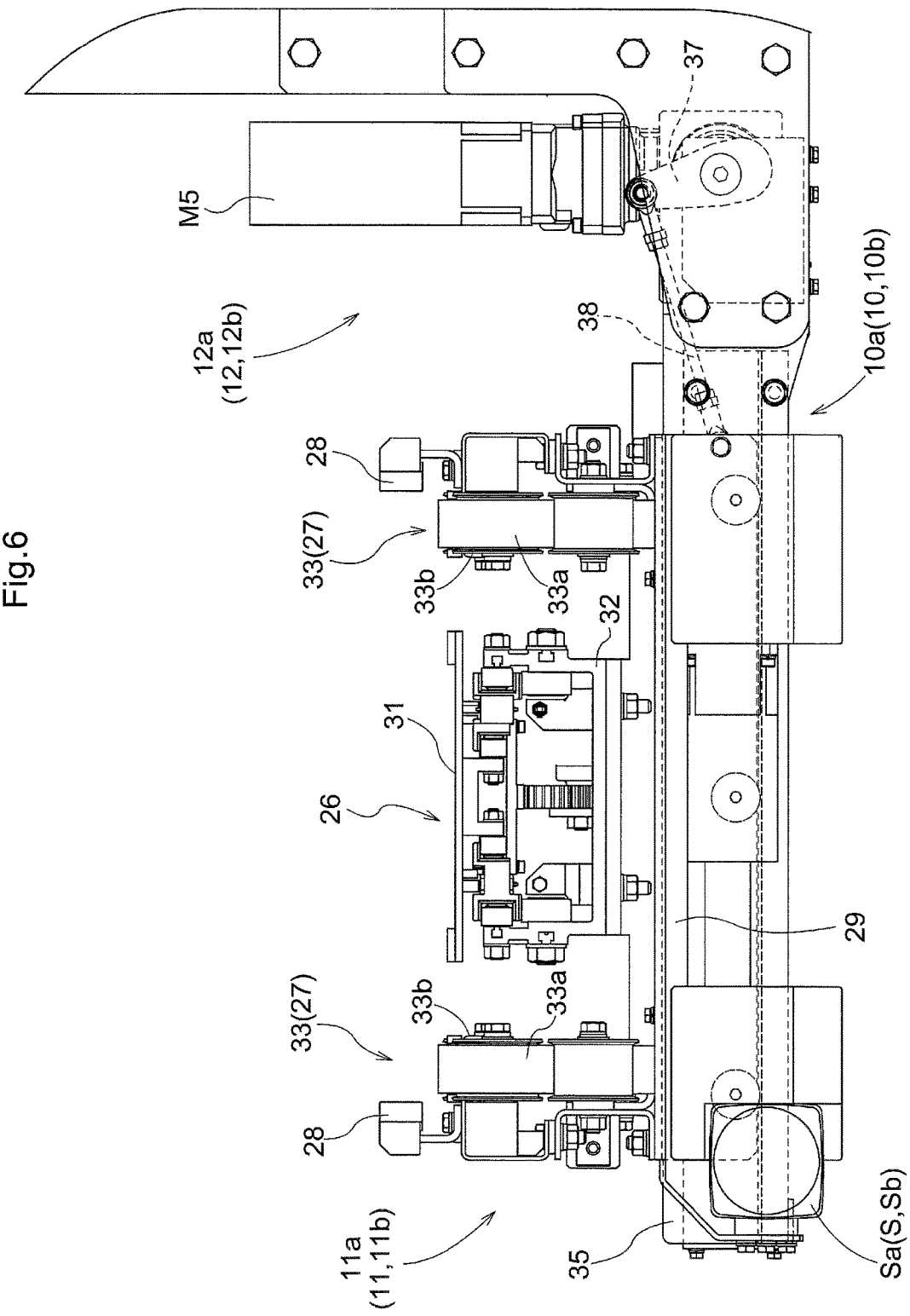
FIG. 6 is a front view showing the elevator body and the transferring device.

Next, an additional description is given of the transferring devices 11 and the sliding devices 12 with reference to FIG. 5 and FIG. 6. Since the pair of the first transferring device 11a and the second transferring device 11b, and the pair of the first sliding device 12a and the second sliding device 12b, are each configured to be symmetrical in the rack width direction, the following describes the first transferring device 11a and the first sliding device 12a, and descriptions of the second transferring device 11b and the second sliding device 12b are omitted.

As shown in FIG. 5 and FIG. 6, the first transferring device 11a is provided with: a fork device 26; conveyor devices 27; guide bodies 28 that come into contact with and guide articles W along the rack front-rear direction; and a supporting frame 29 that supports the fork device 26, the conveyor devices 27, and the guide bodies 28.

The fork device 26 is provided with: a placement section 31 on which a central portion of an article W in the rack width direction is placed and supported; and a fork motor M3 (see FIG. 11) that moves the placement section 31 back and forth along the rack front-rear direction relative to a base portion 32 of the fork device 26.

Figure 7:
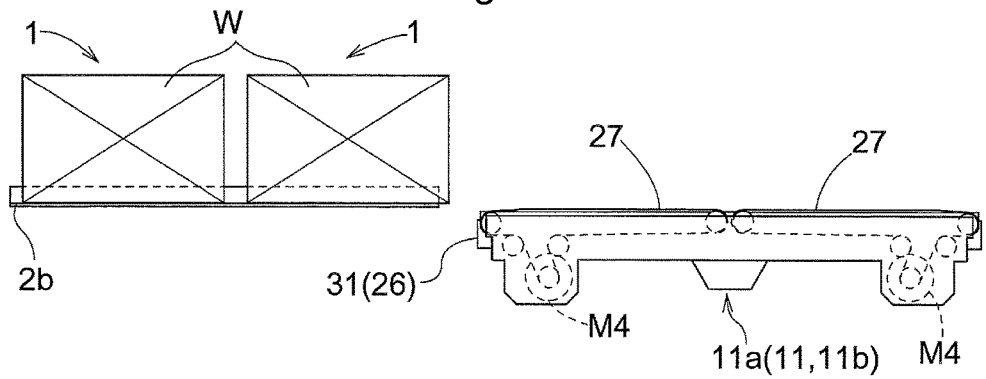
FIG. 7 illustrates operations in scoop control.

A pair of conveyor devices 27 are provided along the rack front-rear direction (see FIG. 7). The pair of conveyor devices 27 are each provided with: a pair of conveyor sections 33 that are disposed with a distance therebetween in the rack width direction such that both end portions of an article W in the rack width direction are respectively placed and supported thereon; and a conveyor motor M4 (see FIG. 11) that drives and rotates the pair of conveyor sections 33 in the forward and reverse directions.

Figure 10:
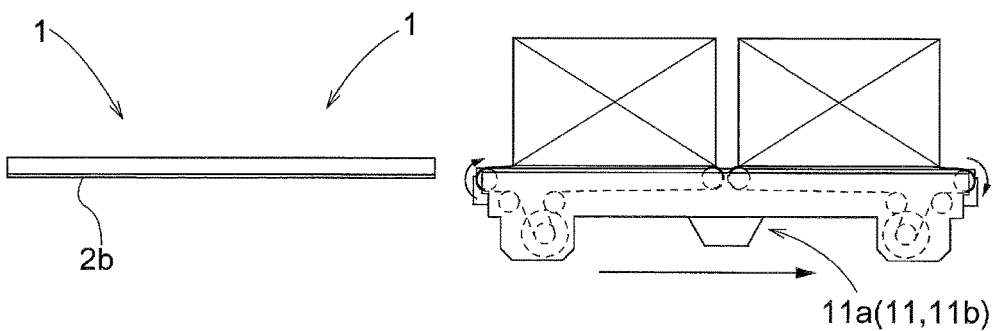
FIG. 10 illustrates operations in the scoop control.

In the situation where two articles W are placed and supported on the first transferring device 11a as shown in FIG. 10, the articles W are respectively placed and supported on the pair of conveyor devices 27.

As shown in FIG. 6, the fork device 26 is provided such that the upper surface of the placement section 31 is located lower than the upper surfaces of the conveyor devices 27. More specifically, a pulley 33b that winds a belt 33a is provided at both ends of each conveyor section 33 in the rack front-rear direction, and the upper surface of the placement section 31 is located higher than the rotation shafts of the pullies 33b and lower than the upper surfaces of the belts 33a of the conveyor sections 33 by approximately the thickness (5 mm) of the belts 33a.

Since the upper surface of the placement section 31 is located lower than the upper surfaces of the conveyor sections 33 in this way, when articles W in the horizontal position are placed and supported on the pair of conveyor sections 33 as shown in FIG. 10, the articles W are not supported by the placement section 31.

Figure 9:
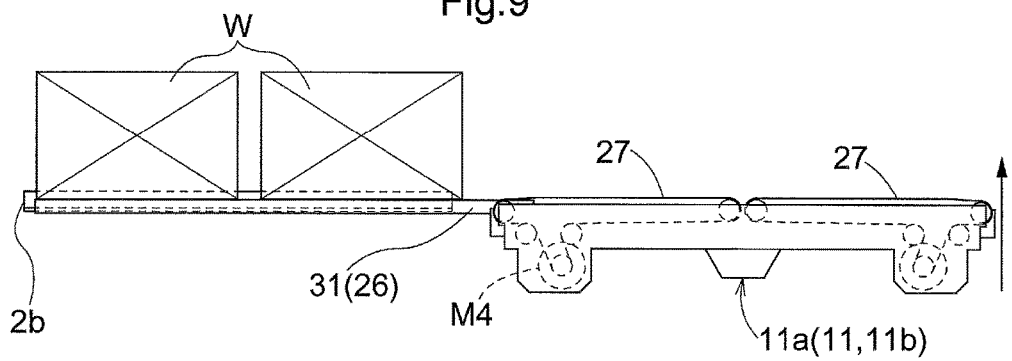
FIG. 9 illustrates operations in the scoop control.

In the situation where articles W are placed and supported on the placement section 31 at a protruding position as shown in FIG. 9, the first transferring device 11a moves the placement section 31 from the protruding position so that the placement section 31 retracts, and drives the conveyor devices 27 so that the articles W placed on the conveyor devices 27 are transported toward a retracting side in the rack front-rear direction, which is the side toward which the placement section 31 retracts. As a result of the fork device 26 and the conveyor devices 27 being driven in this way, the placement section 31, on which articles W are placed and supported, moves toward the retracting side in the rack front-rear direction, and an article W on the placement section 31 comes into contact with an end portion of the conveyor devices 27. Then, the articles W runs onto the conveyor devices 27 due to the retracting movement of the fork device 26 and the transport operations of the conveyor devices 27, and the articles W on the conveyor devices 27 are thereafter transported by the conveyor devices 27 as shown in FIG. 10, and the placement section 31, on which no articles W are placed or supported, retracts to the retracted position.

Also, in the situation where articles W are placed and supported on the conveyor devices 27 as shown in FIG. 10, the first transferring device 11a moves the placement section 31 from the retracted position so that the placement section 31 protrudes, and drives the conveyor devices 27 so that the articles W placed on the conveyor devices 27 are transported toward a protrusion side in the rack front-rear direction, which is the side toward which the placement section 31 protrudes. As a result of the fork device 26 and the conveyor devices 27 being driven in this way, the placement section 31, on which no articles W are placed and supported, moves and protrudes, and the articles W placed on the conveyor sections 33 are transported toward the protrusion side. Then, the articles W placed on and transported by the conveyor devices 27 fall off from the end portion of the conveyor devices 27 and move onto the placement section 31, and thereafter, as shown in FIG. 9, the placement section 31, on which the articles W are placed, moves to the protruding position so as to protrude.

Incidentally, in the situation where two articles W are respectively placed and supported on the pair of conveyor devices 27 as shown in FIG. 10, it is possible to transport only the article W on the conveyor device 27 on the protrusion side to the placement section 31 of the fork device 26, with one article W left on the conveyor device 27 on the retracting side, by operating only the conveyor device 27 on the protrusion side, out of the pair of conveyor devices 27.

Also, in the situation where only one article W is placed and supported on the pair of conveyor devices 27, it is possible to transport the article W on the conveyor devices 27 between the pair of conveyor devices 27, and to switch the position of the article W to a position on one of the conveyor devices 27 and a position on the other one of the conveyor devices 27, by operating the pair of conveyor devices 27 to transport the article W.

In this way, the pair of conveyor devices 27 are provided with: a transferring function, which is the function of transferring an article W to/from a storage section 1 in cooperation with the fork device 26; and a position switching function, which is the function of switching the position of an article W on the first transferring device 11a.

As shown in FIG. 5 and FIG. 6, the supporting frame 29 of the first transferring device 11a is supported by guide rails 35 of the first elevator body 10a so as to be movable along the rack width direction. The first sliding device 12a is configured with: a slide motor M5 that is supported by the first elevator body 10a; swing members 37 that are coupled to an output shaft 36 of the slide motor M5 and that swing about the shaft center of the output shaft 36; and coupling members 38 by which the swing members 37 are interlocked with and coupled to the supporting frame 29.

The first sliding device 12a is configured to move the supporting frame 29 along the rack width direction, and to slide the entirety of the first transferring device 11a in the rack width direction relative to the first elevator body 10a, by driving the slide motor M5 to drive and rotate the output shaft 36 and swing the swing members 37, and pushing and pulling the supporting frame 29, using the coupling members 38.

In this way, the first transferring device 11a is operated by the first sliding device 12a to move along the rack width direction relative to the first elevator body 10a. Similarly, the second transferring device 11b is operated by the second sliding device 12b to move along the rack width direction relative to the second elevator body 10b.

The range of the movement of the first transferring device 11a caused by the first sliding device 12a, and the range of the movement of the second transferring device 11b caused by the second sliding device 12b, are set such that the sum of the ranges of movement is smaller than the separation distance between a pair of storage sections 1 that are adjacent to each other in the rack width direction.

Specifically, in the present embodiment, the separation distance between a pair of storage sections 1 that are adjacent to each other in the rack width direction, i.e., the distance from the central position of a storage section 1 in the rack width direction to the central position, in the rack width direction, of a next storage section 1 that is adjacent to the aforementioned storage section 1 in the rack width direction, is 440 mm. The range of the movement of the first transferring device 11a caused by the first sliding device 12a, and the range of the movement of the second transferring device 11b caused by the second sliding device 12b, are each 100 mm, and the sum (200 mm) of the range of the movement of the first transferring device 11a caused by the first sliding device 12a and the range of the movement of the second transferring device 11b caused by the second sliding device 12b is approximately half the separation distance between a pair of storage sections 1 that are adjacent to each other in the rack width direction.

A standard stopping position for the first transferring device 11a is set at the center of the range of the movement of the first transferring device 11a caused by the first sliding device 12a, and a standard stopping position for the second transferring device 11b is set at the center of the range of the movement of the second transferring device 11b caused by the second sliding device 12b.

In the situation where the first transferring device 11a and the second transferring device 11b are located at their respective standard stopping positions, the separation distance between the first transferring device 11a and the second transferring device 11b in the rack width direction is four times the separation distance between a pair of storage sections 1 that are adjacent to each other in the rack width direction. Therefore, when the storage section 1 to which the first transferring device 11a transfers an article W is defined as a first target storage section 1a, and the storage section 1 to which the second transferring device 11b transfers an article W is defined as a second target storage section 1b, if the second target storage section 1b is a storage section 1 that belongs to the fourth OP-side column from the column to which the first target storage section 1a belongs, the stacker crane 3 is able to simultaneously transfer the articles W to/from the first target storage section 1a and to/from the second target storage section 1b.

Each transport conveyor 4 is provided with a pair of transferring sections 5, namely the first transferring section 5a and the second transferring section 5b, aligned in the rack width direction, and in the situation where the first transferring device 11a and the second transferring device 11b are stopped at their respective standard stopping positions, the separation distance between the first transferring section 5a and the second transferring section 5b in the rack width direction is the same as the separation distance between the first transferring device 11a and the second transferring device 11b in the rack width direction. Therefore, in the situation where the first transferring device 11a and the second transferring device 11b are stopped at their respective standard stopping positions, it is possible to simultaneously perform the transfer of an article W to/from the first transferring section 5a, using the first transferring device 11a, and the transfer of an article W to/from the second transferring section 5b, using the second transferring device 11b.

The separation distance between the first transferring device 11a and the second transferring device 11b in the situation where the first transferring device 11a and the second transferring device 11b have been moved by the first sliding device 12a and the second sliding device 12b so as to be closest to each other in the rack width direction in plan view is defined as a minimum separation distance. This minimum separation distance corresponds to "third distance". The separation distance between the first transferring device 11a and the second transferring device 11b in the situation where the first transferring device 11a and the second transferring device 11b have been moved by the first sliding device 12a and the second sliding device 12b so as to be farthest from each other in the rack width direction in plan view is defined as a maximum separation distance. This maximum separation distance corresponds to "fourth distance". Incidentally, the separation distance, D2, between the first transferring device 11a and the second transferring device 11b is the distance from the central position of the fork device 26 of the first transferring device 11a in the rack width direction to the central position of the fork device 26 of the second transferring device 11b in the rack width direction, in plan view.

The stacker crane 3 is provided with detection devices S that are each supported by the corresponding elevator body 10 and detect the positions of the detection target sections T in the rack width direction and the vertical direction relative to the corresponding transferring device 11. Each detection device S is configured with an imaging device that captures an image of the detection target sections T and transmits the captured image's information to a control device H.

The first transferring device 11a and the second transferring device 11b are each provided with a pair of detection devices S supported thereon, namely a detection device S for detecting the detection target sections T provided for the load transport conveyor 4 and one article storage rack 2 out of a pair of article storage racks 2, and a detection device S for detecting the detection target sections T provided for the unload transport conveyor 4 and the other article storage rack 2 out of the pair of article storage racks 2.

Since the detection devices S are supported by the transferring devices 11, the pair of detection devices S provided for the first transferring device 11a move integrally with the first transferring device 11a, and the pair of detection devices S provided for the second transferring device 11b move integrally with the second transferring device 11b.

The installation positions and the imaging ranges of the detection devices S are set such that, in the situation where a transferring device 11 is located at a target stopping position that is set in advance relative to a storage section 1, the detection devices S provided for the transferring device 11 are able to capture an image of the detection target sections T.

Figure 8:
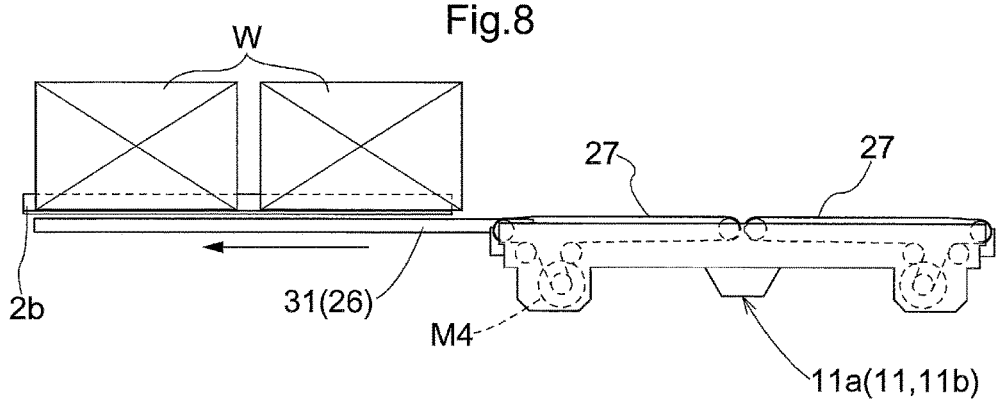
FIG. 8 illustrates operations in the scoop control.

More specifically, target stopping positions are set in advance relative to each of the plurality of storage sections 1 provided in the pair of article storage racks 2, and to each of the pair of transferring sections 5 provided for each of the pair of transport conveyors 4. A target stopping position for scooping (see FIG. 7 and FIG. 8), at which a transferring device 11 is stopped when an article W is transferred from a storage section 1 or a transferring section 5 to the transferring device 11, and a target stopping position for discharging (see FIG. 9 and FIG. 10), that is set higher than the target stopping position for scooping by a pre-set amount and at which a transferring device 11 is stopped when an article W is transferred from the transferring device 11 to a storage section 1 or a transferring section 5, are set in advance as the target stopping positions.

Therefore, situations in which a transferring device 11 is located at a target stopping position include a situation in which the transferring device 11 is located at the target stopping position for scooping and a situation in which the transferring device 11 is located at the target stopping position for discharging. The installation positions of the detection devices S and the imaging ranges of the detection devices S are set so that the detection devices S are able to capture images of the positions of the detection target sections T in any of these situations.

Note that the pair of detection devices S provided for the first transferring device 11a are referred to as first detection devices Sa, and the pair of detection devices S provided for the second transferring device 11b are referred to as second detection devices Sb in some cases.

Control with Control Device

The stacker crane 3 is provided with the control device H that controls the operations of the stacker crane 3. Note that the technical features of the control device H disclosed in the present Description are also applicable to a method for controlling the article transport facility, and such a method for controlling the article transport facility is also disclosed in the present Description. For example, a description stating that the control device H performs a first movement control means that a method (a method for controlling the article transport facility) including the step of performing the first movement control (a first moving step) is disclosed in the present Description. Similarly, a method including the step of performing a second movement control (a second moving step), a method including the step of performing a third movement control (a third moving step), the step of performing a simultaneous transfer control (a simultaneous transfer step), and so on are also disclosed in the present Description.

The control device H is configured to perform a loading process, which is the process of controlling the operations of the stacker crane 3 so that an article W is transported from a transferring section 5 of the load transport conveyor 4 to a storage section 1 in the article storage racks 2, based on a load instruction provided by a host controller, and to perform an unloading process, which is the process of controlling the operations of the stacker crane 3 so that an article W is transported from a storage section 1 in the article storage racks 2 to a transferring section 5 of the unload transport conveyor 4, based on an unload instruction provided by the host controller.

The stacker crane 3 is provided with a selecting section h1 that selects, from among the plurality of storage sections 1, two storage sections 1 to/from which articles W can be simultaneously transferred by the first transferring device 11a and the second transferring device 11b (i.e., two storage sections 1 that are located such that a separation distance D3 therebetween in the rack width direction is no smaller than a minimum separation distance and no greater than a maximum separation distance, and that are located at the same level or different levels), as the first target storage section 1a and the second target storage section 1b. Here, the minimum separation distance is a minimum separation distance between the first transferring device 11a and the second transferring device 11b moved by the first sliding device 12a and the second sliding device 12b, and the maximum separation distance is a maximum separation distance between the first transferring device 11a and the second transferring device 11b moved by the first sliding device 12a and the second sliding device 12b. The minimum separation distance and the maximum separation distance are determined according to the range of the movement of the first transferring device 11a caused by the first sliding device 12a and the range of the movement of the second transferring device 11b caused by the second sliding device 12b. The selecting section h1 is provided in the form of a program for the control device H, and the control device H also serves as the selecting section h1.

The control device H performs a first transfer control, which is performed in a situation where the first transferring device 11a is located at the first target stopping position, a second transfer control, which is performed in a situation where the second transferring device 11b is located at the second target stopping position, and the simultaneous transfer control by which the first transfer control and the second transfer control are simultaneously performed.

The first transfer control includes: a first discharge transfer control (corresponding to a first storage transfer control) by which the first transferring device 11a is controlled so that one or two articles W are transferred from the first transferring device 11a to the first target storage section 1a; and a first scoop transfer control (corresponding to a first take-out transfer control) by which the first transferring device 11a is controlled so that one or two articles W are transferred from the first target storage section 1a to the first transferring device 11a.

The second transfer control includes: a second discharge transfer control (corresponding to a second storage transfer control) by which the second transferring device 11b is controlled so that one or two articles W are transferred from the second transferring device 11b to the second target storage section 1b; and a second scoop transfer control (corresponding to a second take-out transfer control) by which the second transferring device 11b is controlled so that one or two articles W are transferred from the second target storage section 1b to the second transferring device 11b.

During the loading process, the control device H performs selection control for loading, idle movement control for loading, scoop transfer control for loading, actual movement control for loading, and discharge transfer control for loading.

During the unloading process, the control device H performs selection control for unloading, idle movement control for unloading, scoop transfer control for unloading, actual movement control for unloading, and discharge transfer control for unloading.

First, a description is given of each kind of control in the loading process.

Selection control for loading is control performed to select a target storage section to which an article W is to be stored, based on a load instruction.

More specifically, in selection control for loading, in the case of dual loading in which an article W is loaded from both of the pair of transferring sections 5 of the load transport conveyor 4 for example, two target storage sections, namely the first target storage section 1a and the second target storage section 1b, are selected from among the plurality of storage sections 1, based on a load instruction. Also, in selection control for loading, in the case of single loading in which an article W is loaded from only one of the pair of transferring sections 5 of the load transport conveyor 4, one target storage section is selected from among the plurality of storage sections 1.

In selection control for loading, in the case where two target storage sections, namely the first target storage section 1a and the second target storage section 1b, are selected from among the plurality of storage sections 1, two storage sections 1 in a positional relationship that allows simultaneous transfer are preferentially selected as the first target storage section 1a and the second target storage section 1b, and if two storage sections 1 in a positional relationship that allows simultaneous transfer are not present, two target storage sections in a positional relationship that does not allow simultaneous transfer are selected.

If there are plurality of pairs of the first target storage section 1a and the second target storage section 1b in a positional relationship that allows simultaneous transfer, a pair located on the HP side, a pair at a low position, or the like is preferentially selected. In this way, in selection control for loading, two target storage sections that allow simultaneous transfer, which reduces the time required for the movement control, are preferentially selected.

Incidentally, a positional relationship that allows simultaneous transfer is a positional relationship in which the second target storage section 1b belongs to the fourth column from the column to which the first target storage section 1a belongs.

Next, a description is given of a situation in which, in the case of dual loading, articles W are stored by selecting two target storage sections, namely the first target storage section 1a and the second target storage section 1b, and in the case of single loading, an article W is stored by selecting one target storage section.

Idle movement control for loading is performed to control the operations of the stacker crane 3 to move a transferring device 11 that is not supporting an article W to the target stopping position for scooping corresponding to the load transport conveyor 4.

More specifically, in idle movement control for loading, in a situation where no article W is placed on either the first elevator body 10a or the second elevator body 10b, the operations of the stacker crane 3 are controlled so that the first transferring device 11a is moved to the target stopping position for scooping corresponding to the first transferring section 5a, and the second transferring device 11b is moved to the target stopping position for scooping corresponding to the second transferring section 5b.

Scoop transfer control for loading is performed to control the operations of the stacker crane 3 to transfer an article W from a transfer section 5 of the load transport conveyor 4 to a transfer device 11. Specifically, in scoop transfer control for loading, the operations of the stacker crane 3 are controlled so that, as shown in FIG. 7 to FIG. 10, first the placement section 31 is moved to the protruding position so as to protrude, then the transfer device 11 is moved up from the target stopping position for scooping to the target stopping position for discharging so as to scoop the article W, and thereafter the placement section 31 is moved to retract to the retracted position while the conveyor sections 33 is being operated, and the article W is transferred from the transfer section 5 to the transfer device 11.

In scoop transfer control for loading, in the case of dual loading, the operations of the stacker crane 3 are controlled so that an article W is transferred from the first transferring section 5a of the load transport conveyor 4 to the first transferring device 11a, and an article W is transferred from the second transferring section 5b of the load transport conveyor 4 to the second transferring device 11b.

In scoop transfer control for loading, in the case of single loading, the operations of the stacker crane 3 are controlled so that an article W is transferred from the first transferring section 5a of the load transport conveyor 4 to the first transferring device 11a, or an article W is transferred from the second transferring section 5b of the load transport conveyor 4 to the second transferring device 11b.

Actual movement control for loading is control performed to move a transferring device 11 to the target stopping position for discharging corresponding to the target storage section, with an article W being placed on at least one of the first elevator body 10a and the second elevator body 10b.

More specifically, in actual movement control for loading, in the case of dual loading where the first target storage section 1a and the second target storage section 1b are in a positional relationship that allows simultaneous transfer, the operations of the stacker crane 3 are controlled so that the first transferring device 11a is moved to the target stopping position for discharging corresponding to the first target storage section 1a, and the second transferring device 11b is moved to the target stopping position for discharging corresponding to the second target storage section 1b.

Also, in actual movement control for loading, in the case of dual loading where the first target storage section 1a and the second target storage section 1b are in a positional relationship that does not allow simultaneous transfer, the operations of the stacker crane 3 are controlled so that the first transferring device 11a is moved to the target stopping position for discharging corresponding to the first target storage section 1a, or the second transferring device 11b is moved to the target stopping position for discharging corresponding to the second target storage section 1b.

Also, in actual movement control for loading, in the case of single loading as well, the operations of the stacker crane 3 are controlled so that the first transferring device 11a is moved to the target stopping position for discharging corresponding to the first target storage section 1a, or the second transferring device 11b is moved to the target stopping position for discharging corresponding to the second target storage section 1b.

Discharge transfer control for loading is control performed to control the operations of the stacker crane 3 to transfer an article W from a transferring device 11 to a storage section 1. Specifically, in discharge transfer control for loading, the operations of the stacker crane 3 are controlled so that first the placement section 31 is moved to the protruding position so as to protrude, while the conveyor sections 33 is being operated, then the transferring device 11 is moved down from the target stopping position for discharging to the target stopping position for scooping so as to discharge the article W to the storage section 1, and thereafter the placement section 31 is moved to retract to the retracted position, and the article W is transferred from the transferring device 11 to the storage section 1.

More specifically, in discharge transfer control for loading, in the case of dual loading where the first target storage section 1a and the second target storage section 1b are in a positional relationship that allows simultaneous transfer, the operations of the stacker crane 3 are controlled so that an article W is transferred from the first transferring device 11a to the first target storage section 1a and an article W is transferred from the second transferring device 11b to the second target storage section 1b, by performing the simultaneous transfer control by which both the first discharge transfer control and the second discharge transfer control are simultaneously performed.

Also, in discharge transfer control for loading, in the case of dual loading where the first target storage section 1a and the second target storage section 1b are in a positional relationship that does not allow simultaneous transfer, the operations of the stacker crane 3 are controlled so that an article W is transferred from the first transferring device 11a to the first target storage section 1a by performing the first discharge transfer control, or so that an article W is transferred from the second transferring device 11b to the second target storage section 1b by performing the second discharge transfer control.

Also, in discharge transfer control for loading, in the case of single loading as well, the operations of the stacker crane 3 are controlled so that an article W is transferred from the first transferring device 11a to the first target storage section 1a by performing the first discharge transfer control, or so that an article W is transferred from the second transferring device 11b to the second target storage section 1b by performing the second discharge transfer control.

Next, a description is given of each kind of control in the unloading process. However, since the loading process and the unloading process merely differ in that the transport source and the transport destination of an article W are interchanged, a simple description is given of each kind of control in the unloading process.

Selection control for unloading is control performed to select a target storage section from which an article W is to be taken out, based on an unload instruction.

Idle movement control for unloading is performed to control the operations of the stacker crane 3 to move a transferring device 11 that is not supporting an article W to the target stopping position for scooping corresponding to a storage section 1.

Scoop transfer control for unloading is performed to control the operations of the stacker crane 3 so that an article W is transferred from a target storage section to a transferring device 11 by performing the first scoop transfer control, the second scoop transfer control, or the simultaneous transfer control by which both the first scoop transfer control and the second scoop transfer control are simultaneously performed.

Actual movement control for unloading is control performed to move a transferring device 11 to the target stopping position for discharging corresponding to a transferring section 5 of the unload transport conveyor 4, with an article W being placed on at least one of the first elevator body 10a and the second elevator body 10b.

Discharge transfer control for unloading is control performed to control the operations of the stacker crane 3 to transfer an article W from a transferring device 11 to a transferring section 5 of the unload transport conveyor 4.

Next, a description is given of the loading process and the unloading process, and in particular of the storing of an article W to a storage section 1 in the loading process and the taking out of an article W from a storage section 1 in the unloading process, with specific examples based on FIG. 20 to FIG. 41.

Note that in the description of the loading process and the unloading process based on FIG. 20 to FIG. 41, a load target article W to be transported from a transport conveyor 4 to a storage section 1 in the loading process is referred to as a load article W1, an unload target article W to be transported from a storage section 1 to a transport conveyor 4 in the unloading process is referred to as an unload article W2, and an article W that is not a load target or an unload target is referred to as a non-target article W3.

Also, in order to distinguish between the first target storage section 1a that is specified in selection control for loading and the first target storage section 1a that is specified in selection control for unloading, and between the second target storage section 1b that is specified in selection control for loading and the second target storage section 1b that is specified in selection control for unloading, storage sections 1 specified in selection control for unloading are referred to as a first target storage section 1a', second target storage section 1b', and so on, for example.

When dual loading is performed by the loading process, if two load articles W1 that are supported on the first transferring device 11a are to be stored to one storage section 1, one first target storage section 1a is selected by selection control for loading, and if two load articles W1 that are supported on the second transferring device 11b are to be stored to one storage section 1, one second target storage section 1b is selected by selection control for loading.

Incidentally, the first target storage section 1a and the second target storage section 1b selected at this time are each a storage section 1 in which no article W is stored at either the front side or the rear side.

Figure 20:
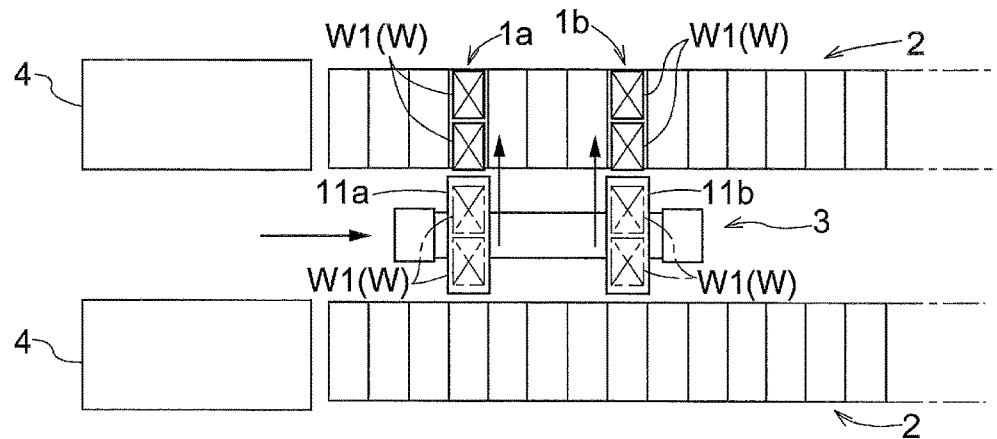
FIG. 20 is an action diagram showing an action performed at the time of simultaneously storing articles with a pair of transferring devices.

In the case where the first target storage section 1a and the second target storage section 1b selected by selection control for loading are in a positional relationship that allows simultaneous transfer, as shown in FIG. 20, actual movement control for loading is performed, and then the simultaneous transfer control (the first discharge transfer control and the second discharge transfer control serving as discharge transfer control for loading) is performed so that the transfer of the load articles W1 from the first transferring device 11a to the first target storage section 1a and the transfer of the load articles W1 from the second transferring device 11b to the second target storage section 1b are simultaneously performed.

Figure 21:
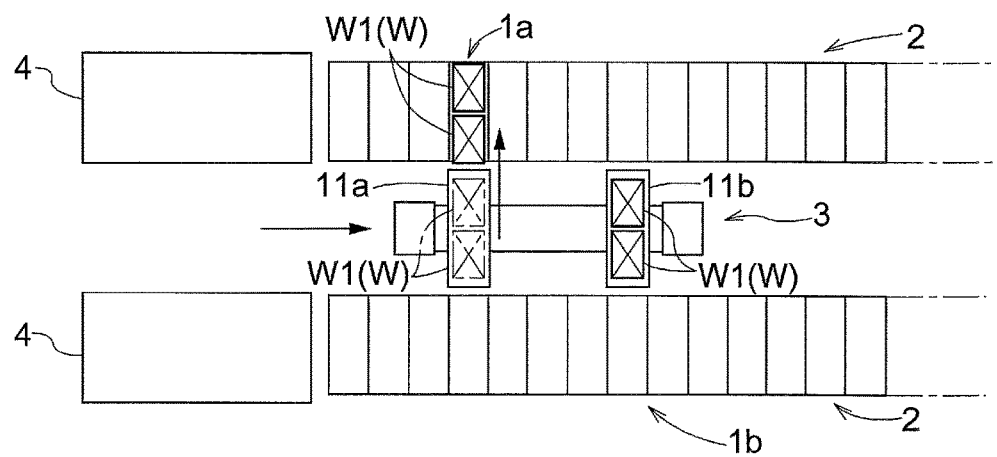
FIG. 21 is an action diagram (1) showing an action performed at the time of sequentially storing articles with the pair of transferring devices.
Figure 22:
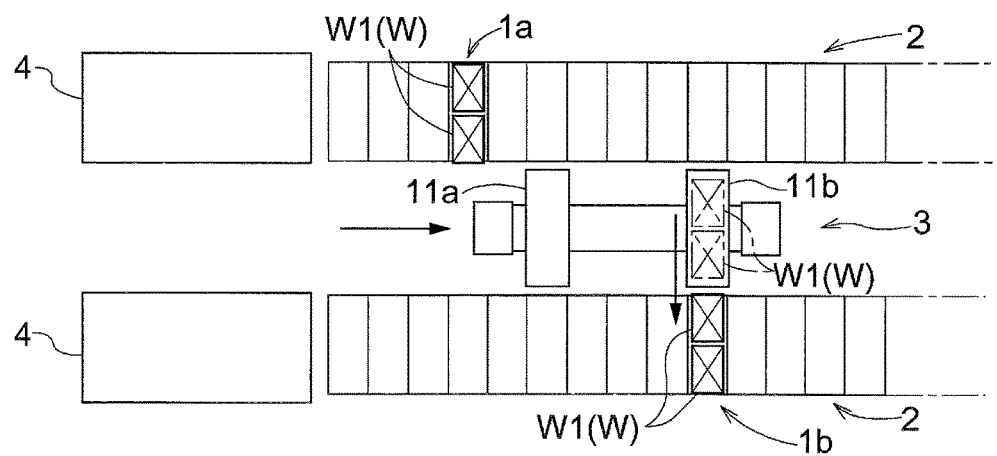
FIG. 22 is an action diagram (2) showing an action performed at the time of sequentially storing articles with the pair of transferring devices.

When dual loading is performed by the loading process, if the first target storage section 1a and the second target storage section 1b selected by selection control for loading are in a positional relationship that does not allow simultaneous transfer, first, as shown in FIG. 21, actual movement control for loading is performed, and thereafter the first discharge transfer control (or the second discharge transfer control) is performed as discharge transfer control for loading so that the load articles W1 are transferred from the first transferring device 11a (or the second transferring device 11b) to the first target storage section 1a (or the second target storage section 1b). Then, as shown in FIG. 22, the subsequent actual movement control for loading is performed, and thereafter the second discharge transfer control (or the first discharge transfer control) is performed as discharge transfer control for loading so that the load articles W1 are transferred from the second transferring device 11b (or the first transferring device 11a) to the second target storage section 1b (or the first target storage section 1a). In this way, the transfer of the load articles W1 from the first transferring device 11a to the first target storage section 1a and the transfer of the load articles W1 from the second transferring device 11b to the second target storage section 1b are sequentially performed.

When dual loading is performed by the loading process, if two load articles W1 that are supported on the first transferring device 11a are to be stored to different storage sections 1, two first target storage sections 1a are selected by selection control for loading, and if two load articles W1 that are supported on the second transferring device 11b are to be stored to different storage sections 1, two second target storage sections 1b are selected by selection control for loading. Incidentally, the first target storage section 1a and the second target storage section 1b selected at this time are each a storage section 1 in which no article W is stored at either the front side or the rear side, or a storage section 1 in which an article W is stored only on the rear side or only on the front side.

Then, actual movement control for loading and discharge transfer control for loading are repeatedly performed, and the two load articles W1 supported on the first transferring device 11a are stored to one or two first target storage sections 1a, and the two load articles W1 supported on the second transferring device 11b are stored to one or two second target storage sections 1b.

Figure 23:
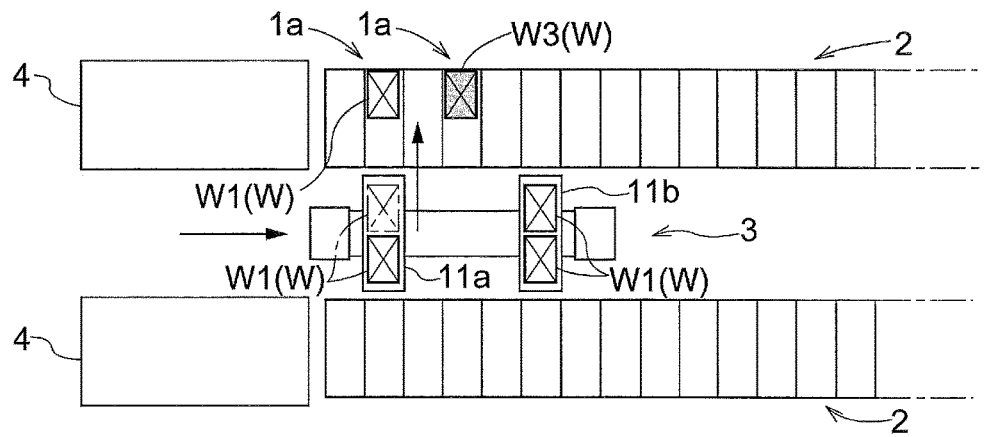
FIG. 23 is an action diagram (1) showing an action performed at the time of sequentially storing articles with one of the transferring devices.
Figure 24:
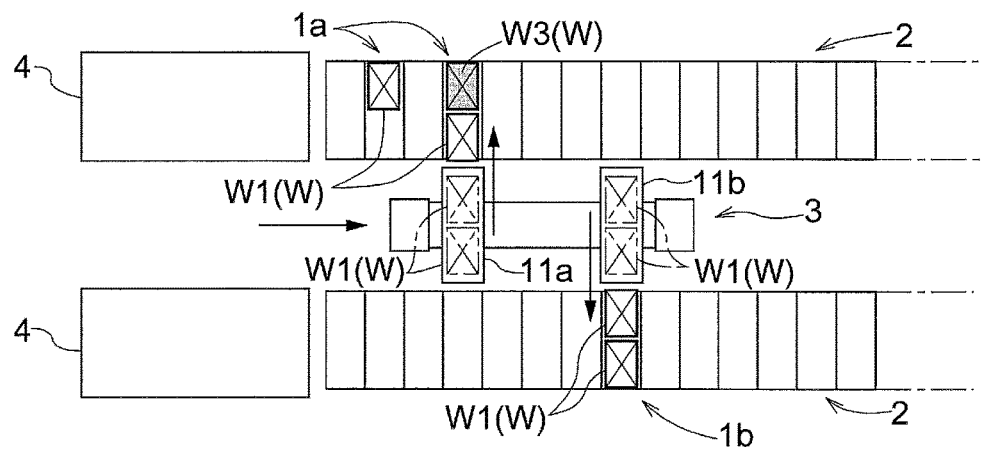
FIG. 24 is an action diagram (2) showing an action performed at the time of sequentially storing articles with one of the transferring devices.

Specifically, in the case where two load articles W1 supported on the first transferring device 11a are to be stored to different storage sections 1 and two load articles W1 supported on the second transferring device 11b are to be stored to one storage section 1 by the loading process for example, two first target storage sections 1a and one second target storage section 1b are selected by selection control for loading, and, as shown in FIG. 23 and FIG. 24, actual movement control for loading and discharge transfer control for loading are repeatedly performed so that the two load articles W1 supported on the first transferring device 11a are separately stored to the two first target storage sections 1a, and the two load articles W1 supported on the second transferring device 11b are both stored to the single second target storage section 1b.

When dual unloading is performed by the unloading process, if two unload articles W2 that are to be taken out onto the first transferring device 11a are taken out from one storage section 1, one first target storage section 1a' is selected by selection control for unloading, and if two unload articles W2 that are to be taken out onto the second transferring device 11b are taken out from one storage section 1, one second target storage section 1b' is selected by selection control for unloading. Incidentally, the first target storage section 1a' and the second target storage section 1b' selected at this time are each a storage section 1 in which an article W is stored at both the front side and the rear side.

Figure 25:
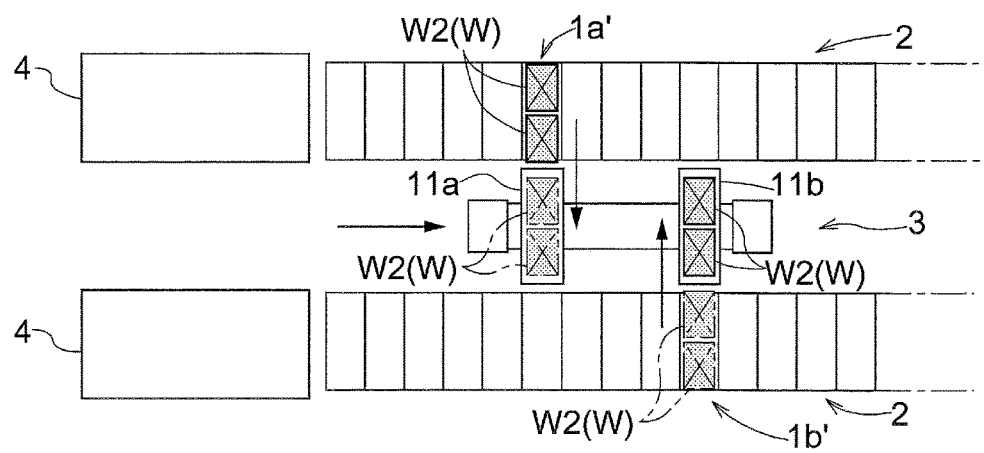
FIG. 25 is an action diagram showing an action performed at the time of simultaneously taking out articles with the pair of transferring devices.

In the case where the first target storage section 1*a*' and the second target storage section 1*b*' selected by selection control for unloading are in a positional relationship that allows simultaneous transfer, as shown in FIG. 25, idle movement control for unloading is performed, and then the simultaneous transfer control (the first scoop transfer control and the second scoop transfer control serving as scoop transfer control for unloading) is performed so that the transfer of the unload articles W2 from the first target storage section 1*a*' to the first transferring device 11*a* and the transfer of the unload articles W2 from the second target storage section 1*b*' to the second transferring device 11*b* are simultaneously performed.

Figure 26:
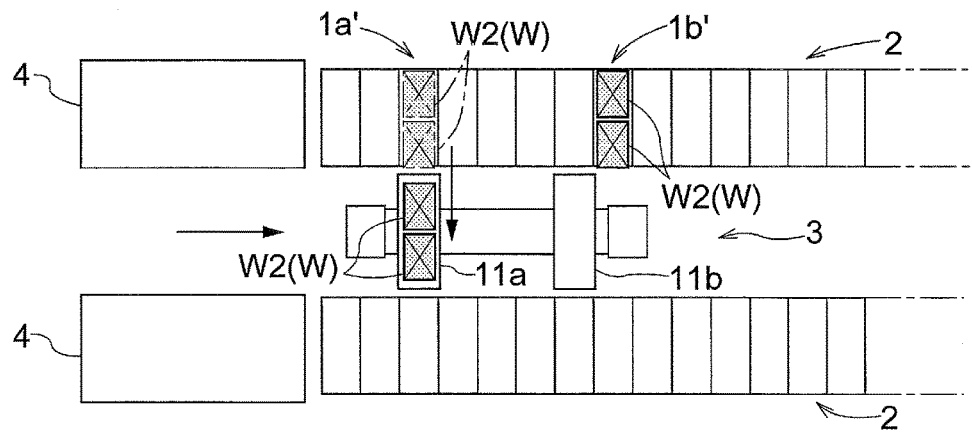
FIG. 26 is an action diagram (1) showing an action performed at the time of sequentially taking out articles with the pair of transferring devices.
Figure 27:
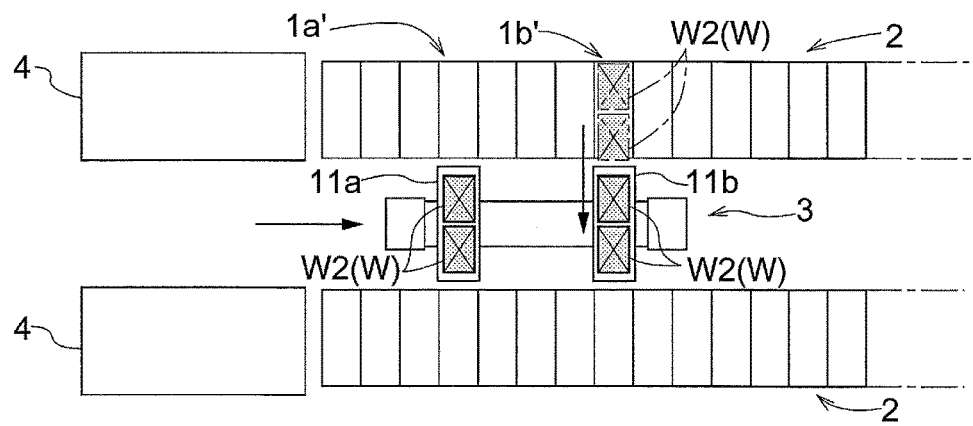
FIG. 27 is an action diagram (2) showing an action performed at the time of sequentially taking out articles with the pair of transferring devices.

When dual unloading is performed by the unloading process, if the first target storage section 1*a*' and the second target storage section 1*b*' selected by selection control for unloading are in a positional relationship that does not allow simultaneous transfer, first, as shown in FIG. 26, idle movement control for unloading is performed, and thereafter the first scoop transfer control (or the second scoop transfer control) is performed as scoop transfer control for unloading so that the unload articles W2 are transferred from the first target storage section 1*a*' (or the second target storage section 1*b*') to the first transferring device 11*a* (or the second transferring device 11*b*). Then, as shown in FIG. 27, the subsequent idle movement control for unloading is performed, and thereafter the second scoop transfer control (or the first scoop transfer control) is performed as scoop transfer control for unloading so that the unload articles W2 are transferred from the second target storage section 1*b*' (or the first target storage section 1*a*') to the second transferring device 11*b* (or the first transferring device 11*a*). In this way, the transfer of the unload articles W2 from the first target storage section 1*a*' to the first transferring device 11*a* and the transfer of the unload articles W2 from the second target storage section 1*b*' to the second transferring device 11*b* are sequentially performed.

When dual unloading is performed by the unloading process, if one unload article W2 is to be taken out from each of the two first target storage sections 1*a*' to the first transferring device 11*a*, two first target storage sections 1*a*' are selected by selection control for unloading, and if one unload article W2 is to be taken out from each of the two second target storage sections 1*b*' to the second transferring device 11*b*, two second target storage sections 1*b*' are selected by selection control for unloading. Incidentally, the first target storage section 1*a*' and the second target storage section 1*b*' selected at this time are each a storage section 1 in which an article W is stored at both the front side and the rear side, or a storage section 1 in which an article W is stored only at the rear side or only at the front side.

Then, idle movement control for unloading and scoop transfer control for unloading are repeatedly performed, and the one or two unload articles W2 stored in the first target storage sections 1*a*' are transferred to the first transferring device 11*a*, and the one or two unload articles W2 stored in the second target storage sections 1*b*' are transferred to the second transferring device 11*b*.

Figure 28:
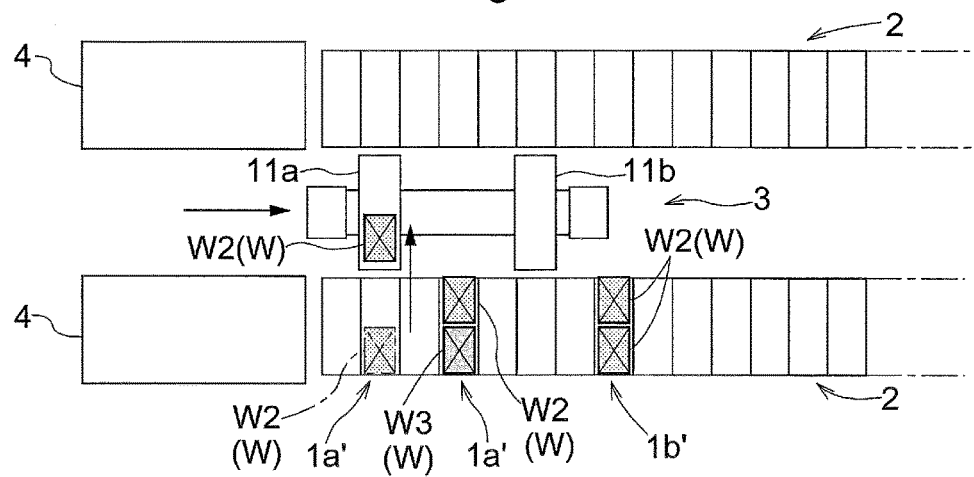
FIG. 28 is an action diagram (1) showing an action performed at the time of sequentially taking out articles with one of the transferring devices.
Figure 29:
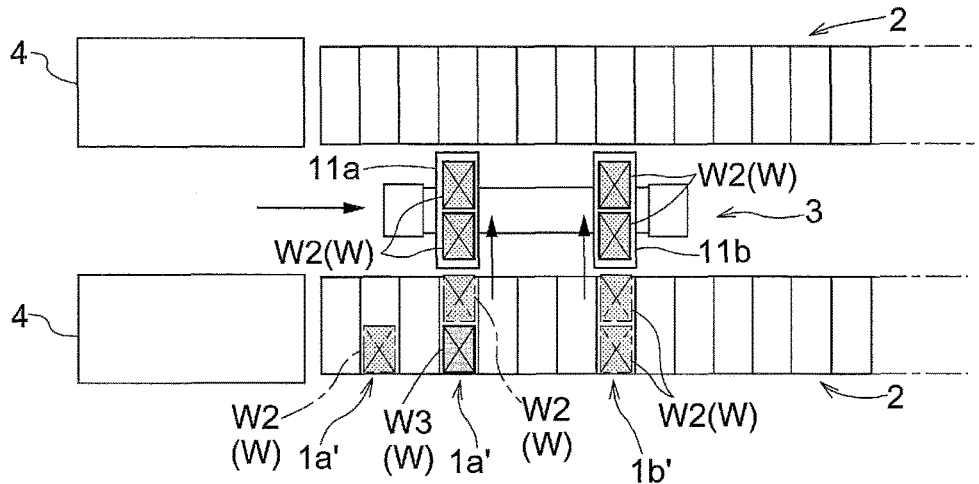
FIG. 29 is an action diagram (2) showing an action performed at the time of sequentially taking out articles with one of the transferring devices.

Specifically, in the case where one unload article W2 is transferred from each of the two first target storage sections 1*a*' to the first transferring device 11*a* and two unload articles W2 are transferred from one second target storage section 1*b*' to the second transferring device 11*b* by the unloading process for example, as shown in FIG. 28 and FIG. 29, two first target storage sections 1*a*' and one second target storage section 1*b*' are selected by selection control for unloading, and idle movement control for unloading and scoop transfer control for unloading are repeatedly performed so that the unload articles W2 are transferred from the two first target storage sections 1*a*' to the first transferring device 11*a* one by one, and the two unload articles W2 are transferred from the single second target storage section 1*b*' to the second transferring device 11*b*.

Regarding the loading process and the unloading process, there are cases in which execution of the unloading process starts after execution of the loading process is complete, and cases in which, first, the loading process starts and then execution of the unloading process starts before the loading process is complete.

The cases in which execution of the unloading process starts after the loading process is complete include, for example, a case in which the loading process is performed and all the load articles W1 to be loaded are stored to storage sections 1 by the loading process as shown in FIG. 20, and thereafter the unloading process is performed and all the unload articles W2 to be unloaded are taken out from storage sections 1 by the unloading process as shown in FIG. 25.

Figure 30:
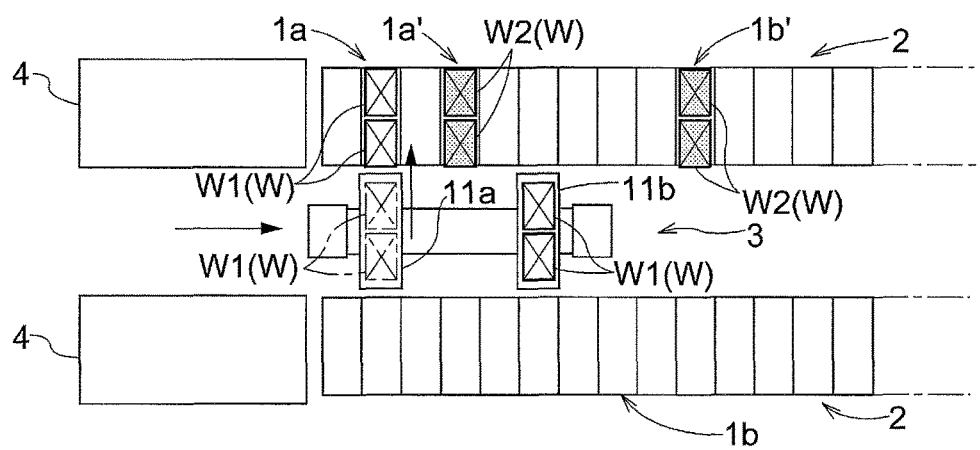
FIG. 30 is an action diagram (1) showing an action performed at the time of starting taking out of articles by an unloading process before the articles have been stored by a storage process.

The cases in which, first, the loading process starts and then execution of the unloading process starts before the loading process is complete include, for example, a case in which, when the first target storage section 1*a* and the second target storage section 1*b* are in a positional relationship that does not allow simultaneous transfer in the loading process, and the first target storage section 1*a*' and the second target storage section 1*b*' are in a positional relationship that does not allow simultaneous transfer in the unloading process as shown in FIG. 30, first, the load articles W1 that are supported on one of the first transferring device 11*a* and the second transferring device 11*b* are stored to a storage section 1, and thereafter unload articles W2 are taken out from a storage section 1 to one of the first transferring device 11*a* and the second transferring device 11*b* before or at the same time as the load articles W1 supported on the other one of the first transferring device 11*a* and the second transferring device 11*b* are stored to a storage section 1.

Figure 31:
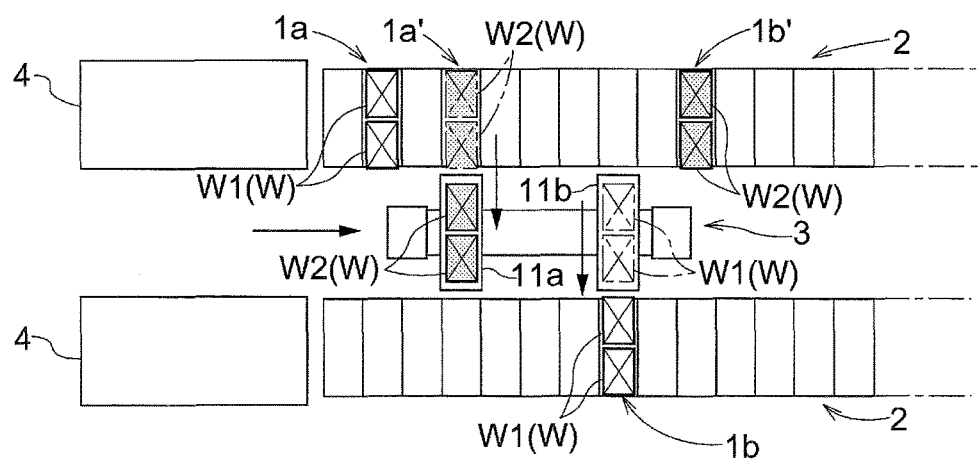
FIG. 31 is an action diagram (2) showing an action performed at the time of starting taking out of articles by the unloading process before the articles have been stored by the storage process.

The following describes an example of the cases in which, first, the loading process starts and then execution of the unloading process starts before the loading process is complete. As shown in FIG. 30 and FIG. 31, first, one first target storage section 1*a* and one second target storage section 1*b* are selected by selection control for loading, and one first target storage section 1*a*' and one second target storage section 1*b*' are selected by selection control for unloading.

Figure 32:
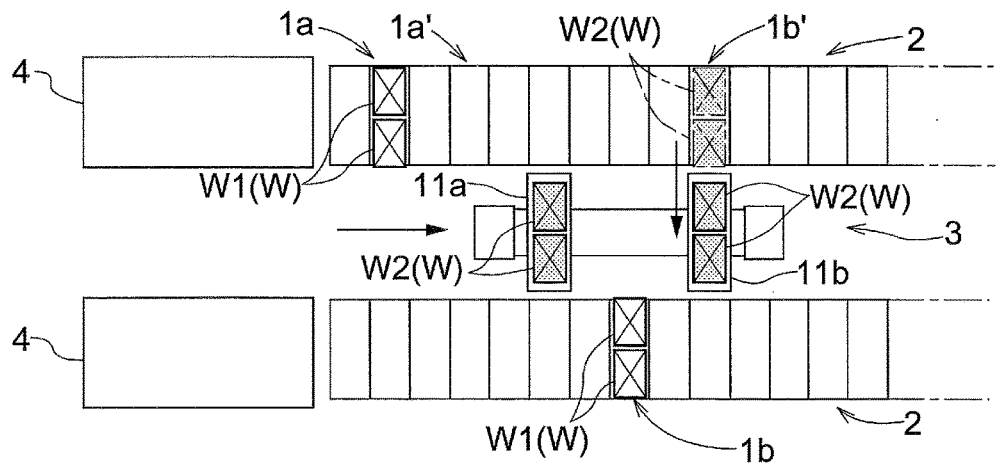
FIG. 32 is an action diagram (3) showing an action performed at the time of starting taking out of articles by the unloading process before the articles have been stored by the storage process.

Then, as shown in FIG. 30, actual movement control for loading is performed, and thereafter discharge transfer control for loading (the first discharge transfer control) is performed so that the storing of load articles W1, by which the two load articles W1 supported on the first transferring device 11*a* are transferred from the first transferring device 11*a* to the first target storage section 1*a*, is performed. Then, as shown in FIG. 31, movement control that serves as both actual movement control for loading and idle movement control for unloading is performed, and thereafter the simultaneous transfer control (discharge transfer control for loading (the second discharge transfer control) and scoop transfer control for unloading (the first scoop transfer control)) is performed so that the taking out of unload articles W2, by which the two unload articles W2 stored in the first target storage section 1*a*' are transferred from the first target storage section 1*a*' to the first transferring device 11*a*, and the storing of load articles W1, by which the two load articles W1 supported on the second transferring device 11*b* are transferred from the second transferring device 11*b* to the second target storage section 1*b*, are simultaneously performed. Subsequently, as shown in FIG. 32, idle movement control for unloading is performed, and thereafter scoop transfer control for unloading (the second scoop transfer control) is performed so that the unloading of unload articles W2, by which the two unload articles W2 stored in the second target storage section 1*b'* are transferred from the second target storage section 1*b'* to the second transferring device 11*b*, is performed.

It should be noted here that if two articles W, namely a rear-side article W and a front-side article W, are stored in one storage section 1, and if the rear-side article W is an unload article W2 that is an unload target and the front-side article W is a non-target article W3 that is not an unload target, it is impossible to take out only the unload article W2 from the storage section 1 due to the presence of the non-target article W3. For this reason, in the unloading process, the first scoop transfer control or the second scoop transfer control is performed so that both the unload article W2 (the rear-side article W) and the non-target article W3 (the front-side article W) are temporarily taken out from the storage section 1, and thereafter the first discharge transfer control or the second discharge transfer control is performed so that only the non-target article W3, out of the unload article W2 and the non-target article W3, is stored to an article storage rack 2.

Figure 33:
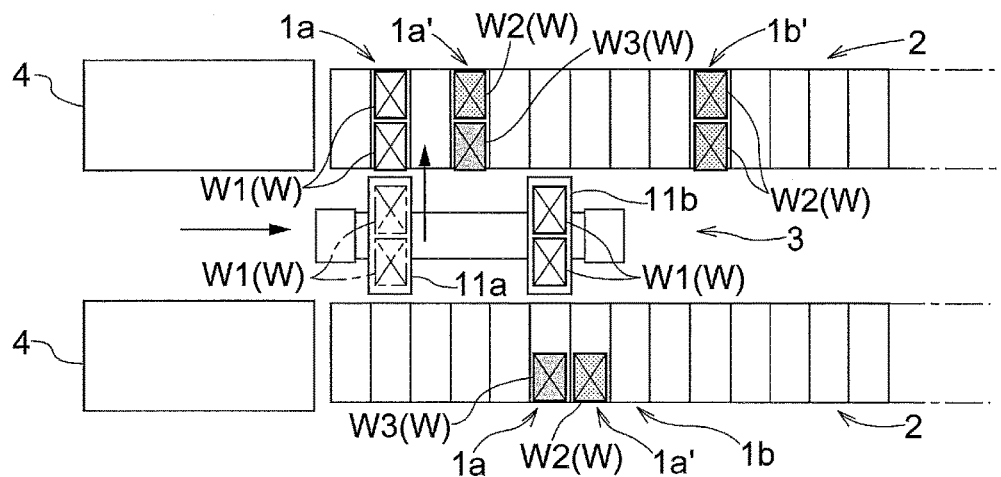
FIG. 33 is an action diagram (1) showing an action performed with a first transferring device at the time of temporarily taking out both an unload article and a non-target article, and then storing only the non-target article.

For example, as shown in FIG. 33, if two articles W are stored in the first target storage section 1*a'* in the unloading process, and, out of the two articles W stored in the first target storage section 1*a'*, namely the rear-side article W and the front-side article W, if the rear-side article W is an unload article W2 that is an unload target, and the front-side article W is a non-target article W3 that is not an unload target, the loading process and the unloading process are performed in the following manner in some cases.

Specifically, first, two first target storage sections 1*a* and one second target storage section 1*b* are selected by selection control for loading, and two first target storage sections 1*a'* and one second target storage section 1*b'* are selected by selection control for unloading.

Figure 34:
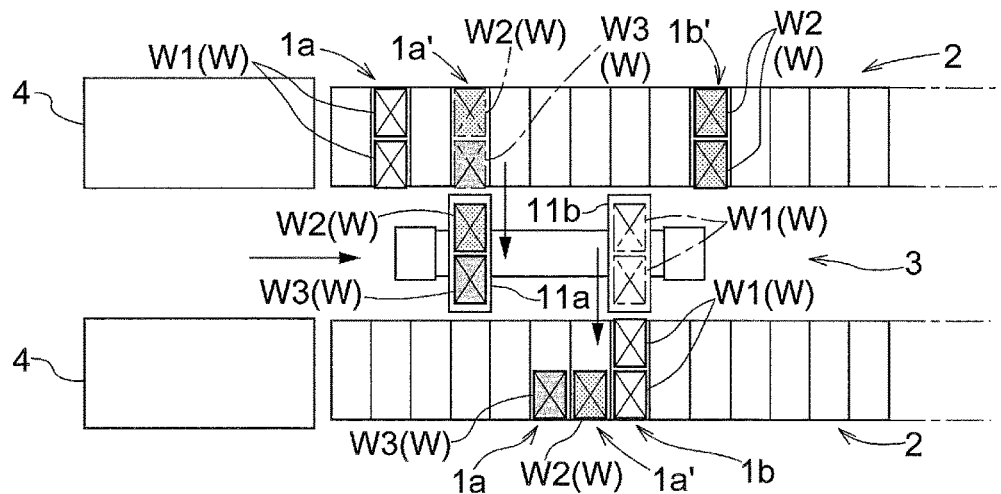
FIG. 34 is an action diagram (2) showing an action performed with the first transferring device at the time of temporarily taking out both an unload article and a non-target article, and then storing only the non-target article.

Then, as shown in FIG. 33, actual movement control for loading is performed, and thereafter discharge transfer control for loading (the first discharge transfer control) is performed so that the storing of load articles W1, by which the two load articles W1 supported on the first transferring device 11*a* are transferred from the first transferring device 11*a* to the first target storage section 1*a*, is performed. Then, as shown in FIG. 34, movement control that serves as both actual movement control for loading and idle movement control for unloading is performed, and thereafter the simultaneous transfer control (discharge transfer control for loading (the second discharge transfer control) and scoop transfer control for unloading (the first scoop transfer control)) is performed so that the taking out of articles W, by which the two articles W stored in the first target storage section 1*a'*, namely the unload article W2 (the rear-side article W) and the non-target article W3 (the front-side article W), are transferred from the first target storage section 1*a'* to the first transferring device 11*a*, and the storing of load articles W1, by which the two load articles W1 supported on the second transferring device 11*b* are transferred to the second target storage section 1*b*, are simultaneously performed.

Figure 35:
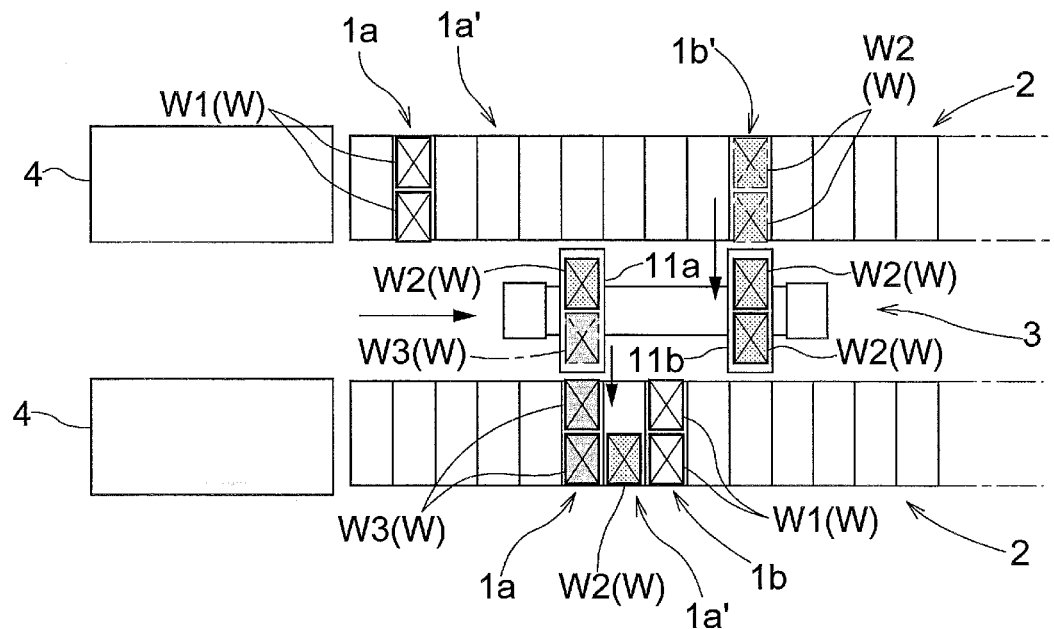
FIG. 35 is an action diagram (3) showing an action performed with the first transferring device at the time of temporarily taking out both an unload article and a non-target article, and then storing only the non-target article.

Subsequently, as shown in FIG. 35, movement control that serves as both actual movement control for loading and idle movement control for unloading is performed, and thereafter the simultaneous transfer control (discharge transfer control for loading (the first discharge transfer control) and scoop transfer control for unloading (the second scoop transfer control)) is performed so that the storing of a non-target article W3, by which the non-target article W3 out of the two articles W supported on the first transferring device 11*a*, namely the unload article W2 and the non-target article W3, is transferred from the first transferring device 11*a* to the first target storage section 1*a*, and the taking out of an unload article W2, by which the two unload articles W2 stored in the second target storage section 1*b'* are transferred from the second target storage section 1*b'* to the second transferring device 11*b*, are simultaneously performed.

Figure 36:
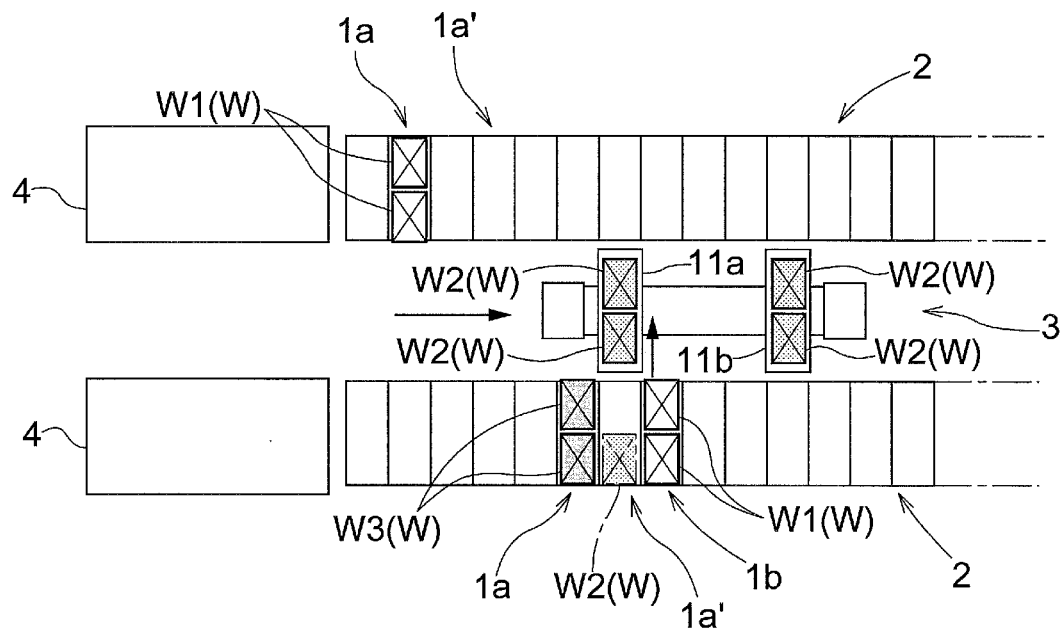
FIG. 36 is an action diagram (4) showing an action performed with the first transferring device at the time of temporarily taking out both an unload article and a non-target article, and then storing only the non-target article.

Then, as shown in FIG. 36, idle movement control for unloading is performed, and thereafter scoop transfer control for unloading (the first scoop transfer control) is performed so that the taking out of an unload article W2, by which the single unload article W2 stored in the first target storage section 1*a'* is transferred from the first target storage section 1*a'* to the first transferring device 11*a*, is performed.

Figure 37:
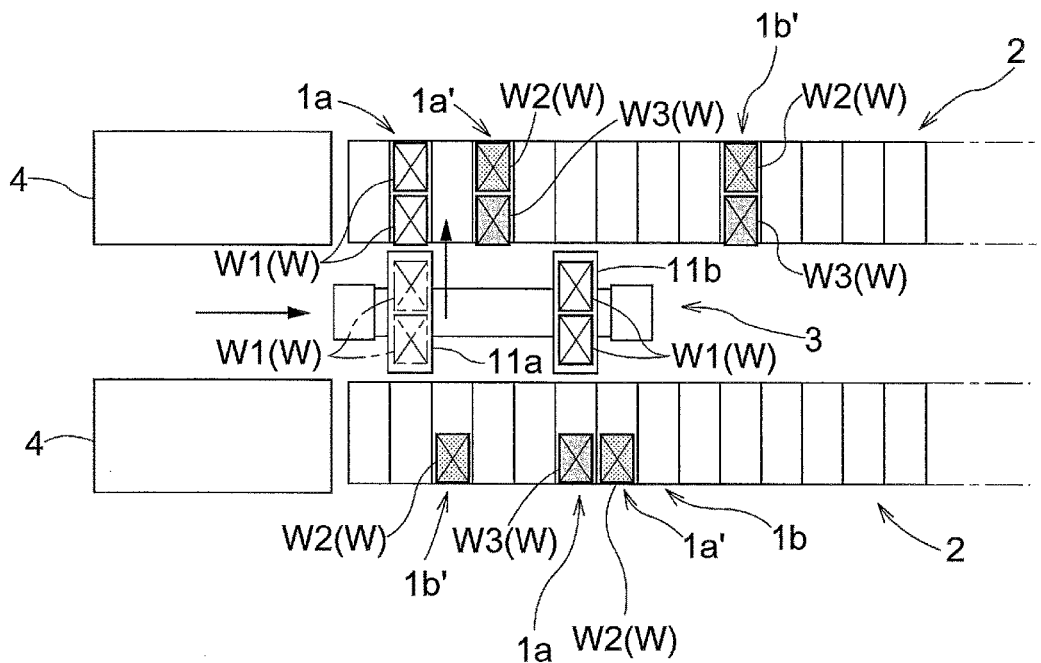
FIG. 37 is an action diagram (1) showing an action performed with both the first transferring device and a second transferring device at the time of temporarily taking out both an unload article and a non-target article, and then storing only the non-target article.

Also, for example, as shown in FIG. 37, if two articles W are stored in each of the first target storage section 1*a'* and the second target storage section 1*b'* in the unloading process, and, out of the two articles W stored in each of the first target storage section 1*a'* and the second target storage section 1*b'*, namely the rear-side article W and the front-side article W, if the rear-side article W in each target storage section is an unload article W2 that is an unload target, and the front-side article W in each target storage section is a non-target article W3 that is not an unload target, the loading process and the unloading process are performed in the following manner in some cases.

Specifically, first, two first target storage sections 1*a* and two second target storage sections 1*b* are selected by selection control for loading, and two first target storage sections 1*a'* and two second target storage sections 1*b'* are selected by selection control for unloading.

Figure 38:
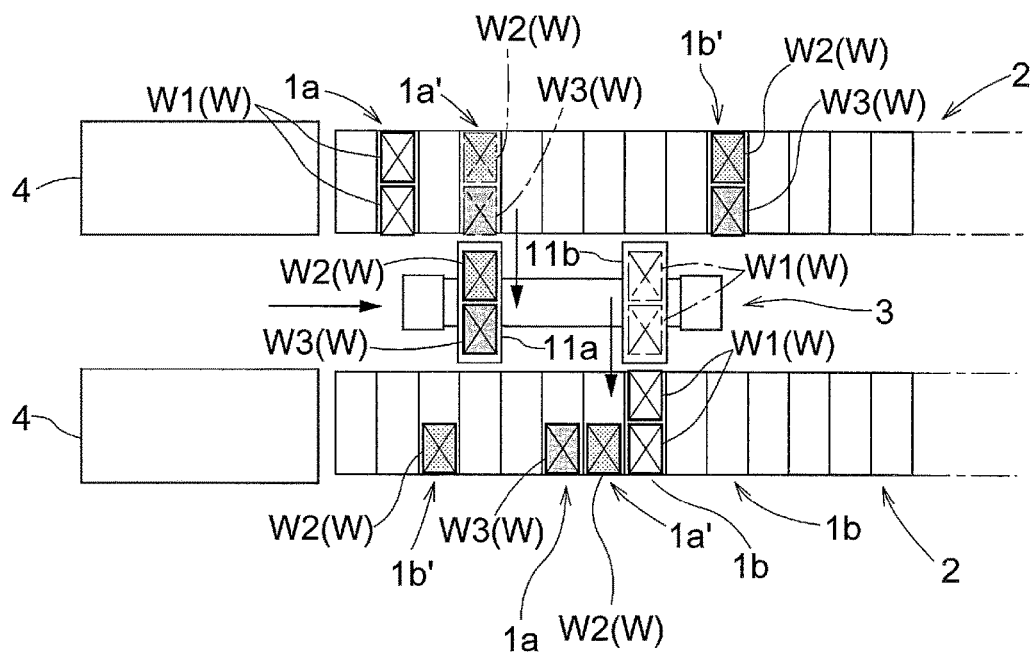
FIG. 38 is an action diagram (2) showing an action performed with both the first transferring device and the second transferring device at the time of temporarily taking out both an unload article and a non-target article, and then storing only the non-target article.

Then, as shown in FIG. 37, actual movement control for loading is performed, and thereafter discharge transfer control for loading (the first discharge transfer control) is performed so that the storing of load articles W1, by which the two load articles W1 supported on the first transferring device 11*a* are transferred from the first transferring device 11*a* to the first target storage section 1*a*, is performed. Then, as shown in FIG. 38, movement control that serves as both actual movement control for loading and idle movement control for unloading is performed, and thereafter the simultaneous transfer control (discharge transfer control for loading (the second discharge transfer control) and scoop transfer control for unloading (the first scoop transfer control)) is performed so that the taking out of articles W, by which the two articles W stored in the first target storage section 1*a'*, namely the unload article W2 (the rear-side article W) and the non-target article W3 (the front-side article W), are transferred from the first target storage section 1*a'* to the first transferring device 11*a*, and the storing of load articles W1, by which the two load articles W1 supported on the second transferring device 11*b* are transferred from the second transferring device 11*b* to the second target storage section 1*b*, are simultaneously performed.

Figure 39:
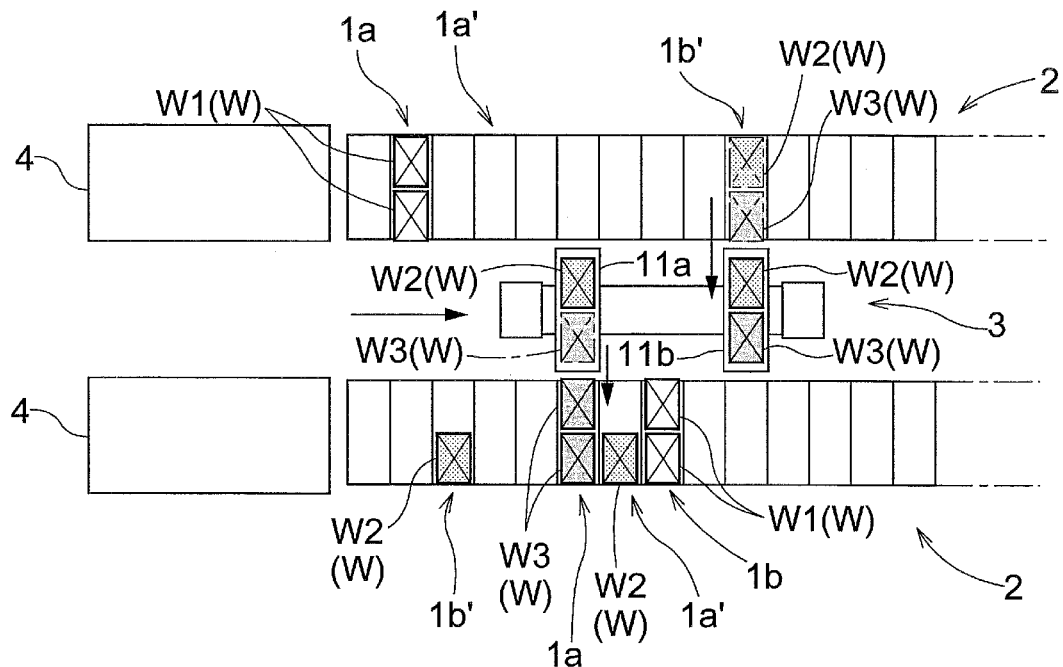
FIG. 39 is an action diagram (3) showing an action performed with both the first transferring device and the second transferring device at the time of temporarily taking out both an unload article and a non-target article, and then storing only the non-target article.

Subsequently, as shown in FIG. 39, movement control that serves as both actual movement control for loading and idle movement control for unloading is performed, and thereafter the simultaneous transfer control (discharge transfer control for loading (the first discharge transfer control) and scoop transfer control for unloading (the second scoop transfer control)) is performed so that the storing of a non-target article W3, by which the non-target article W3 out of the two articles W supported on the first transferring device 11a, namely the unload article W2 and the non-target article W3, is transferred from the first transferring device 11a to the first target storage section 1a, and the taking out of articles W, by which two articles W, namely the unload article W2 (the rear-side article W) and the non-target article W3 (the front-side article W) stored in the second target storage section 1b' are transferred from the second target storage section 1b' to the second transferring device 11b, are simultaneously performed.

Figure 40:
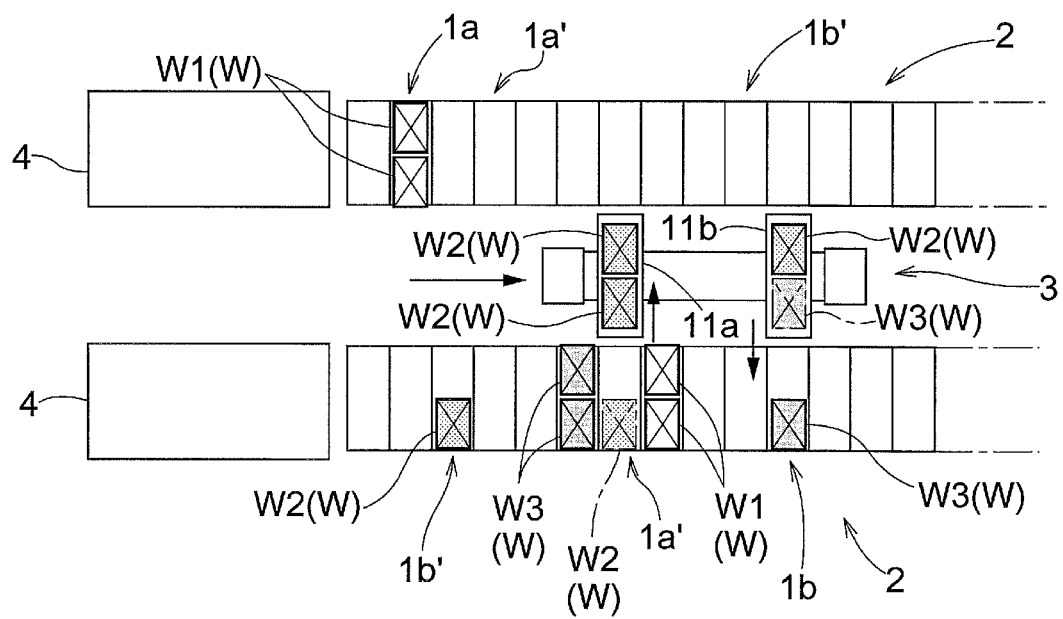
FIG. 40 is an action diagram (4) showing an action performed with both the first transferring device and the second transferring device at the time of temporarily taking out both an unload article and a non-target article, and then storing only the non-target article.

Subsequently, as shown in FIG. 40, movement control that serves as both actual movement control for loading and idle movement control for unloading is performed, and thereafter the simultaneous transfer control (discharge transfer control for loading (the second discharge transfer control) and scoop transfer control for unloading (the first scoop transfer control)) is performed so that the storing of a non-target article W3, by which the non-target article W3 out of the two articles W supported on the second transferring device 11b, namely the unload article W2 and the non-target article W3, is transferred from the second transferring device 11b to the second target storage section 1b, and the taking out of an unload article W2, by which the single unload article W2 stored in the first target storage section 1a' is transferred from the first target storage section 1a' to the first transferring device 11a, are simultaneously performed.

Figure 41:
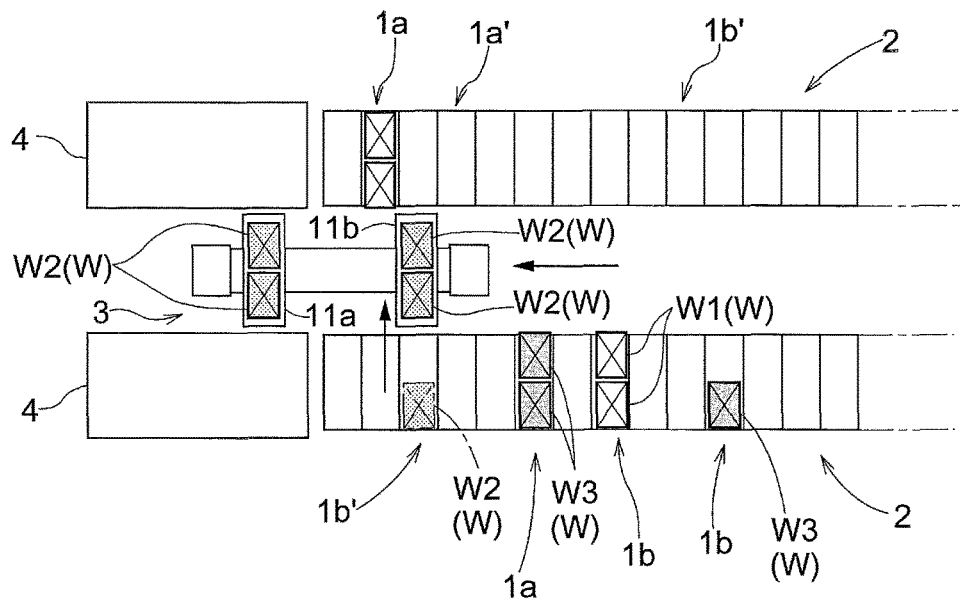
FIG. 41 is an action diagram (5) showing an action performed with both the first transferring device and the second transferring device at the time of temporarily taking out both an unload article and a non-target article, and then storing only the non-target article.

Subsequently, as shown in FIG. 41, idle movement control for unloading is performed, and thereafter scoop transfer control for unloading (the second scoop transfer control) is performed so that the taking out of an article W, by which the single unload article W2 stored in the second target storage section 1b' is transferred from the second target storage section 1b' to the second transferring device 11b, is performed.

As described above, regarding the storing of an article W to a storage section 1 in the loading process and the taking out of an article W from a storage section 1 in the unloading process, if the loading process and the unloading process are performed as shown in FIG. 33 to FIG. 36, first, actual movement control for loading is performed, and then the first discharge transfer control is performed, as shown in FIG. 33. Subsequently, as shown in FIG. 34, movement control (corresponding to the third movement control) that serves as both actual movement control for loading and idle movement control for unloading is performed, and thereafter the simultaneous transfer control (corresponding to a first simultaneous transfer control) is performed, by which the second discharge transfer control and the first scoop transfer control are simultaneously performed. Subsequently, as shown in FIG. 35, movement control (corresponding to the third movement control) that serves as both actual movement control for loading and idle movement control for unloading is performed, and thereafter the simultaneous transfer control (corresponding to a second simultaneous transfer control) is performed, by which the first discharge transfer control and the second scoop transfer control are simultaneously performed. Next, as shown in FIG. 36, idle movement control for unloading is performed, and thereafter the first scoop transfer control is performed.

Regarding the storing of an article W to a storage section 1 in the loading process and the taking out of an article W from a storage section 1 in the unloading process, if the loading process and the unloading process are performed as shown in FIG. 37 to FIG. 41, first, actual movement control for loading is performed, and then the first discharge transfer control is performed, as shown in FIG. 37. Subsequently, as shown in FIG. 38, movement control (corresponding to the third movement control) that serves as both actual movement control for loading and idle movement control for unloading is performed, and thereafter the simultaneous transfer control (corresponding to the first simultaneous transfer control) is performed, by which the second discharge transfer control and the first scoop transfer control are simultaneously performed. Subsequently, as shown in FIG. 39, movement control (corresponding to the third movement control) that serves as both actual movement control for loading and idle movement control for unloading is performed, and thereafter the simultaneous transfer control (corresponding to the second simultaneous transfer control) is performed, by which the first discharge transfer control and the second scoop transfer control are simultaneously performed. Subsequently, as shown in FIG. 40, movement control (corresponding to the third movement control) that serves as both actual movement control for loading and idle movement control for unloading is performed, and thereafter the simultaneous transfer control (corresponding to a third simultaneous transfer control) is performed, by which the first scoop transfer control and the second discharge transfer control are simultaneously performed. Next, as shown in FIG. 41, idle movement control for unloading is performed, and thereafter the second scoop transfer control is performed.

In the cases where the first simultaneous transfer control, the third movement control, and the second simultaneous transfer control are performed in this order, if the control device H has performed the first scoop transfer control and the second discharge transfer control in the first simultaneous transfer control such as in the cases shown in FIG. 34 and FIG. 35 and the cases shown in FIG. 38 and FIG. 39, the control device H performs the first discharge transfer control and the second scoop transfer control in the second simultaneous transfer control.

Then, in the first scoop transfer control performed in the first simultaneous transfer control, if, out of the two articles W stored in the storage section 1 that is the transfer target, the rear-side article W is an unload article W2 and the front-side article W is a non-target article W3, the two articles W, namely the unload article W2 and the non-target article W3, are transferred from the storage section 1 in one article storage rack 2 out of the pair of article storage racks 2 to the first transferring device 11a.

Also, in the first discharge transfer control performed in the second simultaneous transfer control, if the unload article W2 and the non-target article W3 are supported on the first transferring device 11a, only the non-target article W3, out of the two articles W, namely the unload article W2 and the non-target article W3, is transferred from the first transferring device 11a to a storage section 1 in the other article storage rack 2 out of the pair of article storage racks 2.

As shown in FIG. 39 and FIG. 40, in the cases where the second simultaneous transfer control, the third movement control, and the third simultaneous transfer control are performed in this order, if the control device H has performed the first discharge transfer control and the second scoop transfer control in the second simultaneous transfer control, the control device H performs the first scoop transfer control and the second discharge transfer control in the third simultaneous transfer control.

Then, in the second scoop transfer control performed in the second simultaneous transfer control, if, out of the two articles W stored in the storage section 1 that is the transfer target, the rear-side article W is an unload article W2 and the front-side article W is a non-target article W3, the two articles W, namely the unload article W2 and the non-target article W3, are transferred from the storage section 1 in one article storage rack 2 out of the pair of article storage racks 2 to the second transferring device 11b.

Also, in the second discharge transfer control performed in the third simultaneous transfer control, if the unload article W2 and the non-target article W3 are supported on the second transferring device 11b, only the non-target article W3, out of the two articles W, namely the unload article W2 and the non-target article W3, is transferred from the second transferring device 11b to a storage section 1 in the other article storage rack 2 out of the pair of article storage racks 2.

Counter to the cases shown in FIG. 34 and FIG. 35 and the cases shown in FIG. 38 and FIG. 39, in the cases where the first simultaneous transfer control, the third movement control, and the second simultaneous transfer control are performed in this order, if the control device H has performed the first discharge transfer control and the second scoop transfer control in the first simultaneous transfer control, the control device H performs the first scoop transfer control and the second discharge transfer control in the second simultaneous transfer control.

Then, in the second scoop transfer control performed in the first simultaneous transfer control, if, out of the two articles W stored in the storage section 1 that is the transfer target, the rear-side article W is an unload article W2 and the front-side article W is a non-target article W3, the two articles W, namely the unload article W2 and the non-target article W3, are transferred from the storage section 1 in one article storage rack 2 out of the pair of article storage racks 2 to the second transferring device 11b.

Also, in the second discharge transfer control performed in the second simultaneous transfer control, if the unload article W2 and the non-target article W3 are supported on the second transferring device 11b, only the non-target article W3, out of the two articles W, namely the unload article W2 and the non-target article W3, is transferred from the second transferring device 11b to a storage section 1 in the other article storage rack 2 out of the pair of article storage racks 2.

Counter to the cases shown in FIG. 39 and FIG. 40, in the cases where the second simultaneous transfer control, the third movement control, and the third simultaneous transfer control are performed in this order, if the control device H has performed the first scoop transfer control and the second discharge transfer control in the second simultaneous transfer control, the control device H performs the first discharge transfer control and the second scoop transfer control in the third simultaneous transfer control.

Then, in the first scoop transfer control performed in the second simultaneous transfer control, if, out of the two articles W stored in the storage section 1 that is the transfer target, the rear-side article W is an unload article W2 and the front-side article W is a non-target article W3, the two articles W, namely the unload article W2 and the non-target article W3, are transferred from the storage section 1 in one article storage rack 2 out of the pair of article storage racks 2 to the first transferring device 11a.

Also, in the first discharge transfer control performed in the third simultaneous transfer control, if the unload article W2 and the non-target article W3 are supported on the first transferring device 11a, only the non-target article W3, out of the two articles W, namely the unload article W2 and the non-target article W3, is transferred from the first transferring device 11a to a storage section 1 in the other article storage rack 2 out of the pair of article storage racks 2.

In this way, in order to position a transferring device 11 at the target stopping position that is the position at which an article W can be transferred between the target storage section, which is the storage section 1 that is the transfer target, and the transferring device 11, the control device H performs movement control (actual movement control for loading and idle movement control for unloading), by which the travelling carriage 8 is caused to travel and the corresponding elevator body 10 is moved up/down, and transfer control (discharge transfer control for loading and scoop transfer control for unloading), by which the operations of the transferring device 11 are controlled such that the article W is transferred between the target storage section and the transferring device 11.

Figure 12:
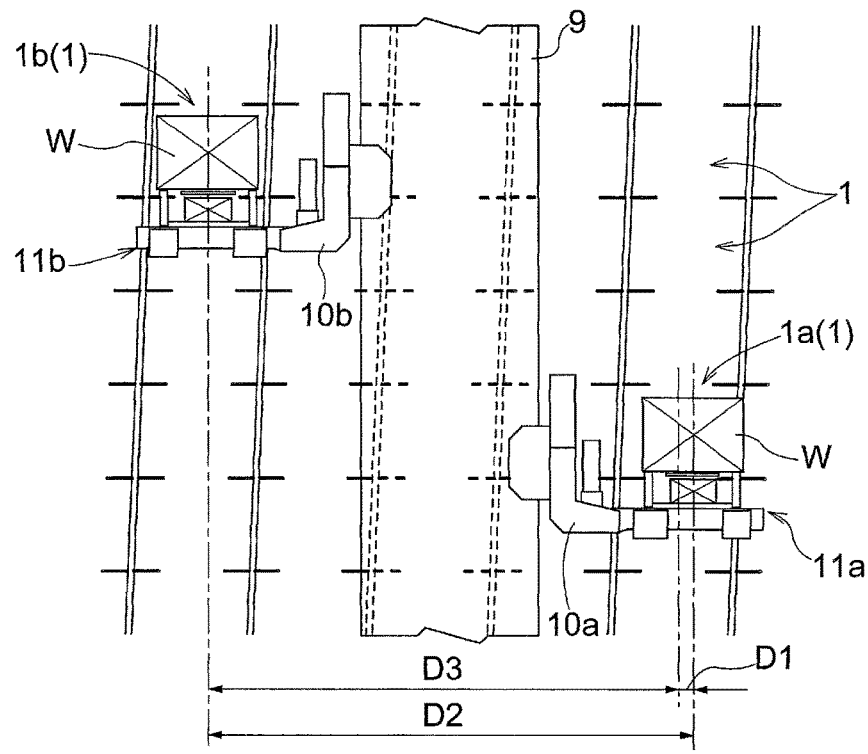
FIG. 12 illustrates operations in movement control.
Figure 13:
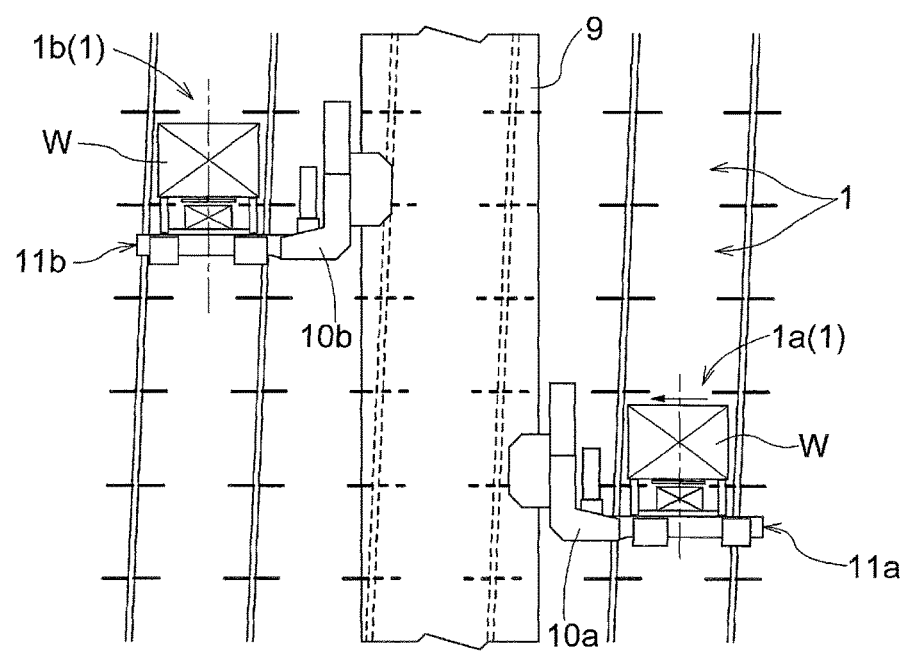
FIG. 13 illustrates operations in the movement control.

As shown in FIG. 12 and FIG. 13, in some cases, due to an article storage rack 2 being inclined for example, the separation distance between the first target storage section 1a and the second target storage section 1b in the rack width direction might be different in the case where the first target storage section 1a and the second target storage section 1b belong to the same row and in the case where the first target storage section 1a and the second target storage section 1b belong to different rows. Therefore, even in the case where the first target storage section 1a and the second target storage section 1b are in a positional relationship that allows simultaneous transfer, there is the possibility of articles W not being able to be simultaneously transferred to/from the first target storage section 1a and the second target storage section 1b in the situation where the first transferring device 11a and the second transferring device 11b are stopped at their respective standard stopping positions.

Therefore, in the movement control, slide control is performed, by which the first transferring device 11a is moved from the standard stopping position along the rack width direction, in order to correct the separation distance between the first transferring device 11a and the second transferring device 11b in the rack width direction to be the same distance as the separation distance between the first target storage section 1a and the second target storage section 1b in the rack width direction.

Also, even in the case where an article storage rack 2 is inclined as described above, the target stopping position corresponding to the storage section 1 is learned in the situation where the article storage rack 2 is inclined, and consequently the transferring device 11 can be moved to an appropriate position corresponding to the target storage section by moving the transferring device 11 to the target stopping position corresponding to the target storage section.

However, in the case where the inclination of the article storage rack 2 increases after the target stopping position is learned, the transferring device 11 is sometimes displaced in the rack width direction from the appropriate position corresponding to the target storage section even if the transferring device 11 is moved to the target stopping position corresponding to the target storage section.

For this reason, after performing the movement control and before performing the transfer control, upon determining, based on the information detected by the detection devices S, that the transferring device 11 is in a displaced state in which the transferring device 11 is displaced from the appropriate position in the rack width direction relative to the target storage section or the target transferring section, the control device H performs adjustment movement control by which the transferring device 11 is moved along the rack width direction so that the transferring device 11 is moved to the appropriate position.

Also, upon determining that the transferring device 11 is in the displaced state, the control device H performs correction control, by which the target stopping position is corrected to a position displaced in the rack width direction, based on the amount of displacement between the transferring device 11 and the appropriate position in the rack width direction.

Figure 14:
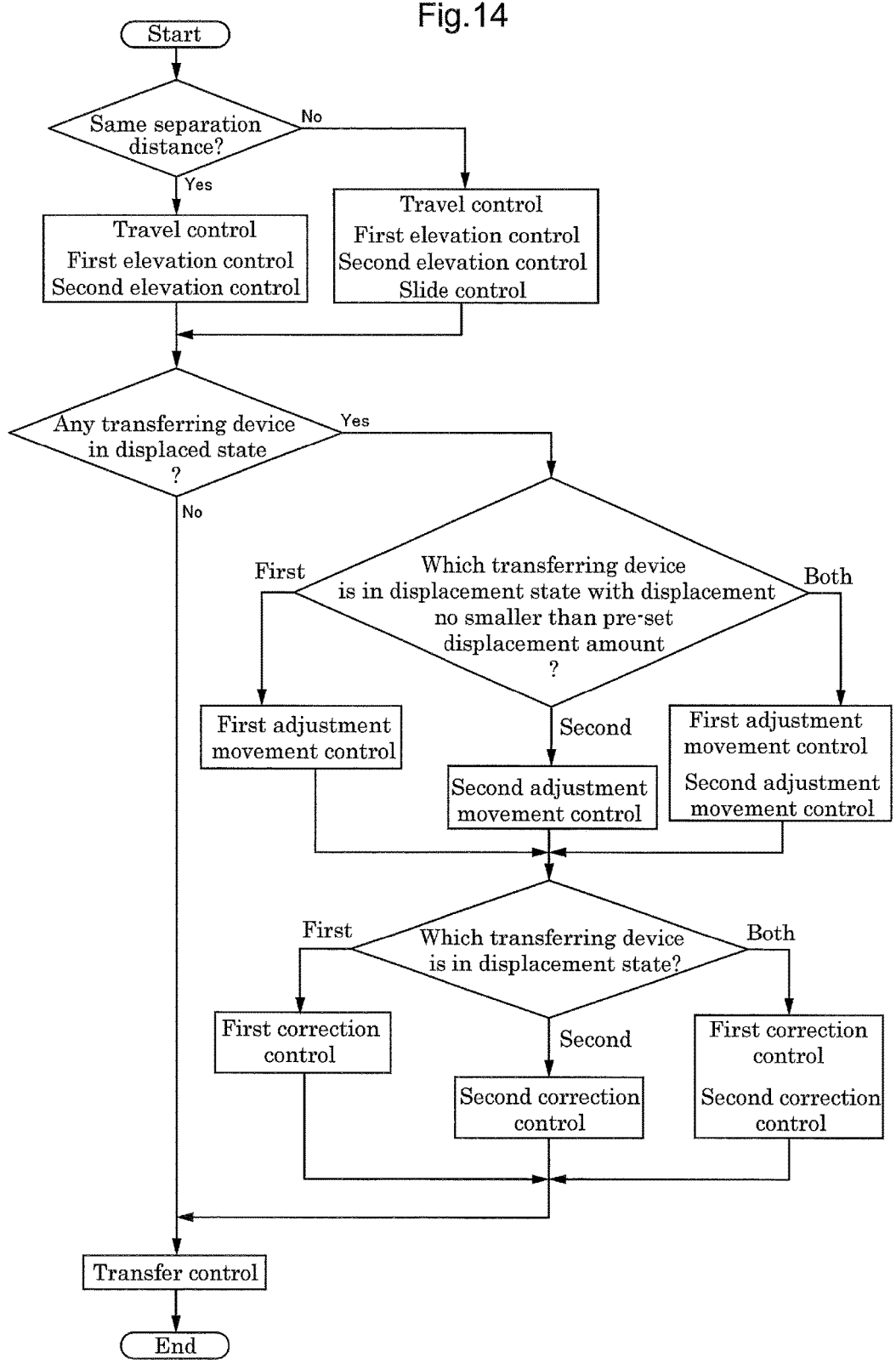
FIG. 14 is a flowchart showing the movement control, adjustment movement control, correction control, and transfer control.

Next, an additional description is given of the movement control, the adjustment movement control, and the correction control with reference to the action diagram for the stacker crane 3 shown in FIG. 12 and FIG. 13 and the flowchart shown in FIG. 14. Note that, in some cases, the target stopping position that has been set for the first target storage section 1a is referred to as the first target stopping position and the target stopping position that has been set for the second target storage section 1b is referred to as the second target stopping position.

In the control device H, travel distance information indicating the distance from a travel standard position to the target stopping position, and elevation distance information indicating the distance from an elevation standard position to the target stopping position, are stored for each of the plurality of storage sections 1 provided in the article storage racks 2. Regarding the elevation distance information, two pieces of elevation distance information, namely a piece for the first elevator body and a piece for the second elevator body, may be stored for each storage section 1, or one piece of elevation distance information that serves as both the piece for the first elevator body and the piece for the second elevator body may be stored for each storage section 1.

In the control device H, standard separation distance information indicating the distance between the standard stopping position for the second transferring device 11b and the standard stopping position for the first transferring device 11a in the rack width direction is also stored.

Incidentally, the travel standard position is set at the HP-side end of the travel path R in the rack width direction. The elevation standard position is set at the bottom end of the elevation path of the corresponding elevator body 10 in the vertical direction.

In the movement control, a target travel stopping position corresponding to the second target storage section 1b is set based on the travel distance information corresponding to the second target storage section 1b, and the operations of the travelling motor M1 are controlled (travel control) so that the travelling carriage 8 is caused to travel to the target travel stopping position. Also, in the movement control, the target elevation stopping position corresponding to the second target storage section 1b is set based on the elevation distance information corresponding to the second target storage section 1b, and the operations of the second elevation motor M2b are controlled (second elevation control) so that the second elevator body 10b is moved up/down to the target elevation stopping position.

Also, in the movement control, the target elevation stopping position corresponding to the first target storage section 1a is set based on the elevation distance information corresponding to the first target storage section 1a, and the operations of the first elevation motor M2a are controlled (first elevation control) so that the first elevator body 10a is moved up/down to the target elevation stopping position. Also, in the movement control, an amount D1 of slide movement from the standard stopping position to a target slide stopping position for the first transferring device 11a is calculated based on the travel distance information corresponding to the first target storage section 1a, the travel distance information corresponding to the second target storage section 1b, and the standard separation distance information, and the operations of the slide motor M5 for the first sliding device 12a are controlled (slide control) so that the first transferring device 11a is caused to slide to the target slide stopping position.

Specifically, a comparison is made between the separation distance D2 (the distance indicated by the standard separation distance information, see FIG. 12) in the rack width direction between the first transferring device 11a and the second transferring device 11b that have been moved to their respective standard stopping positions, and the separation distance D3 (the difference between the distance indicated by the travel distance information corresponding to the first target storage section 1a and the distance indicated by the travel distance information corresponding to the second target storage section 1b, see FIG. 12) in the rack width direction between the first target storage section 1a and the second target storage section 1b. If these separation distances are different from each other, the slide control is performed in the movement control as well as the travel control, the first elevation control, and the second elevation control. If these separation distances are the same, the travel control, the first elevation control, and the second elevation control are performed in the movement control, but the slide control is not performed.

Due to the movement control performed in such a manner, the first transferring device 11a located at the standard stopping position or the target slide stopping position moves to the first target stopping position, and the second transferring device 11b located at the standard stopping position moves to the second target stopping position.

Note that FIG. 12 and FIG. 13 are illustrated to show that the travel control, the first elevation control, and the second elevation control are performed first as shown in FIG. 12, and then the slide control is performed as shown in FIG. 13. However, the slide control may be performed simultaneously with the travel control, the first elevation control, and the second elevation control.

The movement control is control by which the second elevator body 10b is moved up/down and the travelling carriage 8 is caused to travel so that the second transferring device 11b is moved to the second target stopping position, and the first elevator body 10a is moved up/down and the first transferring device 11a is caused to slide so that the first transferring device 11a is moved to the first target stopping position. Note that the movement control according to the first embodiment corresponds to the first movement control and the third movement control.

Incidentally, in the present embodiment, if one or both of the first transferring device 11a and the second transferring device 11b are displaced from their standard stopping positions at the time the movement control is performed, control is performed before the movement control is performed or while the movement control is being performed so that the transferring device 11 that is displaced from the standard stopping position moves to the standard stopping position. Note that if the second transferring device 11b is displaced from the standard stopping position at the time the movement control is performed, control may be performed so that the second transferring device 11b that is displaced from the standard stopping position is moved to the standard stopping position, and if the first transferring device 11a is displaced from the standard stopping position at the time the movement control is performed, control may be performed so that the first transferring device 11a that is displaced from the standard stopping position is moved to the target slide stopping position, as the slide control.

Next, a description is given of the adjustment movement control and the correction control.

After performing the movement control and before performing the transfer control, the control device H captures an image of the detection target section T provided for the first target storage section 1a, using the first detection device Sa provided for the first transferring device 11a, and captures an image of the detection target section T provided for the second target storage section 1b, using the second detection device Sb provided for the second transferring device 11b.

Based on the captured image information obtained by the first detection devices Sa, it is determined whether or not the first transferring device 11a is in the displaced state, in which the first transferring device 11a is displaced from the appropriate position corresponding to the first target storage section 1a in the rack width direction.

In the case where it is determined that the first transferring device 11a is in the displaced state, if the amount of displacement between the first transferring device 11a and the appropriate position in the rack width direction is greater than or equal to a first pre-set displacement amount (e.g., 3 mm), first adjustment movement control is performed, by which the operations of the first sliding device 12a are controlled so that the first transferring device 11a is moved to the appropriate position.

The first adjustment movement control is not performed if it is determined that the first transferring device 11a is not in the displaced state, or if it is determined that the first transferring device 11a is in the displaced state, but the amount of displacement between the first transferring device 11a and the appropriate position in the rack width direction is smaller than the first pre-set displacement amount.

Incidentally, the pre-set displacement amount has been set to a distance that does not cause a problem such as interference of the first transferring device 11a with the article storage racks 2 when an article W is transferred by the first transferring device 11a even if the first transferring device 11a is displaced from the appropriate position corresponding to the first target storage section 1a by the pre-set displacement amount in the rack width direction.

If it is determined that the first transferring device 11a is in the displaced state, regardless of whether the amount of displacement between the first transferring device 11a and the appropriate position in the rack width direction is no smaller than the first pre-set displacement amount or smaller than the first pre-set displacement amount, first correction control is performed based on the amount of displacement between the first transferring device 11a and the appropriate position in the rack width direction, by which the target stopping position corresponding to the first target storage section 1a is corrected to the position that is displaced by the amount of displacement in the rack width direction, and the target stopping position corresponding to the first target storage section 1a is updated.

Also, based on the captured image information obtained by the second detection devices Sb, it is determined whether or not the second transferring device 11b is in the displaced state, in which the second transferring device 11b is displaced from the appropriate position corresponding to the second target storage section 1b in the rack width direction.

In the case where it is determined that the second transferring device 11b is in the displaced state, if the amount of displacement between the second transferring device 11b and the appropriate position in the rack width direction is greater than or equal to a second pre-set displacement amount (e.g., 3 mm), second adjustment movement control is performed, by which the operations of the second sliding device 12b are controlled so that the second transferring device 11b is moved to the appropriate position.

The second adjustment movement control is not performed if it is determined that the second transferring device 11b is not in the displaced state, or if it is determined that the second transferring device 11b is in the displaced state, but the amount of displacement between the second transferring device 11b and the appropriate position in the rack width direction is smaller than the second pre-set displacement amount.

If it is determined that the second transferring device 11b is in the displaced state, regardless of whether the amount of displacement between the second transferring device 11b and the appropriate position in the rack width direction is no smaller than the second pre-set displacement amount or smaller than the second pre-set displacement amount, second correction control is performed based on the amount of displacement between the second transferring device 11b and the appropriate position in the rack width direction, by which the target stopping position corresponding to the second target storage section 1b is corrected to the position that is displaced by the amount of displacement in the rack width direction.

Due to the first correction control and the second correction control being performed in this way, if the movement control is performed with respect to the target storage sections that are the storage sections 1 that have been subjected to the first correction control and the second correction control, the operations of the stacker crane 3 are controlled so that the transferring devices 11 are moved to the corrected target stopping positions. Therefore, it can be expected that the transferring devices 11 at the target stopping positions are moved to the appropriate positions corresponding to the target storage sections.

Note that the first pre-set displacement amount and the second pre-set displacement amount correspond to the pre-set displacement amount, and the values of the first pre-set displacement amount and the second pre-set displacement amount may be different.

Second Embodiment

Next, a description is given of a second embodiment of an article transport facility with reference to the drawings.

Note that in the description of the second embodiment, mainly the movement control that is different from that in the first embodiment is described, and the description of the same configuration as that in the first embodiment is omitted.

Figure 15:
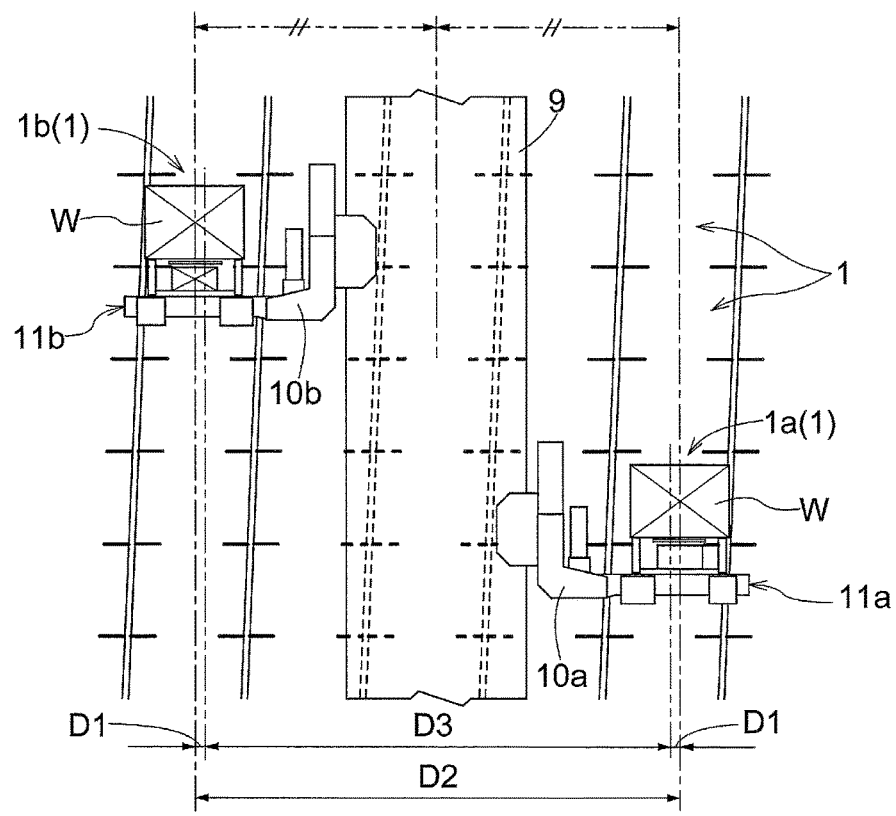
FIG. 15 illustrates operations in movement control according to a second embodiment.

As shown in FIG. 15, in the movement control, the target travel stopping position is set such that the elevation guide mast 9 is located in the center between the first target storage section 1a and the second target storage section 1b in the rack width direction based on the travel distance information corresponding to the first target storage section 1a and the travel distance information corresponding to the second target storage section 1b, and the operations of the travelling motor M1 are controlled (travel control) so that the travelling carriage 8 is caused to travel to the target travel stopping position.

Also, in the movement control, the target elevation stopping position corresponding to the first target storage section 1a is set based on the elevation distance information corresponding to the first target storage section 1a, and the operations of the first elevation motor M2a are controlled (first elevation control) so that the first elevator body 10a is moved up/down to the target elevation stopping position.

Also, in the movement control, the target elevation stopping position corresponding to the second target storage section 1b is set based on the elevation distance information corresponding to the second target storage section 1b, and the operations of the second elevation motor M2b are controlled (second elevation control) so that the second elevator body 10b is moved up/down to the target elevation stopping position.

Figure 16:
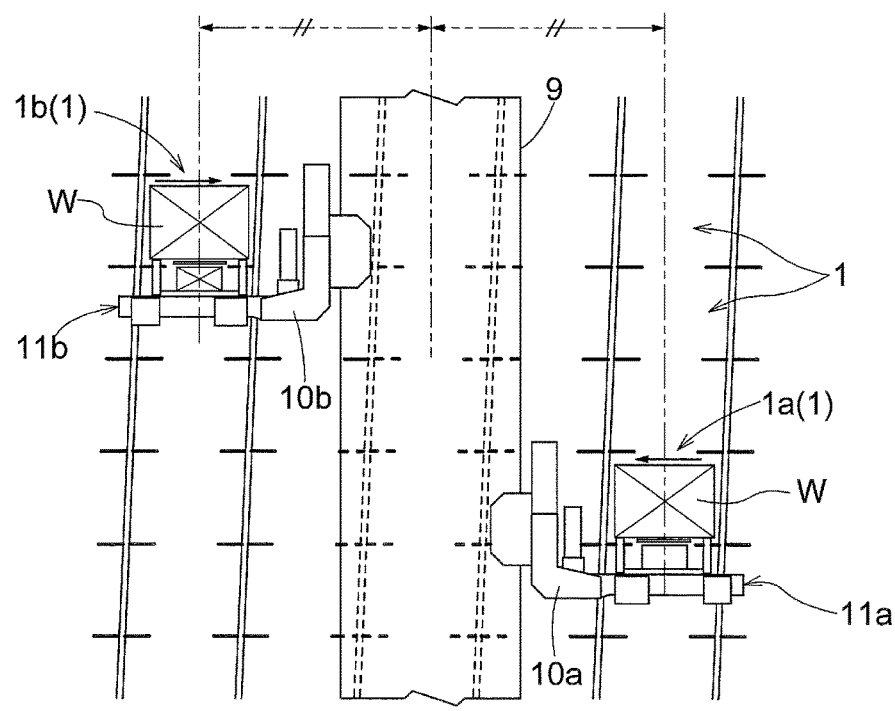
FIG. 16 illustrates operations in the movement control according to the second embodiment.

Also, in the movement control, as shown in FIG. 16, the amount D1 of slide movement of the first transferring device 11a from the standard stopping position to the target slide stopping position for the first transferring device 11a and the amount D1 of slide movement of the second transferring device 11b from the standard stopping position to the target slide stopping position for the second transferring device 11b are calculated based on the travel distance information corresponding to the first target storage section 1a, the travel distance information corresponding to the second target storage section 1b, and the standard separation distance information, and the operations of the slide motor M5 for the first sliding device 12a are controlled (first slide control) and the operations of the slide motor M5 for the second sliding device 12b are controlled (second slide control) so that the first transferring device 11a and the second transferring device 11b are caused to slide to their respective target slide stopping positions.

Specifically, a comparison is made between the separation distance D2 (the distance indicated by the standard separation distance information, see FIG. 15) in the rack width direction between the first transferring device 11a and the second transferring device 11b that have been moved to their respective standard stopping positions, and the separation distance D3 (the difference between the distance indicated by the travel distance information corresponding to the first target storage section 1a and the distance indicated by the travel distance information corresponding to the second target storage section 1b, see FIG. 15) in the rack width direction between the first target storage section 1a and the second target storage section 1b. If these separation distances are different from each other, the first slide control and the second slide control are performed in the movement control as well as the travel control, the first elevation control, and the second elevation control. If these separation distances are the same, the travel control, the first elevation control, and the second elevation control are performed in the movement control, but the first slide control and the second slide control are not performed.

Incidentally, since the target travel stopping positions are set such that the elevation guide mast 9 is located at the center between the first target storage section 1a and the second target storage section 1b in the rack width direction, the direction in which the first transferring device 11a slides in the first slide control and the direction in which the second transferring device 11b slides in the second slide control are opposite, and the value of the amount D1 of slide movement of the first transferring device 11a in the first slide control and the value of the amount D1 of slide movement of the second transferring device 11b in the second slide control are the same.

Due to the movement control performed in such a manner, the first transferring device 11a located at the standard stopping position or the target slide stopping position moves to the first target stopping position, and the second transferring device 11b located at the standard stopping position or the target slide stopping position moves to the second target stopping position.

Note that FIG. 15 and FIG. 16 are illustrated to show that the travel control, the first elevation control, and the second elevation control are performed first as shown in FIG. 15, and then the first slide control and the second slide control are performed as shown in FIG. 16. However, the first slide control and the second slide control may be performed simultaneously with the travel control, the first elevation control, and the second elevation control.

Note that the movement control according to the second embodiment corresponds to the second movement control and the third movement control.

Third Embodiment

Next, a description is given of a third embodiment of an article transport facility with reference to the drawings.

Note that in the description of the third embodiment, mainly the configurations of the transferring devices 11 that are different from those in the first embodiment are described, and the description of the same configuration as that in the first embodiment is omitted.

Figure 17:
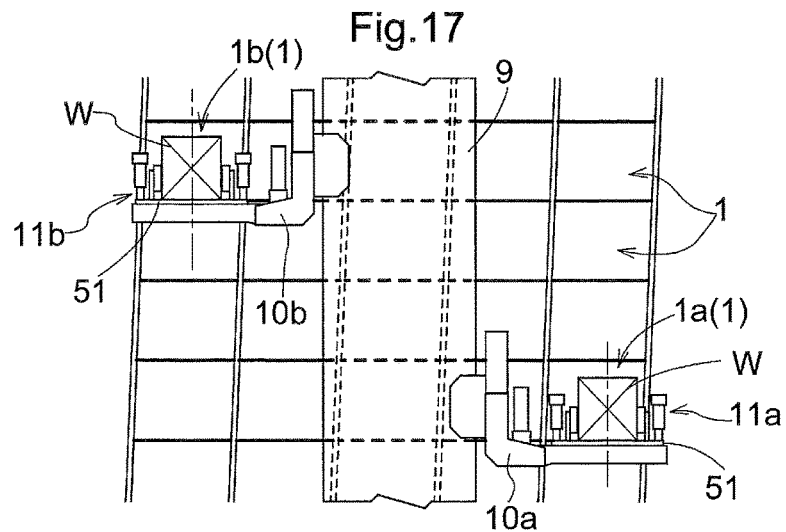
FIG. 17 illustrates operations in movement control according to a third embodiment.
Figure 18:
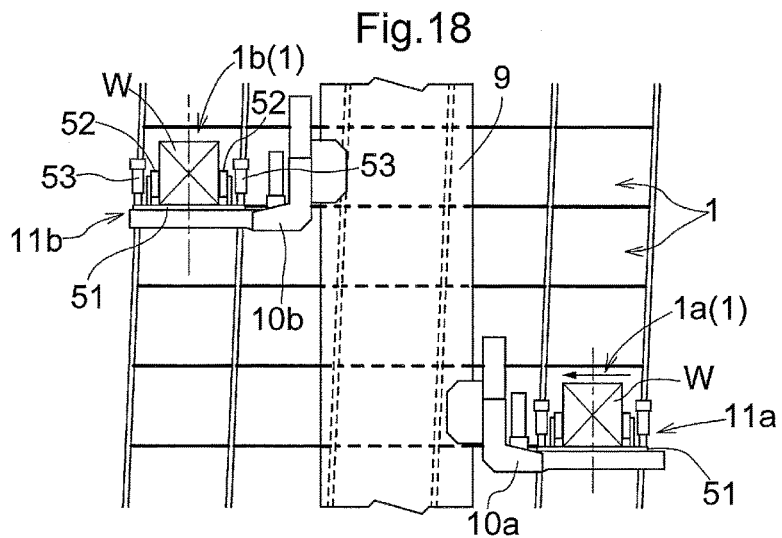
FIG. 18 illustrates operations in the movement control according to the third embodiment.
Figure 19:
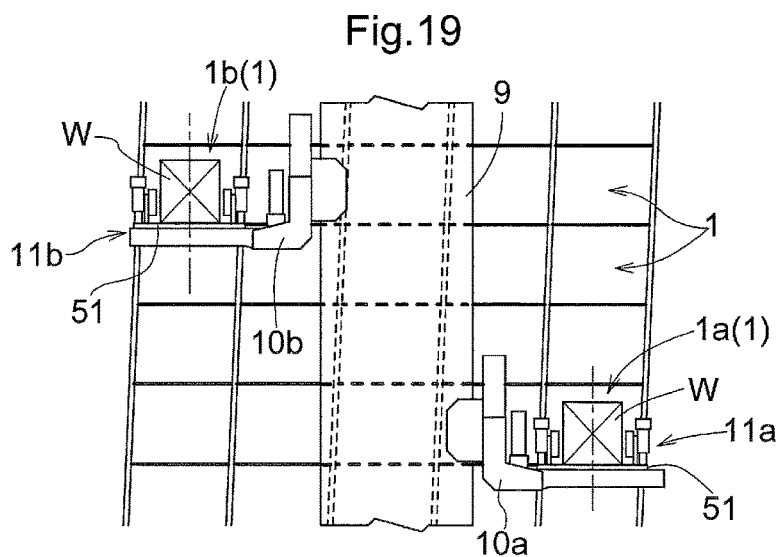
FIG. 19 illustrates operations in the movement control according to the third embodiment.

As shown in FIG. 17 to FIG. 19, the first transferring device 11a includes: a moving platform 51 that is supported so as to be able to slide along the rack width direction relative to the first elevator body 10a; a moving motor (not shown in the drawings) that causes the moving platform 51 to slide along the rack width direction relative to the first elevator body 10a; a pair of clamp fork devices 52 that are supported so as to be able to slide along the rack width direction relative to the moving platform 51 and that are able to protrude and retract along the rack front-rear direction; and a pair of clamp motors 53 that respectively cause the pair of clamp fork devices 52 to move along the rack width direction relative to the moving platform 51.

The first transferring device 11a and the second transferring device 11b in an approaching state in which an article W is sandwiched between the pair of clamp fork devices 52 in the rack width direction (the separation distance between the pair of clamp fork devices 52 in the approaching state varies depending on the size of the article W in the rack width direction) cause the pair of clamp fork devices 52 to protrude toward the first target storage section 1a, and thereafter switch the pair of clamp fork devices 52 from the approaching state to a separated state in which the pair of clamp fork devices 52 are separated from each other by a pre-set amount, in order to cancel the state of sandwiching the article W, and then retract the clamp fork devices 52 along the rack front-rear direction so that the article W is transferred to the first target storage section 1a.

Incidentally, the first sliding device 12a is configured with the moving platform 51 and the moving motor provided for the first transferring device 11a, and the second sliding device 12b is configured with the moving platform 51 and the moving motor provided for the second transferring device 11b.

Alternative Embodiments (1) In the first to third embodiments above, only a single elevation guide mast 9 is provided so as to stand on the travelling carriage 8 of the stacker crane 3, and the first elevator body 10a and the second elevator body 10b are guided to move up/down with the single elevation guide mast 9. However, a configuration may be adopted in which two elevation guide masts 9, namely a first elevation guide mast 9 and a second elevation guide mast 9, are provided so as to stand on the travelling carriage 8 of the stacker crane 3, and the first elevator body 10a is guided to move up/down with the first elevation guide mast 9, and the second elevator body 10b is guided to move up/down with the second elevation guide mast 9.

In the case where two elevation guide masts 9 are provided so as to stand in this way, the first elevation guide mast 9 corresponds to the first mast 14a, and the second elevation guide mast 9 corresponds to the second mast 14b.

In the case where two elevation guide masts 9 are provided so as to stand, the first elevator body 10a and the second elevator body 10b may be disposed between the two elevation guide masts 9, and a gate-like configuration may be formed with the two elevation guide masts 9 and a connecting member, with the respective upper end portions of the two elevation guide masts 9 being connected to each other with the connecting member.

(2) In the first to third embodiments above, the positional relationship of the first target storage section 1a and the second target storage section 1b that allows simultaneous transfer is a positional relationship in which the second target storage section 1b belongs to the fourth column from the column to which the first target storage section 1a belongs. However, the positional relationship of the first target storage section 1a and the second target storage section 1b that allows simultaneous transfer may be changed as appropriate, depending on the configuration of the stacker crane 3. Specifically, in the case where a single elevation guide mast 9 is adopted as in the first to third embodiments for example, the elevation guide mast 9 may be configured to be elongated in the rack width direction, and a positional relationship in which the second target storage section 1b belongs to the third column from the column to which the first target storage section 1a belongs may be the positional relationship of the first target storage section 1a and the second target storage section 1b that allows simultaneous transfer. Also, in the case where the first elevator body 10a and the second elevator body 10b are disposed between two elevation guide masts 9, a positional relationship in which the second target storage section 1b belongs to the column that is adjacent to the column to which the first target storage section 1a belongs may be a positional relationship of the first target storage section 1a and the second target storage section 1b that allows simultaneous transfer.

(3) In the first to third embodiments above, the control device H performs the adjustment movement control and the correction control. However, for example, in cases where it can be assumed that the progress of the inclinations of the article storage racks 2 is slow or the inclinations of the article storage racks 2 do not progress, the control device H may omit performing one or both of the adjustment movement control and the correction control.

(4) In the first to third embodiments above, the first sliding device 12a and the second sliding device 12b are provided. However, one or both of the first sliding device 12a and the second sliding device 12b may be omitted.

Specifically, in the case where the first transferring device 11a need not to be caused to slide in the rack width direction relative to the first elevator body 10a such as the case where the first adjustment movement control is omitted from the first embodiment for example, the first sliding device 12a may be omitted. Also, if the article storage racks 2 are not inclined or the degree of inclination is small for example, and there is no need to change the distance between the first transferring device 11a and the second transferring device 11b in the rack width direction even though the row to which the storage section 1 to/from which simultaneous transfer is performed belongs is different for the first transferring device 11a and the second transferring device 11b, both the first sliding device 12a and the second sliding device 12b may be omitted.

Incidentally, in the case where only the first sliding device 12a, out of the first sliding device 12a and the second sliding device 12b, is provided, the selecting section h1 selects, from among the plurality of storage sections 1, two storage sections 1 whose separation distance D3 between each other in the rack width direction is no smaller than the minimum separation distance and no greater than the maximum separation distance, and that are located at the same level or different levels, as the first target storage section 1a and the second target storage section 1b. Here, the minimum separation distance is the minimum separation distance between the first transferring device 11a and the second transferring device 11b formed by the first sliding device 12a, and corresponds to "first distance". The maximum separation distance is the maximum separation distance between the first transferring device 11a and the second transferring device 11b formed by the first sliding device 12a, and corresponds to "second distance". The minimum separation distance and the maximum separation distance are determined according to the range of the movement of the first transferring device 11a caused by the first sliding device 12a.

In the first to third embodiments, out of the pair of transferring devices 11, the transferring device 11 located on the HP side is defined as the first transferring device 11a, and the transferring device 11 located on the OP side is defined as the second transferring device 11b. However, out of the pair of transferring devices 11, the transferring device 11 located on the OP side may be defined as the first transferring device 11a, and the transferring device 11 located on the HP side may be defined as the second transferring device 11b.

(5) In the first to third embodiments, the range of the movement of the first transferring device 11a caused by the first sliding device 12a and the range of the movement of the second transferring device 11b caused by the second sliding device 12b are set such that the sum of the ranges of movement is smaller than the separation distance between a pair of storage sections 1 that are adjacent to each other in the rack width direction. However, the ranges of movement may be set such that the sum of the ranges of movement is greater than or equal to the separation distance between a pair of storage sections 1 that are adjacent to each other in the rack width direction.

If the ranges of movement are set such that the sum of the ranges of movement is greater than or equal to the separation distance between a pair of storage sections 1 that are adjacent to each other in the rack width direction, the positional relationship in which the second target storage section 1b belongs to the fifth column from the column to which first target storage section 1a belongs may be a positional relationship of the first target storage section 1a and the second target storage section 1b that allows simultaneous transfer, in addition to the positional relationship in which the second target storage section 1b belongs to the fourth column from the column to which the first target storage section 1a belongs, for example.

(6) In the first embodiment, the transferring devices 11 are configured with the fork device 26 and the conveyor devices 27, and in the third embodiment, the transferring devices 11 are configured with clamp devices. However, the configuration of the transferring devices 11 may be changed as appropriate.

Specifically, the transferring devices 11 may be configured only with the fork device 26 and without the conveyor devices 27.

Also, for example, if the transferring devices 11 are configured with clamp devices, a configuration may be adopted in which the pair of clamp fork devices 52 are individually moved in the rack width direction by the pair of clamp motors 53. Also, a configuration may be adopted in which the pair of clamp fork devices 52 are synchronously moved in the rack width direction by a single clamp motor 53 such that the clamp fork devices 52 move away from and closer to each other.

Incidentally, if a configuration is adopted in which the pair of clamp fork devices 52 are individually moved in the rack width direction by the pair of clamp motors 53, the transferring device 11 may be caused to slide in the rack width direction such that the pair of clamp fork devices 52 are caused to slide in the same direction.

If this is the case, the pair of clamp motors 53 in the first transferring device 11a correspond to the first sliding device 12a, and the first transferring device 11a has the function of the first sliding device 12a as well. Also, the pair of clamp motors 53 in the second transferring device 11b correspond to the second sliding device 12b, and the second transferring device 11b has the function of the second sliding device 12b as well.

In the case where a transferring device 11 is configured such that the pair of clamp fork devices 52 are individually moved in the rack width direction by the pair of clamp motors 53, it is possible to change the central position of the transferring device 11 in the rack width direction (the central position between the pair of clamp fork devices 52) and to change the distance between the pair of clamp fork devices 52 in the rack width direction by moving only one of the pair of clamp fork devices 52 in the rack width direction, or by making a difference between the travelling distance of one clamp fork device 52 and that of the other clamp fork device 52 when both of the pair of clamp fork devices 52 are moved in the same direction or different directions along the rack width direction.

Therefore, in the case where the central position, in the rack width direction, of an article W stored in a storage section 1 and the central position of the transferring device 11 in the rack width direction are displaced from each other in the rack width direction, it is possible to make a positional adjustment of the central position of the article W in the rack width direction and the central position of the transferring device 11 in the rack width direction by moving one or both of the pair of clamp fork devices 52 as described above.

In the case where a plurality of types of articles W having different sizes in the rack width direction are stored in storage sections 1 in the article storage racks 2, it is possible to change the distance between the pair of clamp fork devices 52 in the rack width direction according to the size of the article W stored in the corresponding storage section 1 by moving one or both of the pair of clamp fork devices 52 as described above.

Such an adjustment of the positions of an article W and a transferring device 11, and a change to the distance between the pair of clamp fork devices 52, may be made to both the first transferring device 11a and the second transferring device 11b by providing both the first sliding device 12a and the second sliding device 12b.

The pair of clamp fork devices 52 of the first transferring device 11a correspond to a pair of first fork devices 52a that are aligned in the rack width direction, and the pair of first fork devices 52a are configured to protrude and retract in the rack front-rear direction and to be individually moved in the rack width direction by the pair of clamp motors 53 (the first sliding device 12a).

The pair of clamp fork devices 52 of the second transferring device 11b correspond to a pair of second fork devices 52b that are aligned in the rack width direction, and the pair of second fork devices 52b are configured to protrude and retract in the rack front-rear direction and to be individually moved in the rack width direction by the pair of clamp motors 53 (the second sliding device 12b).

Incidentally, the first transferring device 11a may be configured to transfer an article W between the first transferring device 11a and the first target storage section 1a by moving the pair of first fork devices 52a to protrude and retract in the rack front-rear direction with the article W being sandwiched in the rack width direction by the pair of first fork devices 52a. Also, the pair of first fork devices 52a of the first transferring device 11a may each be provided with an engaging section that protrudes and retracts in the rack width direction, and the first transferring device 11a may be configured to transfer an article W between the first transferring device 11a and the first target storage section 1a by moving the pair of first fork devices 52a to protrude and retract in the rack front-rear direction with the respective engaging sections being engaged with the article W. The pair of second fork devices 52b, as with the pair of first fork devices 52a, may also be configured to transfer an article W between the second transferring device 11b and the second target storage section 1b by engagement instead of by sandwiching.

(7) In the first to third embodiments above, the article storage racks 2 are configured with: the plurality of support posts 2a that are aligned in the rack width direction and that are provided so as to stand on the floor surface; and the placement support bodies 2b attached to the support posts 2a so as to protrude in the rack width direction from the support posts 2a. However, as shown in FIG. 42, the article storage racks 2 may be configured with: the plurality of support posts 2a that are aligned in the rack width direction and that are provided so as to stand on the floor surface; and shelf boards 2c each spanning support posts 2a that are adjacent in the rack width direction.

Figure 42:
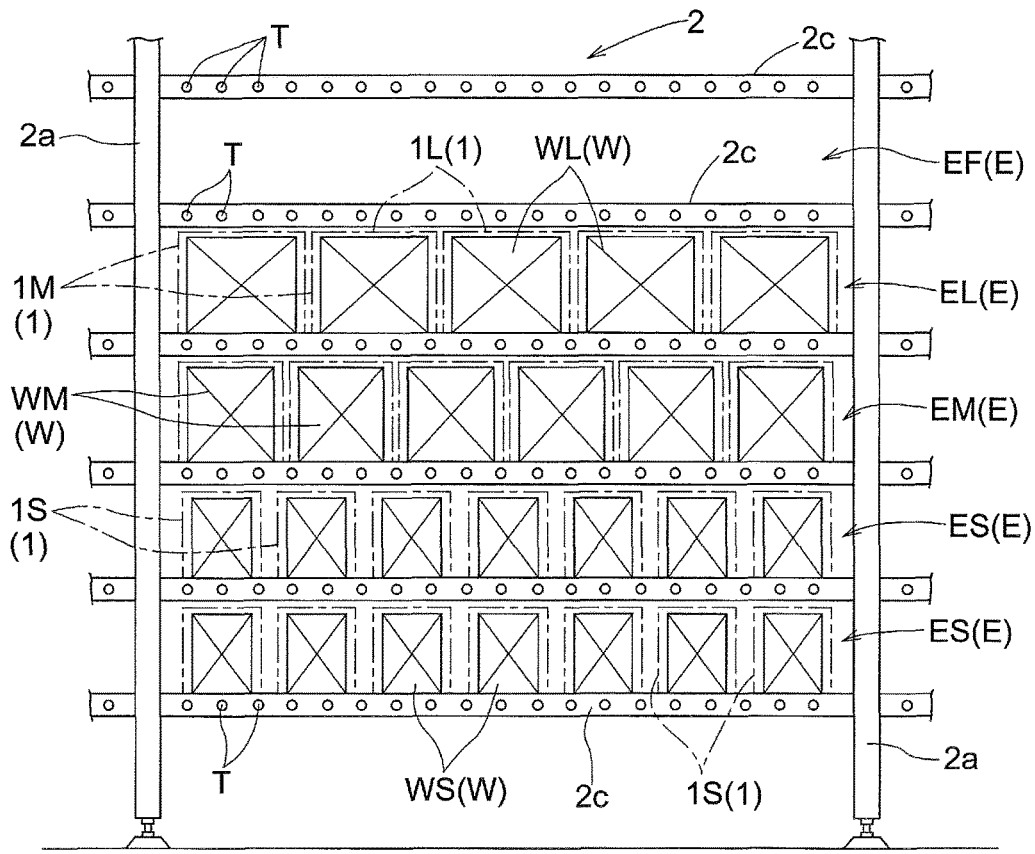
FIG. 42 is a front view of an article storage rack according to an alternative embodiment (7)

In the case where the article storage racks 2 are configured with the shelf boards 2c in this way, as shown in FIG. 42, a plurality of storage sections 1 aligned in the rack width direction may be provided one after another between support posts 2a that are adjacent in the rack width direction.

In the first to third embodiments above, the plurality of storage sections 1 are each configured to be able to store two articles W aligned in the rack front-rear direction. However, the plurality of storage sections 1 may each be configured to be able to store only one article W in the rack front-rear direction.

(8) In the first to third embodiments above, the positions of the storage sections 1 in the article storage racks 2 are fixed. However, if a plurality of types of storage sections 1 having different sizes in the rack width direction are set in the article storage racks 2 in order for the article storage racks 2 to store a plurality of types of articles W having different sizes in the rack width direction, the positions of the storage sections 1 in the article storage racks 2 may be varied.

Specifically, the control device H may be configured to: when an article W is transferred from the first transferring device 11a to the first target storage section 1a, or when an article W is transferred from the second transferring device 11b to the second target storage section 1b, set a storage section 1 having a size corresponding to the type of the article W to be transferred (the width of the article W) within an empty area in which no storage section 1 is formed, of the article storage racks 2; and when an article W is transferred from the first target storage section 1a to the first transferring device 11a, or when an article W is transferred from the second target storage section 1b to the second transferring device 11b, set the storage section 1 in which the article W is stored, as an empty area. Note that the control device H has the function of a control section that manages the storage sections 1 in the article storage racks 2.

Specifically, as shown in FIG. 42 for example, in the case where three types of articles W, namely small-sized articles WS, middle-sized articles WM, and large-sized articles WL, are provided as the plurality of types of articles W, the control device H manages regions E between adjacent support posts 2a in each row of the article storage racks 2 as any of: a small-sized region ES in which seven small-sized storage sections 1S are formed one after another in the rack width direction; a middle-sized region EM in which six middle-sized storage sections 1M are formed one after another in the rack width direction; a large-sized region EL in which five large-sized storage sections 1L are formed one after another in the rack width direction; and an empty region EF in which no storage section 1 is formed. Incidentally, the middle-sized articles WM are articles W having a larger length than the small-sized articles WS in the rack width direction, and the large-sized articles WL are articles W having a larger length than the middle-sized articles WM in the rack width direction. The small-sized storage sections 1S are storage sections 1 for storing the small-sized articles WS. The middle-sized storage sections 1M are storage sections 1 for storing the middle-sized articles WM, and are formed to be wider than the small-sized storage sections 1S. The large-sized storage sections 1L are storage sections 1 for storing the large-sized articles WL, and are formed to be wider than the middle-sized storage sections 1M.

The control device H is configured such that: in the case of storing a small-sized article WS in a region E that has been managed as an empty region EF, the control device H manages the region E that has been managed as an empty region EF as a small-sized region ES; in the case of storing a middle-sized article WM in a region E that has been managed as an empty region EF, the control device H manages the region E that has been managed as an empty region EF as a middle-sized region EM; and in the case of storing a large-sized article WL in a region E that has been managed as an empty region EF, the control device H manages the region E that has been managed as an empty region EF as a large-sized region EL. In other words, the classification of a region E (an empty region EF) is set based on the type of the article W that is first stored in the empty region EF.

In the case where all the articles W have been taken out from a region E that has been managed as the small-sized region ES, the middle-sized region EM, or the large-sized region EL, the control device H manages the region E, which has been managed as the small-sized region ES, the middle-sized region EM, or the large-sized region EL, as an empty region EF again. That is to say, once all the articles W are taken out from a region E that has been classified, the region E is reset to an empty region EF.

In this way, it is possible to manage the storage sections 1 and the empty regions EF for each region E.

Also, for example, a configuration may be adopted in which the control device H initially sets all of the regions between adjacent support posts 2a in each row as empty areas, and when storing an article W to the article storage racks 2, the control device H sets a storage section 1 corresponding to the size of the type of the article W to be stored (e.g., a storage section 1 having a size resulting from adding, to the width of the article W to be stored, a setting value for forming empty spaces on both sides of the article so that the pair of clamp fork devices 52 are able to enter the spaces), and the control device H maintains the setting of areas other than the area in which the storage section 1 has been set, as empty areas, so that a plurality of types of storage sections 1 and empty areas that co-exist in a single region can be managed. If this is the case, after taking out an article W from the area that has been managed as a storage section 1, the control device H manages the area, which has been managed as the storage section 1, as an empty area again.

In this way, it is possible to manage the storage sections 1 and the empty areas for each storage section 1.

The control device H is configured such that in the case of setting a plurality of types of storage sections 1 having different sizes in the rack width direction in the article storage racks 2 as described above, when transferring an article W from the first transferring device 11a to the first target storage section 1a, the control device H selects, as the first target storage section 1a, a storage section 1 having a size corresponding to the type of the article W from among the plurality of storage sections 1, and when transferring an article W from the second transferring device 11b to the second target storage section 1b, the control device H selects, as the second target storage section 1b, a storage section 1 having a size corresponding to the type of the article W from among the plurality of storage sections 1.

Incidentally, the control device H selects the first target storage section 1a and the second target storage section 1b from the plurality of storage sections 1, and the plurality of storage sections 1 include a storage section 1 that can be formed within an empty region EF and a storage section 1 that can be formed within an empty area.

Next, a description is given of an example of control performed in the case where the transferring devices 11 are each configured such that the pair of clamp fork devices 52 are individually moved in the rack width direction by the pair of clamp motors 53, and storage sections 1 and empty areas are managed in units of regions.

Note that, out of the pair of ends of the range of the slide movement in the rack width direction, the end at which the second transferring device 11b is located at the time execution of the movement control starts or at the time immediately before the movement control starts is defined as a main end, and the state in which the clamp fork device 52 on the side on which the main end is located relative to a sub end, out of the pair of clamp fork devices 52 in the second transferring device 11b, is located at the main end is defined as a main state in which the second transferring device 11b is located at the main end. Also, out of the pair of ends of the range of the slide movement in the rack width direction, the end opposite the main end is defined as a sub end, and the state in which the clamp fork device 52 on the side on which the sub end is located relative to the main end, out of the pair of clamp fork devices 52 in the second transferring device 11*b*, is located at the sub end is defined as a sub state in which the second transferring device 11*b* is located at the sub end.

More specifically, in the case where the second transferring device 11*b* is at the HP-side end of the range of the slide movement at the time execution of the movement control starts or at the time immediately before the movement control starts as shown in FIG. 43, the HP-side end is the main end. The state in which the second transferring device 11*b* is located at the HP-side end as shown in FIG. 43 is the main state, and the state in which the second transferring device 11*b* is located at the OP-side end as shown in FIG. 44 is the sub state.

Also, in the case where the second transferring device 11*b* is at the OP-side end of the range of the slide movement at the time execution of the movement control starts or at the time immediately before the movement control starts as shown in FIG. 44, the OP-side end is the main end. The state in which the second transferring device 11*b* is located at the OP-side end as shown in FIG. 44 is the main state, and the state in which the second transferring device 11*b* is located at the HP-side end as shown in FIG. 43 is the sub state. Note that it is also possible that the main state is defined as the state in which the clamp fork device 52 on the side on which the sub end is located relative to the main end, out of the pair of clamp fork devices 52 in the second transferring device 11*b*, is located at the main end, and the sub state is defined as the state in which the clamp fork device 52 on the side on which the main end is located relative to the sub end, out of the pair of clamp fork devices 52 in the second transferring device 11*b*, is located at the sub end.

In the movement control, first, it is determined whether or not the first transferring device 11*a* can be moved to the first target stopping position on the assumption that the second transferring device 11*b* in the main state is located at the second target stopping position.

Then, in the movement control, if it is determined that the first transferring device 11*a* can be moved to the first target stopping position, the second elevator body 10*b* is moved up/down and the travelling carriage 8 is caused to travel so that the second transferring device 11*b* is moved to the second target stopping position in the main state, and the first elevator body 10*a* is moved up/down and the first sliding device 12*a* is caused to operate so that the first transferring device 11*a* is moved to the first target stopping position.

Also, in the movement control, if it is determined that the first transferring device 11*a* cannot be moved to the first target stopping position, the second sliding device 12*b* is caused to operate, the second elevator body 10*b* is moved up/down, and the travelling carriage 8 is caused to travel so that the second transferring device 11*b* is moved to the second target stopping position in the sub state, and the first elevator body 10*a* is moved up/down and the first sliding device 12*a* is caused to operate so that the first transferring device 11*a* is moved to the first target stopping position.

Next, an additional description is given of the movement control. It is assumed here that two storage sections 1 (the first target storage section 1*a* and the second target storage section 1*b*) that are in a positional relationship that allows simultaneous transfer performed by selection control for loading or selection control for unloading have been selected.

As with the second transferring device 11*b* shown in FIG. 43, in the situation where the HP-side end is the main end and the second transferring device 11*b* is located at the main end at the time immediately before the movement control is performed, the control device H determines whether or not the first transferring device 11*a* can be moved to the first target stopping position, in the following manner.

That is, if the separation distance D3 between the first target storage section 1*a* and the second target storage section 1*b* in the rack width direction is equal to or smaller than the separation distance D2 between the first transferring device 11*a* and the second transferring device 11*b* in the rack width direction in the state where the first transferring device 11*a* and the second transferring device 11*b* are both located at the HP-side ends of their respective ranges of slide movement (the state shown in FIG. 43), the control device H determines that the first transferring device 11*a* can be moved to the first target stopping position, and if the separation distance D3 is greater than the separation distance D2 between the first transferring device 11*a* and the second transferring device 11*b* in the rack width direction in the state where the first transferring device 11*a* and the second transferring device 11*b* are both located at the HP-side ends of their respective ranges of slide movement, the control device H determines that the first transferring device 11*a* cannot be moved to the first target stopping position.

Also, as with the second transferring device 11*b* shown in FIG. 44, in the situation where the OP-side end is the main end and the second transferring device 11*b* is located at the main end at the time immediately before the movement control is performed, the control device H determines whether or not the first transferring device 11*a* can be moved to the first target stopping position, in the following manner.

That is, if the separation distance D3 between the first target storage section 1*a* and the second target storage section 1*b* in the rack width direction is equal to or smaller than the separation distance D2 between the first transferring device 11*a* and the second transferring device 11*b* in the rack width direction in the state where the first transferring device 11*a* and the second transferring device 11*b* are both located at the OP-side ends of their respective ranges of slide movement (the state shown in FIG. 44), the control device H determines that the first transferring device 11*a* can be moved to the first target stopping position, and if the separation distance D3 is greater than the separation distance D2 between the first transferring device 11*a* and the second transferring device 11*b* in the rack width direction in the state where the first transferring device 11*a* and the second transferring device 11*b* are both located at the OP-side ends of their respective ranges of slide movement, the control device H determines that the first transferring device 11*a* cannot be moved to the first target stopping position.

Incidentally, in the present embodiment, the range of the slide movement of the first transferring device 11*a* caused by the first sliding device 12*a* and the range of the slide movement of the second transferring device 11*b* caused by the second sliding device 12*b* are equal. In such a case, separation distance D2 between the first transferring device 11*a* and the second transferring device 11*b* in the rack width direction in the state where the first transferring device 11*a* and the second transferring device 11*b* are both located at the OP-side ends of their respective ranges of slide movement is equal to the separation distance D2 between the first transferring device 11*a* and the second transferring device 11*b* in the rack width direction in the state where the first transferring device 11*a* and the second transferring device 11*b* are both located at the HP-side ends of their respective ranges of slide movement.

Note that the separation distance between the first transferring device 11*a* and the second transferring device 11*b* is the distance between the central position between the pair of clamp fork devices 52 in the first transferring device 11*a* in the rack width direction and the central position between the pair of clamp fork devices 52 in the second transferring device 11b in the rack width direction.

As shown in the flowchart in FIG. 45, if the first transferring device 11a can be moved to the first target stopping position and the second transferring device 11b can be moved to the second target stopping position with the second transferring device 11b being maintained in the main state, and the separation distance D2 between the first transferring device 11a and the second transferring device 11b is equal to the separation distance D3 between the first target storage section 1a and the second target storage section 1b, the travel control, the first elevation control, and the second elevation control are performed so that the first transferring device 11a is moved to the first target stopping position and the second transferring device 11b (in the main state) is moved to the second target stopping position.

If the first transferring device 11a can be moved to the first target stopping position and the second transferring device 11b can be moved to the second target stopping position with the second transferring device 11b being maintained in the main state, but the separation distance D2 between the first transferring device 11a and the second transferring device 11b is different from (smaller than) the separation distance D3 between the first target storage section 1a and the second target storage section 1b, the travel control, the first elevation control, the second elevation control, and the first slide control are performed so that the first transferring device 11a is moved to the first target stopping position, and the second transferring device 11b (in the main state) is moved to the second target stopping position.

If the first transferring device 11a cannot be moved to the first target stopping position and the second transferring device 11b cannot be moved to the second target stopping position with the second transferring device 11b being maintained in the main state, the travel control, the first elevation control, the second elevation control, the first slide control, and the second slide control are performed so that the first transferring device 11a is moved to the first target stopping position and the second transferring device 11b (in the sub state) is moved to the second target stopping position.

In the first slide control, the first sliding device 12a is controlled such that the first transferring device 11a is located at the first target stopping position when the second transferring device 11b in the main state or the sub state is located at the second target stopping position.

In the second slide control, in order to change the state of the second transferring device 11b from the main state to the sub state, the second sliding device 12b is controlled such that, if the second transferring device 11b is located at the OP-side end of the range of the slide movement, the second transferring device 11b is moved to the HP-side end of the range of the slide movement, and if the second transferring device 11b is located at the HP-side end of the range of the slide movement, the second transferring device 11b is moved to the OP-side end of the range of the slide movement.

Incidentally, the second transferring device 11b whose state has changed from the main state (e.g., the state of being located at the HP-side end) to the sub state (e.g., the state of being located at the OP-side end) due to the second slide control in the movement control is located at the end of the range of the slide movement, and therefore the sub state becomes the main state (e.g., the state of being located at the OP-side end) in the movement control performed subsequently to this movement control.

Note that in the case where the main state may be fixedly set as the state in which the second transferring device 11b is located at one end of the range of the slide movement (e.g. the OP-side end), and the state of the second transferring device 11b is changed to the sub state (e.g., the state of being located at the HP-side end) by moving the second transferring device 11b to the other end of the range of the slide movement with the second slide control, the second transferring device 11b may be moved to one end of the range of the slide movement (e.g., the OP-side end) so that the second transferring device 11b returns to the main state before the subsequent movement control is performed.

(9) In the embodiments above, the plurality of storage sections 1 are each configured to be able to store two articles W aligned in the rack front-rear direction. However, some or all of the plurality of storage sections 1 may be configured to be able to store only one article W.

In the embodiments above, the first transferring device 11a and the second transferring device 11b are each configured to be able to support two articles W aligned in the rack front-rear direction. However, one or both of the first transferring device 11a and the second transferring device 11b may be configured to be able to support only one article W.

(10) In the embodiments above, a pair of article storage racks 2 are provided such that the travel path of the stacker crane 3 is interposed therebetween and their front faces oppose each other. However, an article storage rack 2 may be provided only on one side of the travel path of the stacker crane 3 in the rack front-rear direction.

Summary of Embodiments Above

The following provides a summary of the article transport facility described above.

The article transport facility is provided with: an article storage rack in which a plurality of storage sections are arranged in a plurality of rows in a vertical direction and a plurality of columns in a rack width direction; and a stacker crane that is configured to travel in front of the article storage rack along the rack width direction, and the stacker crane is provided with: a travelling carriage that is configured to be able to travel along the rack width direction; a first mast that is provided so as to stand on the travelling carriage; a second mast that is provided so as to stand on the same travelling carriage on which the first mast is provided; a first elevator body that is configured to be guided along the first mast; a second elevator body that is configured to be guided along the second mast so as to be able to move up/down independently of the first elevator body, and that is aligned with the first elevator body in the rack width direction in plan view; a first transferring device that is supported by the first elevator body and that is configured to transfer an article between the plurality of storage sections and the first transferring device; and a second transferring device that is supported by the second elevator body and that is configured to transfer an article between the plurality of storage sections and the second transferring device.

With this configuration, the first transferring device is supported by the first elevator body and the second transferring device is supported by the second elevator body, and the first elevator body and the second elevator body are configured to be able to individually move up/down. Therefore, it is possible to simultaneously transfer articles to two storage sections belonging to the same row by positioning the first elevator body and the second elevator body at the same level, and it is possible to simultaneously transfer articles to two storage sections belonging to different rows by positioning the first elevator body and the second elevator body at different levels.

In this way, since the first elevator body and the second elevator body are able to individually move up/down, the two storage sections to/from which articles are transferred by the first transferring device and the second transferring device are not limited to those belonging to the same row, and it is possible to perform simultaneous transfer of articles to/from two storage sections belonging to different rows. Therefore, it is easier to perform simultaneous transfer of articles to/from two storage sections with a single stacker crane, and it is possible to efficiently transport articles.

Here, it is preferable that the article transport facility further includes a first sliding device that is supported by the first elevator body, and the first sliding device is configured to move the first transferring device along the rack width direction relative to the first elevator body.

With this configuration, it is possible to move the first transferring device in the rack width direction relative to the first elevator body, using the first sliding device. It is possible to change the distance between the first transferring device and the second transferring device in the rack width direction by moving the first transferring device along the rack width direction in this way.

By changing the distance between the first transferring device and the second transferring device, it is possible to change the distance between the first transferring device and the second transferring device to a distance that corresponds to the distance between two storage sections to/from which an article is transferred. Therefore, it is even easier to perform simultaneous transfer of articles to/from two storage sections.

More specifically, if the positions of the storage sections in the article storage rack are fixed, the distance between the first transferring device and the second transferring device may be fixed to the constant distance that is the same as the distance between two storage sections aligned in the rack width direction. However, if the distance between the first transferring device and the second transferring device is fixed to a constant distance, it is impossible to address the following cases.

That is, in some cases, the article storage rack may be inclined in the rack width direction due to an installation error, deterioration over time, or the like. In such cases, the distance in the rack width direction between two storage sections to/from which articles are transferred changes depending on the combination of the rows to which the two storage sections belong, and therefore, if the distance between the first transferring device and the second transferring device is fixed to a constant distance, it may be impossible to simultaneously transfer articles to/from two storage sections with a single stacker crane in some cases.

Considering the above, this configuration makes it possible to change the distance between the first transferring device and the second transferring device in the rack width direction to be a distance corresponding to the distance between the two storage sections to/from which articles are transferred, by moving the first transferring device in the rack width direction relative to the first elevator body, using the first sliding device. Consequently, even if the distance between two storage sections to/from which articles are transferred varies depending on the positional relationship of the two storage sections, it is possible to change the distance between the first transferring device and the second transferring device in the rack width direction to be a distance corresponding to the distance between the two storage sections to/from which articles are transferred, and it is possible to simultaneously transfer articles to/from two storage sections. Therefore, it is even easier to perform simultaneous transfer of articles to/from two storage sections.

Also, by setting the range of the movement of the first transferring device caused by the first sliding device to be greater than or equal to the separation distance between a pair of storage sections that are adjacent to each other in the rack width direction and changing the distance between the first transferring device and the second transferring device in the rack width direction, it is possible to change the positional relationship that allows simultaneous transfer of articles, of the rows to which the two storage sections belong. For example, it may be made possible to select two storage sections that respectively belong to two rows that are adjacent each other, or to select two storage sections that respectively belong to two rows that are adjacent to each other with a single row interposed therebetween. Thus, it is possible to increase possibilities in which articles can be simultaneously transferred.

It is also preferable that a range of a movement of the first transferring device caused by the first sliding device is set to be smaller than a separation distance between a pair of storage sections that are adjacent to each other in the rack width direction.

With this configuration, the range of a movement of the first transferring device caused by the first sliding device is set to be smaller than the separation distance between a pair of storage sections that are adjacent to each other in the rack width direction. Therefore, although the positional relationship of rows to which two storage sections to/from which articles are simultaneously transferred is maintained, it is possible to address the displacement in the rack width direction due to the difference in the levels of storage sections generated when the article storage rack is inclined in the rack width direction.

That is, by setting the range of the movement of the first transferring device caused by the first sliding device to be smaller than the separation distance between a pair of storage sections that are adjacent to each other in the rack width direction, it is possible to reduce the range of the movement of the first transferring device, compared to the case in which the range of the movement of the first transferring device caused by the first sliding device is set to be greater than or equal to the separation distance between a pair of storage sections that are adjacent to each other in the rack width direction. Therefore, it is easy to provide the first elevator body, which supports the first transferring device, with a configuration that is compact in the rack width direction.

It is also preferable that the article transport facility further includes a second sliding device that is supported by the second elevator body, and the second sliding device is configured to move the second transferring device along the rack width direction relative to the second elevator body.

With this configuration, it is possible to move the second transferring device in the rack width direction relative to the second elevator body, using the second sliding device, as well as to move the first transferring device in the rack width direction relative to the first elevator body, using the first sliding device. By moving both the first transferring device and the second transferring device in the rack width direction in this way, it is possible to change the distance between the first transferring device and the second transferring device in the rack width direction within a wide range. Also, when a configuration is to be adopted in which the distance between the first transferring device and the second transferring device in the rack width direction is changeable within a desired range, it is possible to reduce the respective ranges of movement of the first transferring device and the second transferring device by moving both the first transferring device and the second transferring device in the rack width direction and sharing the amount of change in the distance, between the first transferring device and the second transferring device.

It is also preferable that a range of a movement of the first transferring device caused by the first sliding device and a range of a movement of the second transferring device caused by the second sliding device are set such that a sum of the ranges of movement is smaller than a separation distance between a pair of storage sections that are adjacent to each other in the rack width direction.

With this configuration, the sum of the range of the movement of the first transferring device caused by the first sliding device and the range of the movement of the second transferring device caused by the second sliding device is set to be smaller than the separation distance between a pair of storage sections that are adjacent to each other in the rack width direction. Therefore, it is possible to reduce the range of the movement of the first transferring device and the range of the movement of the second transferring device, compared to the case in which the sum of the respective ranges of movement of these transferring devices is set to be greater than or equal to the separation distance between a pair of storage sections that are adjacent to each other in the rack width direction. Therefore, it is easy to provide the first elevator body, which supports the first transferring device, and the second elevator body, which supports the second transferring device, with a configuration that is compact in the rack width direction.

It is also preferable that a storage section to/from which the first transferring device transfers an article is defined as a first target storage section, and a storage section to/from which the second transferring device transfers an article is defined as a second target storage section, and a minimum separation distance and a maximum separation distance between the first transferring device and the second transferring device are respectively defined as a first distance and a second distance, the minimum separation distance and the maximum separation distance being determined by a range of a movement of the first transferring device caused by the first sliding device, the article transport facility further includes: a selecting section that is configured to select, from among the plurality of storage sections, two storage sections whose separation distance from each other in the rack width direction is no smaller than the first distance and no greater than the second distance, and that are located at a same level or different levels, as the first target storage section and the second target storage section; and a control device that is configured to control operations of the stacker crane, and the control device is configured to perform a first movement control by which: the second elevator body is moved up/down and the travelling carriage is caused to travel so that the second transferring device moves to a second target stopping position at which the second transferring device is able to transfer an article to/from the second target storage section; and the first elevator body is moved up/down and the first sliding device is caused to operate so that the first transferring device moves to a first target stopping position at which the first transferring device is able to transfer an article to/from the first target storage section.

With this configuration, the first target storage section and the second target storage section selected by the selecting section have a separation distance that is no smaller than the minimum separation distance (the first distance) and no greater than the maximum separation distance (the second distance) between the first transferring device and the second transferring device, and are located at the same level or different levels, and the positional relationship of the first target storage section and the second target storage section is a positional relationship that allows the first transferring device to be located at the first target stopping position and that allows the second transferring device to be located at the second target stopping position. Therefore, it is possible to simultaneously transfer articles to/from the first target storage section and to/from the second target storage section by causing the first transferring device to be located at the first target stopping position and causing the second transferring device to be located at the second target stopping position.

In the first movement control, first, the second elevator body is moved up/down and the travelling carriage is caused to travel so that the second transferring device is moved to the second target stopping position. That is, the travelling carriage moves to the stopping position that has been set relative to the position of the second target storage section.

Also, in the situation where the second transferring device is located at the second target stopping position in this way, the first elevator body is moved up/down and the first transferring device is moved by the first sliding device so that the first transferring device is moved to the first target stopping position.

By performing the first movement control in this way, it is possible to cause the first transferring device to be located at the first target stopping position and to cause the second transferring device to be located at the second target stopping position. Also, since it is not necessary to move the second transferring device in the rack width direction relative to the second elevator body in the first movement control, it is possible to simplify the configuration of the stacker crane by omitting the sliding device for sliding the second transferring device along the rack width direction relative to the second elevator body.

It is also preferable that the article transport facility further includes a second sliding device that is supported by the second elevator body, the second sliding device is configured to move the second transferring device within a range of a slide movement along the rack width direction relative to the second elevator body, a storage section to/from which the first transferring device transfers an article is defined as a first target storage section, and a storage section to/from which the second transferring device transfers an article is defined as a second target storage section, a minimum separation distance and a maximum separation distance between the first transferring device and the second transferring device are respectively defined as a third distance and a fourth distance, the minimum separation distance and the maximum separation distance being determined by a range of a movement of the first transferring device caused by the first sliding device and a range of a movement of the second transferring device caused by the second sliding device, the article transport facility further includes: a selecting section that is configured to select, from among the plurality of storage sections, two storage sections whose separation distance from each other in the rack width direction is no smaller than the third distance and no greater than the fourth distance, and that are located at a same level or different levels, as the first target storage section and the second target storage section; and a control device that is configured to control operations of the stacker crane, and the control device is configured to perform a first movement control by which: the first transferring device is moved to a first target stopping position at which the first transferring device is able to transfer an article to/from the first target storage section; and the second transferring device is moved to a second target stopping position at which the second transferring device is able to transfer an article to/from the second target storage section, a state in which the second transferring device is located at a main end is defined as a main state, the main end being, out of a pair of ends of the range of the slide movement in the rack width direction, an end at which the second transferring device is located at a time execution of the first movement control starts or at a time immediately before the first movement control starts, and a state in which the second transferring device is located at a sub end is defined as a sub state, the sub end being an end that is opposite the main end, and the first movement control is a control by which: on an assumption that the second transferring device in the main state is located at the second target stopping position, if the first transferring device can be moved to the first target stopping position, the second elevator body is moved up/down and the travelling carriage is caused to travel so that the second transferring device is moved to the second target stopping position in the main state, and the first elevator body is moved up/down and the first sliding device is caused to operate so that the first transferring device is moved to the first target stopping position; and on an assumption that the second transferring device in the main state is located at the second target stopping position, if the first transferring device cannot be moved to the first target stopping position, the second sliding device is caused to operate, the second elevator body is moved up/down, and the travelling carriage is caused to travel so that the second transferring device is moved to the second target stopping position in the sub state, and the first elevator body is moved up/down and the first sliding device is caused to operate so that the first transferring device is moved to the first target stopping position.

With this configuration, in the situation where the second transferring device located at the main end has been moved to the second target stopping position, if it is impossible to cause the first transferring device to move to the first target stopping position by causing the first elevator body to move up/down and moving the first transferring device in the rack width direction relative to the first elevator body, it is possible to move the first transferring device to the first target stopping position and move the second transferring device to the second target stopping position by causing the second transferring device to move in the rack width direction relative to the second elevator body, using the second sliding device, so as to move the second transferring device to the sub end, and causing the travelling carriage to travel, causing the first elevator body and the second elevator body to move up/down, and causing the first transferring device to move in the rack width direction relative to the first elevator body, using the first sliding device.

Also, in the situation where the second transferring device located at the main end has been moved to the second target stopping position, if it is possible to move the first transferring device to the first target stopping position by causing the first elevator body to move up/down and causing the first transferring device to move in the rack width direction relative to the first elevator body, it is possible to cause the first transferring device to move to the first target stopping position and to cause the second transferring device to move to the second target stopping position without moving the second transferring device from the main end, by causing the travelling carriage to travel, causing the first elevator body and the second elevator body to move up/down, and causing the first transferring device to move in the rack width direction relative to the first elevator body, using the first sliding device.

In this way, it is possible to change the distance between the first transferring device and the second transferring device within a wide range by causing both the first transferring device and the second transferring device to move, using the slide devices, and it is therefore easier to perform simultaneous transfer of articles to/from two storage sections. Also, in the situation where the second transferring device has been moved to the main end, if it is possible to cause the first transferring device to move to the first target stopping position and cause the second transferring device to move to the second target stopping position, the second transferring device is not moved in the rack width direction relative to the elevator body. Therefore, it is possible to suppress the deterioration of the second transferring device, and the deterioration of the second sliding device that moves the second transferring device.

It is also preferable that the first transferring device includes a pair of first fork devices that are aligned in the rack width direction, the pair of first fork devices are configured to move so as to protrude and retract in a rack front-rear direction, and to be individually moved in the rack width direction by the first sliding device, the rack front-rear direction being a direction that is orthogonal to the rack width direction in plan view, the second transferring device includes a pair of second fork devices that are aligned in the rack width direction, the pair of second fork devices are configured to move so as to protrude and retract in the rack front-rear direction, and to be individually moved in the rack width direction by the second sliding device, the main state is defined as a state in which a second fork device on a side on which the main end is located relative to the sub end, out of the pair of second fork devices in the second transferring device, is located at the main end, and the sub state is defined as a state in which a second fork device on a side on which the sub end is located relative to the main end, out of the pair of second fork devices in the second transferring device, is located at the sub end.

With this configuration, it is possible to adjust the distance between the pair of fork devices according to the width of the article to be transferred by the first transferring device, by the first transferring device causing the pair of first fork devices to move in opposite directions along the rack width direction using the first sliding device, such that the pair of fork devices move away from and closer to each other.

Also, it is possible to transfer an article between the first transferring device and the first target storage section by causing the pair of first fork devices to move closer to each other, sandwiching the article in the rack width direction with the pair of first fork devices, and causing the pair of first fork devices sandwiching the article to protrude and retract in the rack front-rear direction. Incidentally, a configuration may be adopted in which the pair of first fork devices are each provided with an engaging section, and an article is transferred between the first transferring device and the first target storage section by causing the pair of first fork devices to move closer to each other, using the first sliding device, so as not to press the article, causing the engaging sections of the pair of first fork devices to engage with the article, and causing the pair of first fork devices to protrude and retract in the rack front-rear direction.

Also, regarding the second transferring device, as with the first transferring device, it is possible to transfer an article between the second transferring device and the second target storage section by causing the pair of second fork devices to move away from and closer to each other and to protrude using the first sliding device, and to retract in the rack front-rear direction.

It is also preferable that the article transport facility is capable of transporting a plurality of types of articles having different sizes in the rack width direction, the plurality of storage sections include a plurality of types of storage sections having different sizes in the rack width direction, the selecting section is configured to: when an article is transferred from the first transferring device to the first target storage section, select a storage section having a size corresponding to a type of the article as the first target storage section; and when an article is transferred from the second transferring device to the second target storage section, select a storage section having a size corresponding to the type of the article as the second target storage section, and the article transport facility further comprises a control section configured to manage the plurality of storage sections in the article storage rack, and the control section is configured to: when an article is transferred from the first transferring device to the first target storage section or when an article is transferred from the second transferring device to the second target storage section, set a storage section having a size corresponding to the article to be transferred, within an empty area in which no storage section is formed, of the article storage rack; and when transferring an article from the first target storage section to the first transferring device or when transferring an article from the second target storage section to the second transferring device, set, whichever the first target storage section or the second target storage section stores the article, as the empty area.

With this configuration, even in a storage section in which a small article has been stored, it is possible to set a single large storage section within an area in which a plurality of storage sections have been successively formed, and to thereby store a large article in the storage section. Also, even in a storage section in which a large article has been stored, it is possible to form a plurality of small storage sections, and to thereby store a plurality of small articles.

In this way, it is possible to selectively store a small article or a large article in the same area, and therefore it is possible to efficiently store a plurality of types of articles in the article storage rack, compared to the case in which only a small article or a large article can be stored in the same area.

It is also preferable that a storage section to/from which the first transferring device transfers an article is defined as a first target storage section, and a storage section to/from which the second transferring device transfers an article is defined as a second target storage section, and a minimum separation distance and a maximum separation distance between the first transferring device and the second transferring device are respectively defined as a third distance and a fourth distance, the minimum separation distance and the maximum separation distance being determined by a range of a movement of the first transferring device caused by the first sliding device and a range of a movement of the second transferring device caused by the second sliding device, the article transport facility further comprises: a selecting section that is configured to select, from among the plurality of storage sections, two storage sections whose separation distance from each other in the rack width direction is no smaller than the third distance and no greater than the fourth distance, and that are located at a same level or different levels, as the first target storage section and the second target storage section; and a control device that is configured to control operations of the stacker crane, and the control device is configured to perform a second movement control by which: the travelling carriage is caused to travel so that the travelling carriage is moved to a target travel stopping position that is set between the first target storage section and the second target storage section in the rack width direction; the first elevator body is moved up/down and the first sliding device is caused to operate so that the first transferring device is moved to a first target stopping position at which the first transferring device is able to transfer an article to/from the first target storage section; and the second elevator body is moved up/down and the second sliding device is caused to operate so that the second transferring device is moved to a second target stopping position at which the second transferring device is able to transfer an article to/from the second target storage section.

With this configuration, the first target storage section and the second target storage section selected by the selecting section have a separation distance that is no smaller than the minimum separation distance (the third distance) and no greater than the maximum separation distance (the fourth distance) between the first transferring device and the second transferring device, and are located at the same level or different levels, and the positional relationship of the first target storage section and the second target storage section is a positional relationship that allows the first transferring device to move to the first target stopping position and allows the second transferring device to move to the second target stopping position. Therefore, it is possible to simultaneously transfer articles between the first target storage section and the second target storage section by causing the first transferring device to move to the first target stopping position and causing the second transferring device to move to the second target stopping position.

In the second movement control, first, the travelling carriage is caused to travel so that the travelling carriage is moved to the target travel stopping position that is set between the first target storage section and the second target storage section in the rack width direction. That is, the travelling carriage travels to the target travel stopping position that is set based on the positions of both the first target storage section and the second target storage section.

In the situation where the travelling carriage is located at the target travel stopping position in this way, the first elevator body is moved up/down and the first transferring device is moved by the first sliding device so that the first transferring device is moved to the first target stopping position. Also, in the situation where the travelling carriage is located at the target travel stopping position in this way, the second elevator body is moved up/down and the second transferring device is moved by the second sliding device so that the second transferring device is moved to the second target stopping position.

By performing the second movement control in this way, it is possible to cause the first transferring device to move to the first target stopping position and to cause the second transferring device to move to the second target stopping position. Also, since the distance between the first transferring device and the second transferring device is changed by moving both the first transferring device and the second transferring device along the rack width direction, it is possible to more quickly change the distance compared to the case where the distance between the first transferring device and the second transferring device is changed by moving only the first transferring device along the rack width direction.

It is also preferable that a standard stopping position for the first transferring device is set at a center of the range of the movement of the first transferring device caused by the first sliding device, a standard stopping position for the second transferring device is set at a center of the range of the movement of the second transferring device caused by the second sliding device, and the target travel stopping position is set such that a central position between the standard stopping position for the first transferring device and the standard stopping position for the second transferring device in the rack width direction coincides with a central position between the first target storage section and the second target storage section in the rack width direction.

With this configuration, the target travel stopping position is set such that the central position between the standard stopping position for the first transferring device and the standard stopping position for the second transferring device in the rack width direction coincides with the central position between the first target storage section and the second target storage section in the rack width direction.

Therefore, it is possible to equalize the amount of slide movement of the first transferring device and the amount of slide movement of the second transferring device when the first transferring device and the second transferring device are both caused to slide by the sliding devices in the second movement control.

It is also preferable that only one elevation guide mast is provided so as to stand on the travelling carriage, the same elevation guide mast is configured by the first mast and the second mast, and the first elevator body and the second elevator body are arranged on both sides of the elevation guide mast in the rack width direction, with the elevation guide mast being interposed therebetween.

With this configuration, the same elevation guide mast is configured by the first mast and the second mast, and the first elevator body and the second elevator body are arranged on both sides of the elevation guide mast in the rack width direction, with the elevation guide mast being interposed therebetween. Therefore, it is possible to simplify the configuration of the stacker crane compared to the case in which the first mast and the second mast are configured with different elevation guide masts.

It is also preferable that a direction that is orthogonal to the rack width direction in plan view is defined as a rack front-rear direction, the plurality of storage sections are each configured to be able to store two articles aligned in the rack front-rear direction, the first transferring device and the second transferring device are each configured to be able to support two articles aligned in the rack front-rear direction, a storage section to/from which the first transferring device transfers an article is defined as a first target storage section, and a storage section to/from which the second transferring device transfers an article is defined as a second target storage section, and the article transport facility further comprises a control device that is configured to control operations of the stacker crane, and the control device is configured to perform a third movement control by which the travelling carriage is caused to travel and the first elevator body and the second elevator body are moved up/down so that: the first transferring device is moved to a first target stopping position at which the first transferring device is able to transfer an article to/from the first target storage section; and the second transferring device is moved to a second target stopping position at which the second transferring device is able to transfer an article to/from the second target storage section.

With this configuration, the control device performs the third movement control, and thus the first transferring device is moved to the first target stopping position and the second transferring device is moved to the second target stopping position. Then, it is possible to simultaneously transfer two articles aligned in the rack front-rear direction between the first target storage section and the first transferring device by causing the first transferring device to operate in the situation where the first transferring device is located at the first target stopping position. Also, it is possible to simultaneously transfer two articles aligned in the rack front-rear direction between the second target storage section and the second transferring device by causing the second transferring device to operate in the situation where the second transferring device is located at the second target stopping position.

Since it is possible to simultaneously transfer two articles aligned in the rack front-rear direction between a transferring device and a storage section by operating the first transferring device or the second transferring device, it is possible to efficiently store articles to a storage section and take out articles from a storage section.

It is also preferable that the control device is configured to perform a simultaneous transfer control by which a first transfer control and a second transfer control are simultaneously performed in the situation where the first transferring device is located at the first target stopping position and the second transferring device is located at the second target stopping position, the first transfer control includes: a first storage transfer control by which the first transferring device is controlled so that one or two articles are transferred from the first transferring device to the first target storage section; and a first take-out transfer control by which the first transferring device is controlled so that one or two articles are transferred from the first target storage section to the first transferring device, and the second transfer control includes: a second storage transfer control by which the second transferring device is controlled so that one or two articles are transferred from the second transferring device to the second target storage section; and a second take-out transfer control by which the second transferring device is controlled so that one or two articles are transferred from the second target storage section to the second transferring device.

With this configuration, the storing of one or two articles to the first target storage section, using the first transferring device, and the taking out of one or two articles from the second target storage section, using the second transferring device, can be simultaneously performed by performing the first storage transfer control as the first transfer control and performing the second take-out transfer control as the second transfer control in the simultaneous transfer control.

Also, the taking out of one or two articles from the first target storage section, using the first transferring device, and the storing of one or two articles to the second target storage section, using the second transferring device, can be simultaneously performed by performing the first take-out transfer control as the first transfer control and performing the second storage transfer control as the second transfer control in the simultaneous transfer control.

In this way, the control device performs the simultaneous transfer control, and thus the storing of an article to a storage section and the taking out of an article from a storage section can be simultaneously performed with the first transferring device and the second transferring device. Therefore, it is possible to efficiently perform the storing of an article to a storage section and the taking out of an article from a storage section compared to the case in which, first, an article is stored to a storage section with one of the first transferring device and the second transferring device, and then an article is taken out from a storage section with the other transferring device.

It is also preferable that the article storage rack is provided as a pair of article storage racks such that a travel path of the stacker crane is interposed therebetween and respective front faces thereof oppose each other, in a case of sequentially performing a first simultaneous transfer control that serves as the simultaneous transfer control, the third movement control, and a second simultaneous transfer control that serves as the simultaneous transfer control, in the stated order, if the first take-out transfer control and the second storage transfer control have been performed in the first simultaneous transfer control, the control device performs the first storage transfer control and the second take-out transfer control in the second simultaneous transfer control, and if the first storage transfer control and the second take-out transfer control have been performed in the first simultaneous transfer control, the control device performs the first take-out transfer control and the second storage transfer control in the second simultaneous transfer control, in the first take-out transfer control and the second take-out transfer control performed in the first simultaneous transfer control, if, out of two articles stored in a storage section that is a transfer target, a rear-side article is an unload target article and a front-side article is a non-unload target article, the control device transfers the two articles, namely the unload target article and the non-unload target article, from the storage section of one article storage rack out of the pair of article storage racks to the first transferring device or to the second transferring device, and in the first storage transfer control and the second storage transfer control performed in the second simultaneous transfer control, if an unload target article and a non-unload target article are supported on the first transferring device or the second transferring device, the control device transfers only the non-unload target article, out of the two articles, namely the unload target article and the non-unload target article, from the first transferring device or the second transferring device to a storage section of the other article storage rack out of the pair of article storage racks.

With this configuration, in the case where two articles, namely an unload target article and a non-unload target article, have been transferred from the first target storage section (or the second target storage section) of one of the article storage racks to a transferring device and have been taken out by performing the first take-out transfer control (or the second take-out transfer control) in the first simultaneous transfer control, it is possible to take out an unload target article from a storage section while storing a non-unload target article to a storage section by performing the first storage transfer control (or the second storage transfer control) in the second simultaneous transfer control and transferring the non-unload target article from the first transferring device (or the second transferring device) and storing the non-unload target article to the first target storage section (or the second target storage section) of the other article storage rack.

More specifically, if two articles, namely a rear-side article and a front-side article, are stored in one storage section, and if the rear-side article is an unload target article and the front-side article is a non-unload target article, it is impossible to take out only the unload target article from the storage section due to the presence of the non-unload target article.

Therefore, as described above, the first take-out transfer control (or the second take-out transfer control) is performed in the first simultaneous transfer control so that both the unload target article and the non-unload target article are transferred from the first target storage section (or the second target storage section) to the first transferring device (or the second transferring device) and both articles are thus temporarily taken out from the first target storage section (or the second target storage section) of one of the article storage racks. Then, the first storage transfer control (or the second storage transfer control) is performed in the second simultaneous transfer control so that only the non-unload target article, out of the two articles namely the unload target article and the non-unload target article, is transferred from the first transferring device (or the second transferring device) to the first target storage section (or the second target storage section) of the other article storage rack out of the pair of article storage racks, and thus it is possible to take out an unload target article from a storage section while storing a non-unload target article to an article storage rack.

Also, in the first simultaneous transfer control, it is possible to simultaneously perform the taking out of articles, by which two articles, namely the unload target article and the non-unload target article, are transferred from the first target storage section (or the second target storage section) to the first transferring device (or the second transferring device) by the first transferring device (or the second transferring device), and the storing of an article, by which one or two articles are transferred from the second transferring device (or the first transferring device) to the second target storage section (or the first target storage section) by the second transferring device (or the first transferring device). Also, in the second simultaneous transfer control, it is possible to simultaneously perform the storing of an article, by which the non-unload target article is transferred from the first transferring device (or the second transferring device) to the first target storage section (or the second target storage section) by the first transferring device (or the second transferring device), and the taking out of an article, by which one or two articles are transferred from the second target storage section (or the first target storage section) to the second transferring device (or the first transferring device) by the second transferring device (or the first transferring device). Therefore, it is possible to efficiently perform the storing of an article to a storage section and the taking out of an article from a storage section, compared to the case in which the taking out of both the unload target article and the non-unload target article from storage sections using the first transferring device (or the second target storage section), and the storing of an article using the second transferring device (or the first transferring device) are separately performed, and the case in which the storing of the non-unload target article using the second transferring device (or the first transferring device) and the taking out of an article using the first transferring device (or the second transferring device) are separately performed.

It is also preferable that in a case of sequentially performing the second simultaneous transfer control, the third movement control, and a third simultaneous transfer control that serves as the simultaneous transfer control, in the stated order, if the first take-out transfer control and the second storage transfer control have been performed in the second simultaneous transfer control, the control device performs the first storage transfer control and the second take-out transfer control in the third simultaneous transfer control, and if the first storage transfer control and the second take-out transfer control have been performed in the second simultaneous transfer control, the control device performs the first take-out transfer control and the second storage transfer control in the third simultaneous transfer control, in the first take-out transfer control and the second take-out transfer control performed in the second simultaneous transfer control, if, out of two articles stored in a storage section that is a transfer target, a rear-side article is an unload target article and a front-side article is a non-unload target article, the control device transfers the two articles, namely the unload target article and the non-unload target article, from the storage section of one article storage rack out of the pair of article storage racks to the first transferring device or to the second transferring device, and in the first storage transfer control and the second storage transfer control performed in the third simultaneous transfer, if an unload target article and a non-unload target article are supported on the first transferring device or the second transferring device, the control device transfers only the non-unload target article, out of the two articles, namely the unload target article and the non-unload target article, from the first transferring device or the second transferring device to a storage section of the other article storage rack out of the pair of article storage racks.

With this configuration, in the case where two articles, namely an unload target article and a non-unload target article, have been transferred from the second target storage section (or the first target storage section) of one of the article storage racks to a transferring device and have been taken out by performing the second take-out transfer control (or the first take-out transfer control) in the second simultaneous transfer control, it is possible to take out an unload target article from a storage section while storing a non-unload target article to a storage section by performing the second storage transfer control (or the first storage transfer control) in the third simultaneous transfer control and transferring the non-unload target article from the second transferring device (or the first transferring device) and storing the non-unload target article to the second target storage section (or the first target storage section) of the other article storage rack.

That is, in the second simultaneous transfer control, it is possible to simultaneously perform the taking out of articles, by which two articles, namely the unload target article and the non-unload target article, are transferred from the second target storage section (or the first target storage section) to the second transferring device (or the first transferring device) by the second transferring device (or the first transferring device), and the storing of articles, by which the non-unload target article is transferred from the first transferring device (or the second transferring device) to the first target storage section (or the second target storage section) by the first transferring device (or the second transferring device). Also, in the third simultaneous transfer control, it is possible to simultaneously perform the storing of an article, by which the non-unload target article is transferred from the second transferring device (or the first transferring device) to the second target storage section (or the first target storage section) by the second transferring device (or the first transferring device), and the taking out of an article, by which one or two articles are transferred from the first target storage section (or the second target storage section) to the first transferring device (or the second transferring device) by the first transferring device (or the second transferring device). Therefore, it is possible to efficiently perform the storing of an article to a storage section and the taking out of an article from a storage section, compared to the case in which the taking out of both the unload target article and the non-unload target article from storage sections using the second transferring device (or the first target storage section), and the storing of the non-unload target article to a storage section using the first transferring device (or the second transferring device) are separately performed.

What is claimed is:

1. An article transport facility, comprising:
an article storage rack in which a plurality of storage sections are arranged in a plurality of rows in a vertical direction and a plurality of columns in a rack width direction; and
a stacker crane that is configured to travel in front of the article storage rack along the rack width direction,
wherein the stacker crane is provided with:
a travelling carriage that is configured to be able to travel along the rack width direction;
a first mast that is provided so as to stand on the travelling carriage;
a second mast that is provided so as to stand on the same travelling carriage on which the first mast is provided;
a first elevator body that is configured to be guided along the first mast;
a second elevator body that is configured to be guided along the second mast so as to be able to move up/down independently of the first elevator body, and that is aligned with the first elevator body in the rack width direction in plan view;
a first transferring device that is supported by the first elevator body and that is configured to transfer an article between the plurality of storage sections and the first transferring device; and
a second transferring device that is supported by the second elevator body and that is configured to transfer an article between the plurality of storage sections and the second transferring device,
the article transport facility further comprises a first sliding device that is supported by the first elevator body;
the first sliding device is configured to move the first transferring device along the rack width direction relative to the first elevator body; and
a maximum possible range of a movement of the first transferring device caused by the first sliding device is set to be smaller than a separation distance between a pair of storage sections that are adjacent to each other in the rack width direction.

2. The article transport facility according to claim 1, further comprising
a second sliding device that is supported by the second elevator body, wherein
the second sliding device is configured to move the second transferring device along the rack width direction relative to the second elevator body.

3. The article transport facility according to claim 2, wherein
the maximum possible range of a movement of the first transferring device caused by the first sliding device and a maximum possible range of a movement of the second transferring device caused by the second sliding device are set such that a sum of the ranges of movement is smaller than a separation distance between a pair of storage sections that are adjacent to each other in the rack width direction.

4. The article transport facility according to claim 1, wherein
only one elevation guide mast is provided so as to stand on the travelling carriage,
the same elevation guide mast is configured by the first mast and the second mast, and the first elevator body and the second elevator body are arranged on both sides of the elevation guide mast in the rack width direction, with the elevation guide mast being interposed therebetween.

5. The article transport facility according to claim 1, wherein
a direction that is orthogonal to the rack width direction in plan view is defined as a rack front-rear direction,
the plurality of storage sections are each configured to be able to store two articles aligned in the rack front-rear direction,
the first transferring device and the second transferring device are each configured to be able to support two articles aligned in the rack front-rear direction,
a storage section to/from which the first transferring device transfers an article is defined as a first target storage section, and a storage section to/from which the second transferring device transfers an article is defined as a second target storage section, and
the article transport facility further comprises a control device that is configured to control operations of the stacker crane, and the control device is configured to perform a third movement control by which the travelling carriage is caused to travel and the first elevator body and the second elevator body are moved up/down so that: the first transferring device is moved to a first target stopping position at which the first transferring device is able to transfer an article to/from the first target storage section; and the second transferring device is moved to a second target stopping position at which the second transferring device is able to transfer an article to/from the second target storage section.

6. The article transport facility according to claim 5, wherein
the control device is configured to perform a simultaneous transfer control by which a first transfer control and a second transfer control are simultaneously performed in a situation where the first transferring device is located at the first target stopping position and the second transferring device is located at the second target stopping position,
the first transfer control includes: a first storage transfer control by which the first transferring device is controlled so that one or two articles are transferred from the first transferring device to the first target storage section; and a first take-out transfer control by which the first transferring device is controlled so that one or two articles are transferred from the first target storage section to the first transferring device, and
the second transfer control includes: a second storage transfer control by which the second transferring device is controlled so that one or two articles are transferred from the second transferring device to the second target storage section; and a second take-out transfer control by which the second transferring device is controlled so that one or two articles are transferred from the second target storage section to the second transferring device.

7. The article transport facility according to claim 6, wherein
the article storage rack is provided as a pair of article storage racks such that a travel path of the stacker crane is interposed therebetween and respective front faces thereof oppose each other,
in a case of sequentially performing a first simultaneous transfer control that serves as the simultaneous transfer control, the third movement control, and a second simultaneous transfer control that serves as the simultaneous transfer control, in the stated order, if the first take-out transfer control and the second storage transfer control have been performed in the first simultaneous transfer control, the control device performs the first storage transfer control and the second take-out transfer control in the second simultaneous transfer control, and if the first storage transfer control and the second take-out transfer control have been performed in the first simultaneous transfer control, the control device performs the first take-out transfer control and the second storage transfer control in the second simultaneous transfer control,
in the first take-out transfer control and the second take-out transfer control performed in the first simultaneous transfer control, if, out of two articles stored in a storage section that is a transfer target, a rear-side article is an unload target article and a front-side article is a non-unload target article, the control device transfers the two articles, namely the unload target article and the non-unload target article, from the storage section of one article storage rack out of the pair of article storage racks to the first transferring device or to the second transferring device, and
in the first storage transfer control and the second storage transfer control performed in the second simultaneous transfer control, if an unload target article and a non-unload target article are supported on the first transferring device or the second transferring device, the control device transfers only the non-unload target article, out of the two articles, namely the unload target article and the non-unload target article, from the first transferring device or the second transferring device to a storage section of the other article storage rack out of the pair of article storage racks.

8. The article transport facility according to claim 7, wherein
in a case of sequentially performing the second simultaneous transfer control, the third movement control, and a third simultaneous transfer control that serves as the simultaneous transfer control, in the stated order, if the first take-out transfer control and the second storage transfer control have been performed in the second simultaneous transfer control, the control device performs the first storage transfer control and the second take-out transfer control in the third simultaneous transfer control, and if the first storage transfer control and the second take-out transfer control have been performed in the second simultaneous transfer control, the control device performs the first take-out transfer control and the second storage transfer control in the third simultaneous transfer control,
in the first take-out transfer control and the second take-out transfer control performed in the second simultaneous transfer control, if, out of two articles stored in a storage section that is a transfer target, a rear-side article is an unload target article and a front-side article is a non-unload target article, the control device transfers the two articles, namely the unload target article and the non-unload target article, from the storage section of one article storage rack out of the pair of article storage racks to the first transferring device or to the second transferring device, and
in the first storage transfer control and the second storage transfer control performed in the third simultaneous transfer, if an unload target article and a non-unload target article are supported on the first transferring device or the second transferring device, the control device transfers only the non-unload target article, out of the two articles, namely the unload target article and the non-unload target article, from the first transferring device or the second transferring device to a storage section of the other article storage rack out of the pair of article storage racks.

9. An article transport facility, comprising:
an article storage rack in which a plurality of storage sections are arranged in a plurality of rows in a vertical direction and a plurality of columns in a rack width direction; and
a stacker crane that is configured to travel in front of the article storage rack along the rack width direction,
wherein the stacker crane is provided with:
a travelling carriage that is configured to be able to travel along the rack width direction;
a first mast that is provided so as to stand on the travelling carriage;
a second mast that is provided so as to stand on the same travelling carriage on which the first mast is provided;
a first elevator body that is configured to be guided along the first mast;
a second elevator body that is configured to be guided along the second mast so as to be able to move up/down independently of the first elevator body, and that is aligned with the first elevator body in the rack width direction in plan view;
a first transferring device that is supported by the first elevator body and that is configured to transfer an article between the plurality of storage sections and the first transferring device; and
a second transferring device that is supported by the second elevator body and that is configured to transfer an article between the plurality of storage sections and the second transferring device,
the article transport facility further comprises a first sliding device that is supported by the first elevator body,
the first sliding device is configured to move the first transferring device along the rack width direction relative to the first elevator body,
a storage section to/from which the first transferring device transfers an article is defined as a first target storage section, and a storage section to/from which the second transferring device transfers an article is defined as a second target storage section,
a minimum separation distance and a maximum separation distance between the first transferring device and the second transferring device are respectively defined as a first distance and a second distance, the minimum separation distance and the maximum separation distance being determined by a range of a movement of the first transferring device caused by the first sliding device,
the article transport facility further comprises:
a selecting section that is configured to select, from among the plurality of storage sections, two storage sections whose separation distance from each other in the rack width direction is no smaller than the first distance and no greater than the second distance, and that are located at a same level or different levels, as the first target storage section and the second target storage section; and
a control device that is configured to control operations of the stacker crane, and
the control device is configured to perform a first movement control by which: the second elevator body is moved up/down and the travelling carriage is caused to travel so that the second transferring device moves to a second target stopping position at which the second transferring device is able to transfer an article to/from the second target storage section; and the first elevator body is moved up/down and the first sliding device is caused to operate so that the first transferring device moves to a first target stopping position at which the first transferring device is able to transfer an article to/from the first target storage section.

10. An article transport facility, comprising:
an article storage rack in which a plurality of storage sections are arranged in a plurality of rows in a vertical direction and a plurality of columns in a rack width direction; and
a stacker crane that is configured to travel in front of the article storage rack along the rack width direction,
wherein the stacker crane is provided with:
a travelling carriage that is configured to be able to travel along the rack width direction;
a first mast that is provided so as to stand on the travelling carriage;
a second mast that is provided so as to stand on the same travelling carriage on which the first mast is provided;
a first elevator body that is configured to be guided along the first mast;
a second elevator body that is configured to be guided along the second mast so as to be able to move up/down independently of the first elevator body, and that is aligned with the first elevator body in the rack width direction in plan view;
a first transferring device that is supported by the first elevator body and that is configured to transfer an article between the plurality of storage sections and the first transferring device; and
a second transferring device that is supported by the second elevator body and that is configured to transfer an article between the plurality of storage sections and the second transferring device,
the article transport facility further comprises a first sliding device that is supported by the first elevator body and a second sliding device that is supported by the second elevator body,
the first sliding device is configured to move the first transferring device along the rack width direction relative to the first elevator body,
the second sliding device is configured to move the second transferring device within a range of a slide movement along the rack width direction relative to the second elevator body,
a storage section to/from which the first transferring device transfers an article is defined as a first target storage section, and a storage section to/from which the second transferring device transfers an article is defined as a second target storage section,
a minimum separation distance and a maximum separation distance between the first transferring device and the second transferring device are respectively defined as a third distance and a fourth distance, the minimum separation distance and the maximum separation distance being determined by a range of a movement of the first transferring device caused by the first sliding device and a range of a movement of the second transferring device caused by the second sliding device,
the article transport facility further comprises:
a selecting section that is configured to select, from among the plurality of storage sections, two storage sections whose separation distance from each other in the rack width direction is no smaller than the third distance and no greater than the fourth distance, and that are located at a same level or different levels, as the first target storage section and the second target storage section; and a control device that is configured to control operations of the stacker crane, the control device is configured to perform a first movement control by which: the first transferring device is moved to a first target stopping position at which the first transferring device is able to transfer an article to/from the first target storage section; and the second transferring device is moved to a second target stopping position at which the second transferring device is able to transfer an article to/from the second target storage section, a state in which the second transferring device is located at a main end is defined as a main state, the main end being, out of a pair of ends of the range of the slide movement in the rack width direction, an end at which the second transferring device is located at a time execution of the first movement control starts or at a time immediately before the first movement control starts, and a state in which the second transferring device is located at a sub end is defined as a sub state, the sub end being an end that is opposite the main end, and the first movement control is a control by which:

on an assumption that the second transferring device in the main state is located at the second target stopping position, if the first transferring device can be moved to the first target stopping position, the second elevator body is moved up/down and the travelling carriage is caused to travel so that the second transferring device is moved to the second target stopping position in the main state, and the first elevator body is moved up/down and the first sliding device is caused to operate so that the first transferring device is moved to the first target stopping position; and on an assumption that the second transferring device in the main state is located at the second target stopping position, if the first transferring device cannot be moved to the first target stopping position, the second sliding device is caused to operate, the second elevator body is moved up/down, and the travelling carriage is caused to travel so that the second transferring device is moved to the second target stopping position in the sub state, and the first elevator body is moved up/down and the first sliding device is caused to operate so that the first transferring device is moved to the first target stopping position.

11. The article transport facility according to claim 10, wherein the first transferring device includes a pair of first fork devices that are aligned in the rack width direction, the pair of first fork devices are configured to move so as to protrude and retract in a rack front-rear direction, and to be individually moved in the rack width direction by the first sliding device, the rack front-rear direction being a direction that is orthogonal to the rack width direction in plan view, the second transferring device includes a pair of second fork devices that are aligned in the rack width direction, the pair of second fork devices are configured to move so as to protrude and retract in the rack front-rear direction, and to be individually moved in the rack width direction by the second sliding device, the main state is defined as a state in which a second fork device on a side on which the main end is located relative to the sub end, out of the pair of second fork devices in the second transferring device, is located at the main end, and the sub state is defined as a state in which a second fork device on a side on which the sub end is located relative to the main end, out of the pair of second fork devices in the second transferring device, is located at the sub end.

12. The article transport facility according to claim 11, capable of transporting a plurality of types of articles having different sizes in the rack width direction, wherein the plurality of storage sections include a plurality of types of storage sections having different sizes in the rack width direction, the selecting section is configured to: when an article is transferred from the first transferring device to the first target storage section, select a storage section having a size corresponding to a type of the article as the first target storage section; and when an article is transferred from the second transferring device to the second target storage section, select a storage section having a size corresponding to a type of the article as the second target storage section, and the article transport facility further comprises a control section configured to manage the plurality of storage sections in the article storage rack, and the control section is configured to: when an article is transferred from the first transferring device to the first target storage section or when an article is transferred from the second transferring device to the second target storage section, set a storage section having a size corresponding to the article to be transferred, within an empty area in which no storage section is formed, of the article storage rack; and when transferring an article from the first target storage section to the first transferring device or when transferring an article from the second target storage section to the second transferring device, set, whichever the first target storage section or the second target storage section stores the article, as the empty area.

13. An article transport facility, comprising:

an article storage rack in which a plurality of storage sections are arranged in a plurality of rows in a vertical direction and a plurality of columns in a rack width direction; and a stacker crane that is configured to travel in front of the article storage rack along the rack width direction, wherein the stacker crane is provided with:

a travelling carriage that is configured to be able to travel along the rack width direction;

a first mast that is provided so as to stand on the travelling carriage;

a second mast that is provided so as to stand on the same travelling carriage on which the first mast is provided;

a first elevator body that is configured to be guided along the first mast;

a second elevator body that is configured to be guided along the second mast so as to be able to move up/down independently of the first elevator body, and that is aligned with the first elevator body in the rack width direction in plan view;

a first transferring device that is supported by the first elevator body and that is configured to transfer an article between the plurality of storage sections and the first transferring device; and
a second transferring device that is supported by the second elevator body and that is configured to transfer an article between the plurality of storage sections and the second transferring device,
the article transport facility further comprises a first sliding device that is supported by the first elevator body and a second sliding device that is supported by the second elevator body,
the first sliding device is configured to move the first transferring device along the rack width direction relative to the first elevator body,
the second sliding device is configured to move the second transferring device along the rack width direction relative to the second elevator body,
a storage section to/from which the first transferring device transfers an article is defined as a first target storage section, and a storage section to/from which the second transferring device transfers an article is defined as a second target storage section,
a minimum separation distance and a maximum separation distance between the first transferring device and the second transferring device are respectively defined as a third distance and a fourth distance, the minimum separation distance and the maximum separation distance being determined by a range of a movement of the first transferring device caused by the first sliding device and a range of a movement of the second transferring device caused by the second sliding device,
the article transport facility further comprises:
a selecting section that is configured to select, from among the plurality of storage sections, two storage sections whose separation distance from each other in the rack width direction is no smaller than the third distance and no greater than the fourth distance, and that are located at a same level or different levels, as the first target storage section and the second target storage section; and
a control device that is configured to control operations of the stacker crane, and
the control device is configured to perform a second movement control by which: the travelling carriage is caused to travel so that the travelling carriage is moved to a target travel stopping position that is set between the first target storage section and the second target storage section in the rack width direction; the first elevator body is moved up/down and the first sliding device is caused to operate so that the first transferring device is moved to a first target stopping position at which the first transferring device is able to transfer an article to/from the first target storage section; and the second elevator body is moved up/down and the second sliding device is caused to operate so that the second transferring device is moved to a second target stopping position at which the second transferring device is able to transfer an article to/from the second target storage section.

14. The article transport facility according to claim 13, wherein
a standard stopping position for the first transferring device is set at a center of the range of the movement of the first transferring device caused by the first sliding device,
a standard stopping position for the second transferring device is set at a center of the range of the movement of the second transferring device caused by the second sliding device, and
the target travel stopping position is set such that a central position between the standard stopping position for the first transferring device and the standard stopping position for the second transferring device in the rack width direction coincides with a central position between the first target storage section and the second target storage section in the rack width direction.

* * * * *